(12) United States Patent
Bouzas et al.

(10) Patent No.: US 7,778,859 B2
(45) Date of Patent: Aug. 17, 2010

(54) METHOD FOR ECONOMIC VALUATION IN SEISMIC TO SIMULATION WORKFLOWS

(75) Inventors: Horacio R. Bouzas, London (GB); Alex Pricope, Bonnyville (CA); Bill Obreiter, Calgary (CA); Colin Miiller, Calgary (CA); Jim Brady, La Jolla, CA (US); Tony Lolomari, San Fernando (TT)

(73) Assignee: Schlumberger Technology Corporation, Houston, TX (US)

( * ) Notice: Subject to any disclaimer, the term of this patent is extended or adjusted under 35 U.S.C. 154(b) by 991 days.

(21) Appl. No.: 11/510,976

(22) Filed: Aug. 28, 2006

(65) Prior Publication Data

US 2008/0052097 A1 Feb. 28, 2008

(51) Int. Cl.
*G06F 17/50* (2006.01)
(52) U.S. Cl. .......................................... 705/8
(58) Field of Classification Search .................. 705/7, 705/8
See application file for complete search history.

(56) References Cited

U.S. PATENT DOCUMENTS

| | | | |
|---|---|---|---|
| 6,064,984 A | 5/2000 | Ferguson et al. | |
| 6,985,878 B1 * | 1/2006 | Yamazaki et al. | 705/35 |
| 6,999,879 B2 | 2/2006 | Houck | |
| 7,062,458 B2 | 6/2006 | Maggioncalda et al. | |
| 7,085,696 B2 * | 8/2006 | King | 703/10 |
| 7,430,501 B2 * | 9/2008 | Feraille et al. | 703/10 |
| 7,539,625 B2 * | 5/2009 | Klumpen et al. | 705/8 |
| 2004/0002891 A1 | 1/2004 | Chen et al. | |
| 2004/0181378 A1 * | 9/2004 | Gilmore | 703/6 |
| 2007/0219846 A1 | 9/2007 | Mogensen | |

OTHER PUBLICATIONS

Zhuang (Economic Analysis of Cellulase Production By Clostridium Thermocellum in Solid State And Submerged Fermentation), 2004, pp. 1-114.*
Zhang et al (Biodiesel production from waste cooking oil: Economic Assessment and sensitivity analysis), May 2003, Bioresource Technology vol. 90, Issue 3, Dec. 2003, pp. 1-12.*
Intelligen, Inc., "SuperPro Designer User's Guide," http://web.archive.org/web/20060619151939/www.intelligen.com/demo.shtml, Jun. 19, 2006 (per Wayback Engine), Chapter 2.

* cited by examiner

*Primary Examiner*—Romain Jeanty
(74) *Attorney, Agent, or Firm*—John Bouchard

(57) ABSTRACT

A method is disclosed for performing economic calculations in petro-technical workflows, comprising: designing an economic model including, building and running an economic calculation, the building and running step including, opening an economics dialog box, clicking an economics calculation tab in the economics dialog box, clicking a settings tab in the economics dialog box and configuring a set of settings for the economic calculation, and clicking a run button in the economics dialog box to perform the economic calculation.

19 Claims, 42 Drawing Sheets

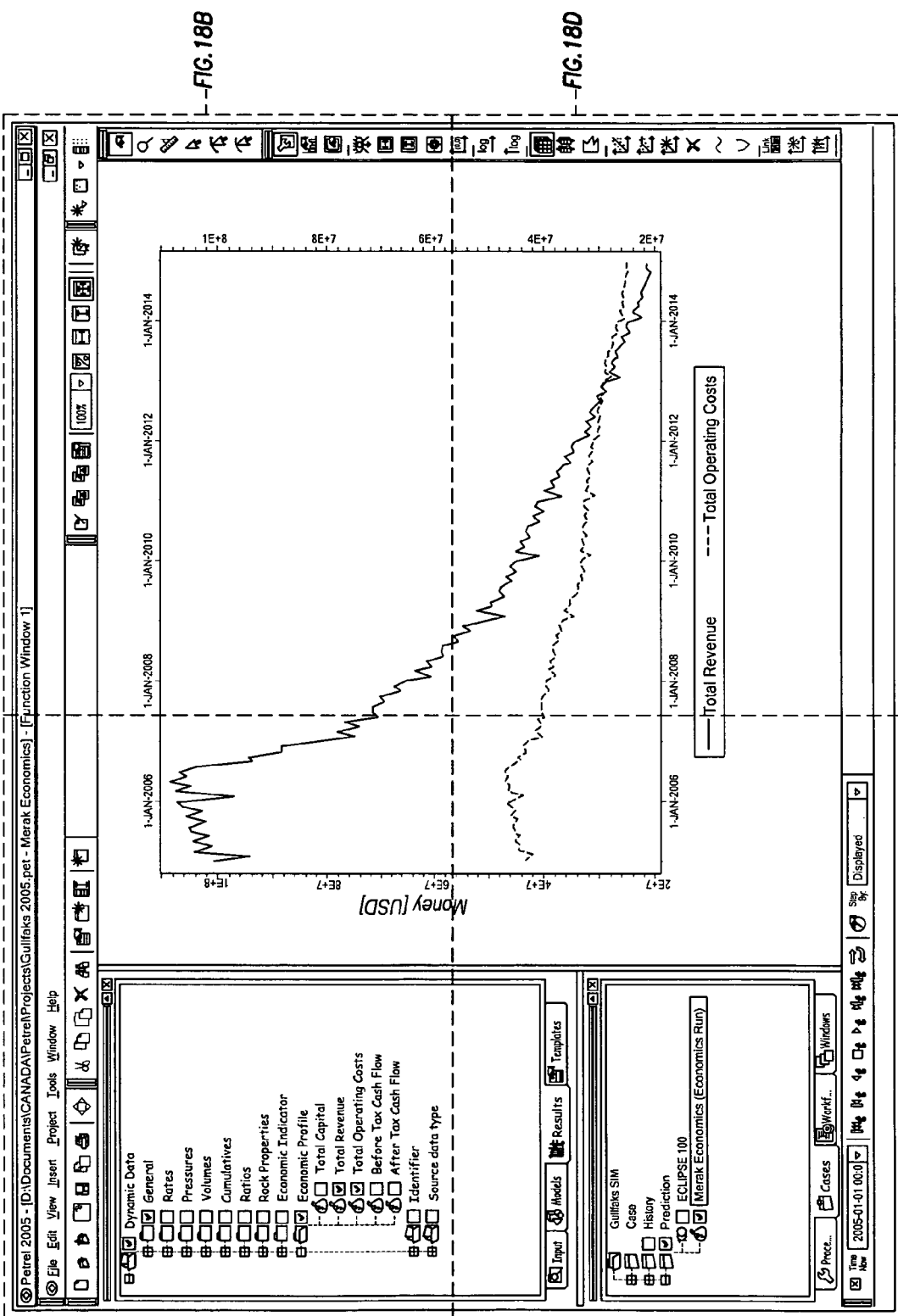

METHOD FOR ECONOMIC VALUATION IN SEISMIC TO SIMULATION WORKFLOWS

BACKGROUND

The subject matter disclosed in this specification relates to a method, and a corresponding system and computer program and program storage device, practiced by a software adapted to be stored in a workstation or other computer system, for economic valuation in seismic to simulation workflows; and, in particular, a method for economic evaluation of prospective oil or gas field reservoirs using production forecasts and full development and operational costs Currently, the process of economic evaluation of prospective reservoir prospects is either absent or complex. This specification discloses an economic evaluation tool, represented by a software adapted to be stored in a workstation or other computer system, which provides an integrated and simple way of calculating and displaying economic indicators in connection with the development of the prospective reservoir prospect in response to a given set of costs and other production data associated with the prospective reservoir prospect.

SUMMARY

One aspect of the present invention involves a method for performing economic calculations in petro-technical workflows, comprising: designing an economic model including, building and running an economic calculation, the building and running step including, opening an economics dialog box, clicking an economics calculation tab in the economics dialog box, clicking a settings tab in the economics dialog box and configuring a set of setting for the economic calculation, and clicking a run button in the economics dialog box to perform the economic calculation.

Another aspect of the present invention involves a program storage device readable by a machine tangibly embodying a set of instructions executable by the machine to perform method steps for performing economic calculations in petro-technical workflows, the method steps comprising: designing an economic model including, building and running an economic calculation, the building and running step including, opening an economics dialog box, clicking an economics calculation tab in the economics dialog box, clicking a settings tab in the economics dialog box and configuring a set of setting for the economic calculation, and clicking a run button in the economics dialog box to perform the economic calculation.

Another aspect of the present invention involves a computer program adapted to be executed by a processor, the computer program, when executed by the processor, conducting a process for performing economic calculations in petro-technical workflows, the process comprising: designing an economic model including, building and running an economic calculation, the building and running step including, opening an economics dialog box, clicking an economics calculation tab in the economics dialog box, clicking a settings tab in the economics dialog box and configuring a set of setting for the economic calculation, and clicking a run button in the economics dialog box to perform the economic calculation.

Another aspect of the present invention involves a system adapted for performing economic calculations in petro-technical workflows, comprising: apparatus adapted for designing an economic model including, apparatus adapted for building and running an economic calculation, the apparatus adapted for building and running an economic calculation including, apparatus adapted for opening an economics dialog box, apparatus adapted for receiving a click on an economics calculation tab in the economics dialog box, apparatus adapted for receiving a click on a settings tab in the economics dialog box and configuring a set of settings for the economic calculation, and apparatus adapted for receiving a click on a run button in the economics dialog box to perform the economic calculation.

Further scope of applicability will become apparent from the detailed description presented hereinafter. It should be understood, however, that the detailed description and the specific examples set forth below are given by way of illustration only, since various changes and modifications within the spirit and scope of the 'Software for performing economic calculations in Petro-Technical workflows', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIGS. 4 through 29 illustrate the 'window displays' of FIG. 3 which are adapted for displaying the aforesaid 'economic indicators in connection with the development of a prospective reservoir prospect', wherein:

FIG. 4 illustrates a 'define simulation case' dialog box;

FIG. 5 illustrates a 'process diagram tree';

FIG. 6 illustrates an 'economics dialog box—economic calculation tab';

FIG. 7 illustrates an 'economics dialog box—settings tab';

FIG. 8 illustrates an 'economics dialog box—mapping tab';

FIGS. 9 and 10 illustrate the 'economics dialog box—economic calculation tab';

FIG. 11 illustrates how to edit the properties and modifiers of an economic model—'economics plug-in, general tab';

FIG. 12 illustrates the 'advanced settings dialog box';

FIG. 13 illustrates the 'economics plug-in'—'operating cost' tab;

FIG. 14 illustrates the 'economics plug-in'—'capital cost' tab;

FIG. 15 illustrates the 'economics plug-in'—'economic model name'

FIG. 16 illustrates the 'economics dialog box'—'settings tab';

FIG. 17 illustrates the 'economics dialog box'—'mapping tab';

FIG. 18 illustrates a dialog box which enables a user/operator to visualize the results of economic calculations, the user viewing, in FIG. 18, the total revenue and operating costs for a reservoir field;

FIG. 19 illustrates a dialog box which enables a user/operator to visualize the results of economic calculations, the user viewing, in FIG. 19, the total operating costs for a series of simulations or scenarios in a graph at the top of the figure, and a histogram representing discounted after-tax Net Present Value (NPV) on the bottom of the figure;

FIGS. 20 and 21 illustrate an example of the use of the Merak Economics Process in the workflow editor, and, in particular, running the economics process once over a set of cases;

FIGS. 22 and 23 illustrate an example of the use of the Merak Economics Process in the workflow editor, and, in particular, running several Merak Economics Processes per case;

FIGS. 24, 25, 26, and 27 illustrate an example of the use of the Merak Economics Process in the workflow editor, and, in particular, the use of variables, FIG. 24 illustrating variables used in the workflow editor to define the run name and the well drilling costs, FIGS. 25 and 26 illustrating examples showing how the run name and variable costs are set up in the Merak Economics dialog box to use the variables defined in the workflow editor, FIG. 27 showing the results of the run as previously described;

FIGS. 28 and 29 illustrate an example of the use of the Merak Economics Process in the workflow editor, and, in particular, using well logs to populate the variables in a workflow;

FIGS. 30 through 36 are presented in connection with a 'software requirements specification', associated with the 'Software for performing economic calculations in petro-technical workflows' of FIG. 2 which is set forth below, wherein FIG. 30 illustrates the Petrel Results and Case Trees;

FIG. 31 illustrates launching the 'Petrel Merak Economics Plugin (PMEP)'; and

FIG. 32 through 36 illustrate: (1) the PMEP in the Process Manager in FIG. 32, and (2) the 'Petrel Merak Economics Plugin (PMEP)' User Interface (UI) mockup in FIGS. 33 through 36.

DETAILED DESCRIPTION

There is a growing demand in the industry to bring 'economic evaluations' earlier into the decision making process; that is, to perform 'economic screening' of reservoir simulation production results. However, the current practice (including 'carrying out the majority of the technical work based on volumes and engineering designs thereby generating a set of results, and then sending the set of results to a planner/economist for independent economic evaluation') could potentially lead to missed value. In other words, the current process of 'economic evaluation of prospective reservoir prospects' is either absent, complex, or late in the cycle As a result, this specification discloses an 'economic evaluation tool' (represented by a software adapted to be stored in a workstation or other computer system) that provides an integrated and simple way of calculating and displaying economic indicators in connection with the development of a prospective reservoir prospect in response to a given set of costs and other production data associated with the prospective reservoir prospect.

Figure 1:
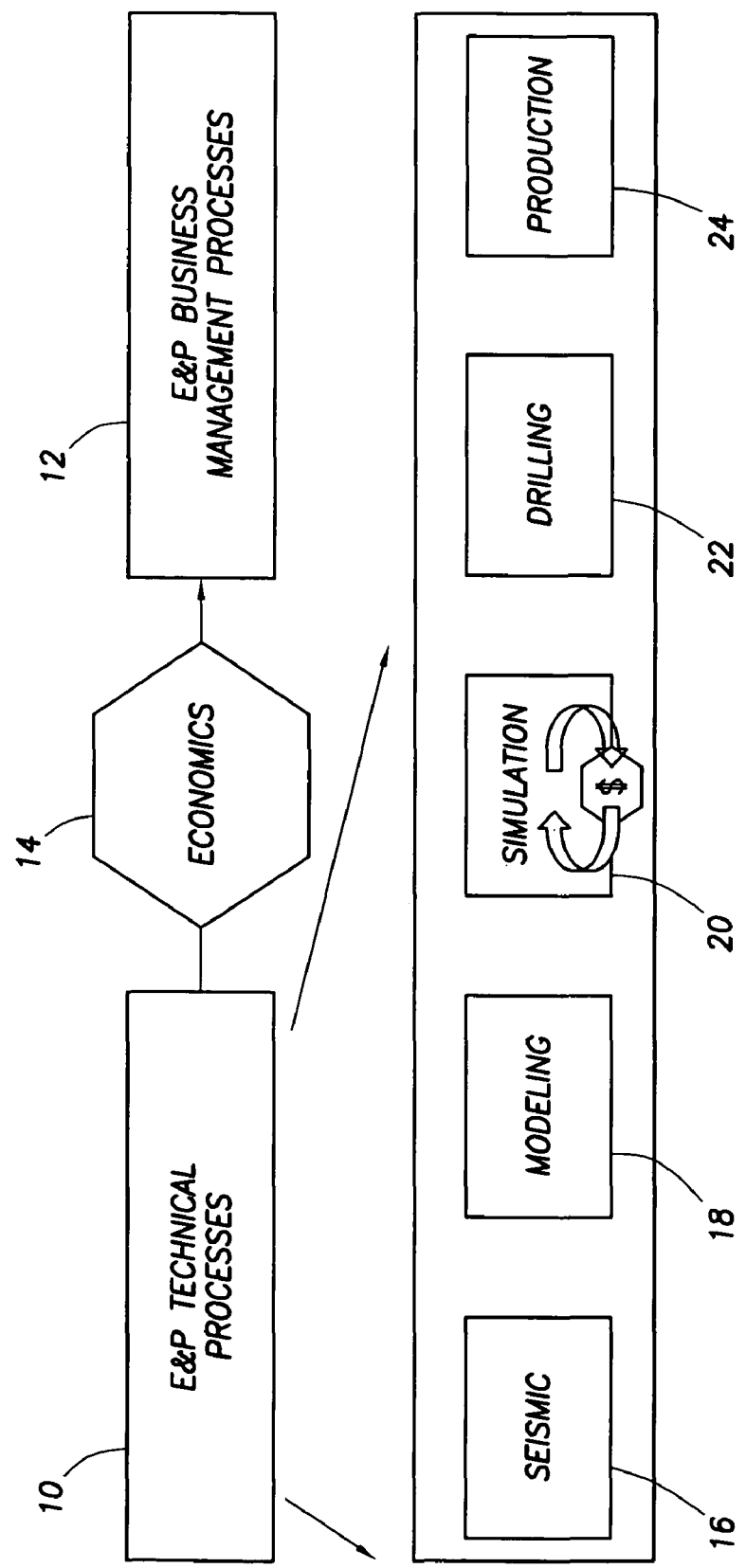
FIG. 1 illustrates the location of the 'Software for performing economic calculations in petro-technical workflows' of FIG. 2 intermediate the 'Exploration and Production (E&P) Technical Processes' and the 'E&P Business Management Processes'.

Referring initially to FIG. 1, the current leading 'petroleum project economics tool' [referred to as the 'Petroleum Economics Evaluation Product' or 'PEEP', which is owned and operated by Schlumberger Technology Corporation of Houston, Tex.] is not designed specifically to provide an 'economic screening of reservoir simulation results'. However, due to the 'openness' of the PEEP product, a tailored 'Graphical User Interface (GUI)' can be designed and used as a 'front end' to drive the 'Petroleum Economics Evaluation Product (PEEP)' in the required manner which would thereby enable the PEEP product to provide the aforementioned 'economic screening of reservoir simulation results'. This adaptation of the Graphical User Interface (GUI) of the 'Petroleum Economics Evaluation Product (PEEP)', to provide the required 'economic screening of reservoir simulation results', can then produce a 'light-weight' and 'easy-to-use' tool that integrates well with technical applications. As a result of this solution, a tight workflow integration can be achieved between 'petro-technical applications' and a 'product suite', such as the 'E&P Technical Processes' 10 of FIG. 1, which can then be used for 'corporate planning and reserves', such as the 'E&P Business Management Processes' 12 of FIG. 1, while using PEEP models and expert data or simple prepackaged models. In addition, a set of 'computed Net Present Value (NPV) cases' can then be used in 'Capital Planning' for 'portfolio analysis' and 'ranking'. In short, 'economic evaluation', represented by 'Economics' 14 in FIG. 1, becomes the 'missing link' between 'petro-technical workflows', represented by 'E&P Technical Processes' 10 of FIG. 1, and 'business valuation workflows', represented by 'E&P Business Management Processes' 12 of FIG. 1. As a result, FIG. 1 illustrates the fact that 'economic evaluation' 14 can represent a 'link' between a set of 'petro-technical workflows' 10 and 'business valuation workflows' 12, a topic which will be discussed in greater detail in this specification with reference to FIGS. 1-36 of the drawings. In FIG. 1, the 'petro-technical workflows' 10 can include: seismic 16, modeling 18, simulation 20, drilling 22, and production 24.

Figure 2:
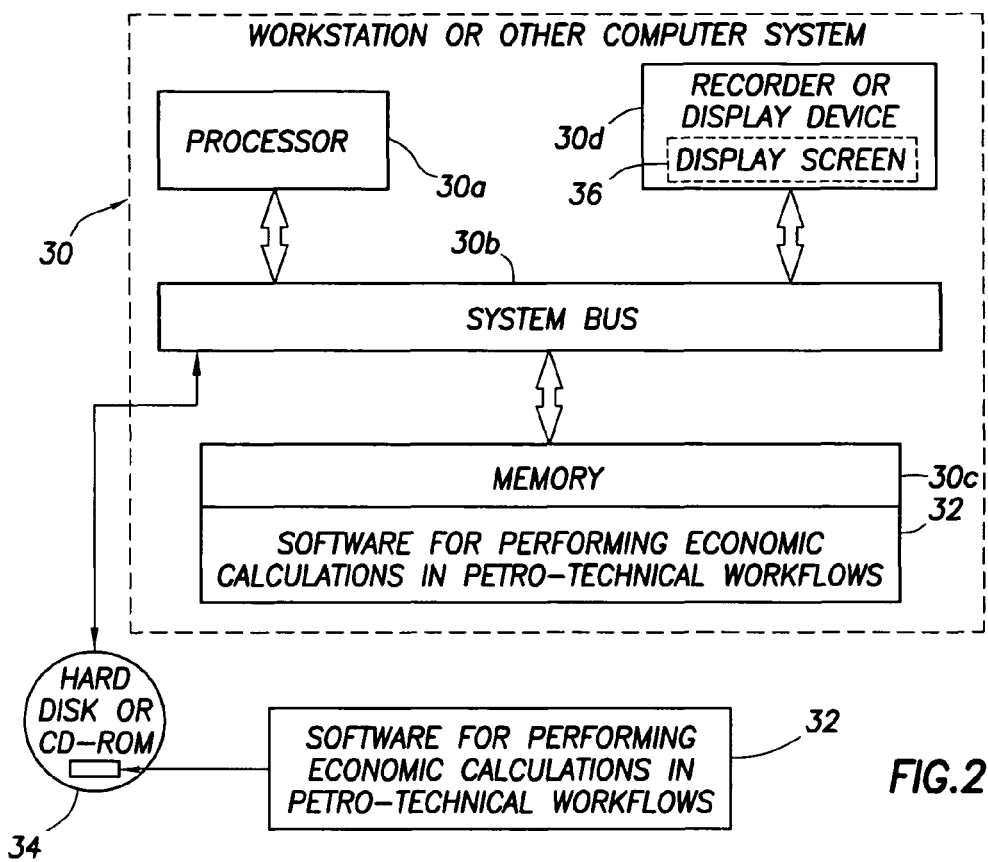
FIG. 2 illustrates a workstation or other computer system which stores the 'Software for performing economic calculations in Petro-Technical workflows' that provides an integrated and simple way of calculating and displaying 'economic indicators in connection with the development of a prospective reservoir prospect' in response to a given set of costs and other production data associated with the prospective reservoir prospect.

Referring to FIG. 2, a workstation or other computer system 30 is illustrated which stores a 'Software for performing economic calculations in Petro-Technical workflows' that provides an integrated and simple way of calculating and displaying 'economic indicators in connection with the development of a prospective reservoir prospect' in response to a given set of costs and other production data associated with the prospective reservoir prospect.

In FIG. 2, a workstation, personal computer, or other computer system 30 is illustrated adapted for storing a 'Software for performing economic calculations in Petro-Technical workflows'. The computer system 30 of FIG. 2 includes a Processor 30$a$ operatively connected to a system bus 30$b$, a memory or other program storage device 30$c$ operatively connected to the system bus 30$b$, and a recorder or display device 30$d$ operatively connected to the system bus 30$b$. The memory or other program storage device 30$c$ stores the 'Software for performing economic calculations in Petro-Technical workflows' 32 adapted for performing economic calculations in Petro-Technical workflows in order to provide an integrated and simple way of calculating and displaying 'economic indicators in connection with the development of a prospective reservoir prospect' in response to a given set of costs and other production data associated with the prospective reservoir prospect. The 'Software for performing economic calculations in Petro-Technical workflows' 32, which is stored in the memory 30c of FIG. 2, can be initially stored on a Hard Disk or CD-Rom 34, where the Hard Disk or CD-Rom 34 is also a 'program storage device'. The CD-Rom 34 can be inserted into the computer system 30, and the 'Software for performing economic calculations in Petro-Technical workflows' 32 can be loaded from the CD-Rom 34 and into the memory/program storage device 30c of the computer system 30 of FIG. 2. The Processor 30a will execute the 'Software for performing economic calculations in Petro-Technical workflows' 32 that is stored in memory 30c of FIG. 2; and, responsive thereto, the Processor 30a will generate one or more 'output displays' on a 'Display Screen' 36 that are recorded or displayed on the Recorder or Display device 30d of FIG. 2. The 'output displays', which are recorded on or displayed on the Display Screen 36 of the Recorder or Display device 30d of FIG. 2, are illustrated in FIGS. 4 through 29 of the drawings, which will be discussed later in this specification. Recall that the 'output displays' recorded or displayed on the Display Screen 36 of the Recorder or Display device 30d of FIG. 2, as shown in FIGS. 4 through 29, are adapted for performing economic calculations in Petro-Technical workflows in order to provide an integrated and simple way of calculating and displaying 'economic indicators in connection with the development of a prospective reservoir prospect' in response to a given set of costs and other production data associated with the prospective reservoir prospect, as discussed in this specification.

The computer system 30 of FIG. 2 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 30c (including the above referenced Hard Disk or CD-Rom 34) is a 'computer readable medium' or a 'program storage device' which is readable by a machine, such as the processor 30a. The processor 30a may be, for example, a microprocessor, microcontroller, or a mainframe or workstation processor. The memory or program storage device 30c, which stores the 'Software for performing economic calculations in Petro-Technical workflows' 32, may be, for example, a hard disk, ROM, CD-ROM, DRAM, or other RAM, flash memory, magnetic storage, optical storage, registers, or other volatile and/or non-volatile memory.

Figure 3:
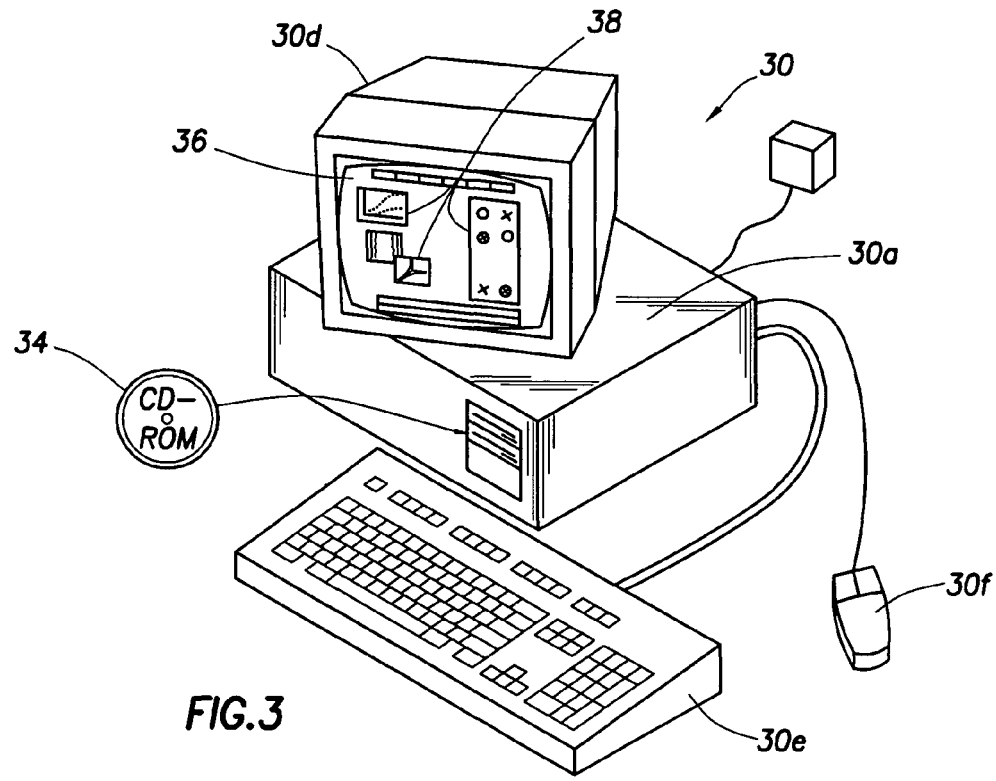
FIG. 3 illustrates another view of the computer system of FIG. 2, wherein a display screen of the computer system of FIG. 2 is adapted for displaying one or more 'window displays', wherein the 'window displays' are further adapted for displaying the aforesaid 'economic indicators in connection with the development of a prospective reservoir prospect'.

Referring to FIG. 3, the computer system 30 of FIG. 2 is illustrated again in FIG. 3. In FIG. 3, the computer system 30 includes a 'monitor' 30d which represents the recorder or display device 30d in FIG. 2, a processor 30a, a keyboard 30e, and a mouse 30f. One or more 'window displays' 38 will be displayed on the 'display screen' 36 of the monitor 30d of the computer system 30 in FIG. 3 when the 'Software for performing economic calculations in Petro-Technical workflows' 32 stored in the memory 30c of the computer system 30 of FIG. 2 is executed by the processor 30a of FIG. 2. A user/operator of the workstation of FIG. 3 can use the mouse 30f to click on certain 'tabs' in the 'window displays' 38 in order to generate and display other such 'window displays' 38 for the ultimate purpose of performing economic calculations in Petro-technical workflows in order to provide a method for calculating and displaying 'economic indicators in connection with the development of a prospective reservoir prospect' in response to a given set of costs and other production data associated with the prospective reservoir prospect, as discussed in this specification.

In FIG. 3, the 'window displays' 38, which are generated and displayed on the 'display screen' 36 of the monitor 30d of the workstation or other computer system 30 of FIG. 3 in response to the execution of the 'Software for performing economic calculations in Petro-Technical workflows' 32 by the processor 30a of FIG. 2, will be discussed in greater detail below with reference to FIGS. 4 through 29 of the drawings.

The Window Displays 38 Generated by the 'Software for Performing Economic Calculations' 32 of FIG. 2

Any decision an Exploration and Production (E&P) company makes is an integrated process that involves economics, planning, finance, and risk management. Therefore, an understanding of how the technical decisions made might impact the business goals is important. An 'economic evaluation' is done to justify a decision that will demand a capital expenditure (drilling new wells, equipment purchases like compressors, workovers) or impact operational costs. Additionally, short-term (monthly) economic goals need to be balanced with the longer-term (3-5 year) financial objectives of the company. Ultimately, management also uses 'economic evaluations' for corporate budgeting, government and investor reporting, and valuations of oil and gas properties. Uncertainty and risk both play huge roles in any E&P company's decision-making. Economic uncertainties (e.g., in oil prices) have to be taken into account, which can have a significant impact on the economics of any project.

In FIG. 2, this specification discloses a 'Software for performing economic calculations in petro-technical workflows' 32 that practices a method which enables geoscientists and engineers to obtain the basic knowledge that is needed for performing 'investment analysis'. As a result of the Software 32 of FIG. 2, the geoscientists and engineers should be able to understand the concepts and calculations that are required for an exploration or reservoir field-development project.

We can divide investment and economic analysis into two main areas: (1) cash flow analysis, and (2) economic decision measures.

Basic Cash Flow

A 'basic cash flow' receives a 'production estimate' and applies 'price' to calculate a 'revenue stream'. From this 'revenue stream', we subtract 'royalties' and 'operating expenses' to achieve an 'operating income'. 'Capital' is then removed to create a 'Before-Tax Cash Flow (BTCF)'. 'Income taxes' are then calculated, and the 'After-Tax Cash Flow (ATCF)' is created.

Revenue=Volume*Price

Operating Income=Revenue−(Royalty+Opcosts)

BTCF =Operating Income−Capital

Taxable Income=Operating Income−*DD&A*

ATCF=BTCF −Taxes Payable

Where:

BTCF=Before-Tax Cash Flow

ATCF=After-Tax Cash Flow

DD&A=Depreciation, depletion and amortization

Fluid Volume

A series of fluid volumes at given time intervals (months, years) can be obtained from either the 'ECLIPSE' or 'FrontSim' reservoir simulators, which are owned and operated by Schlumberger Technology Corporation. These fluid volumes can be oil, water, gas, or natural gas liquids (NGL) production, or water and gas injection values.

Prices

Price is the monetary value received for each barrel of oil or cubic foot of gas produced and sold. Secondary by-products [i.e., Natural Gas Liquids (NGLs)] may also be sold from some reservoirs. Prices may be kept at a constant value or escalated over time. Escalations are predictions of how the price will change based on market conditions. The quality of the hydrocarbon being sold (API density, absence of impurities like H2S, etc.) can also affect the product price.

Royalties

Royalty is value deducted from the revenue stream, which usually has no obligation toward covering expenses. It is considered to come "off the top," after product quality adjustments, but before operating costs or investments are deducted. Many different formulas are used for the calculation of royalties, which are dependent on the fiscal regime of a particular region.

Operating Expenses

Operating expenses are the day-to-day costs of operating a property and maintaining production. Typical charges would include fluid processing costs, lease electricity, chemicals, water disposal, and overhead. They are normally deductible for income tax purposes.

Capital Investments

Capital consists of investments for drilling, exploration, equipment and facilities. Usually broken down into 'Tangible' and 'Intangible' categories, they are considered spent in the scheduled year for the Before-Tax Cash Flow, and recovered over time for the After-Tax Cash Flow. Tangible investments are equipment purchases, such as pumping units, pipelines, compressors, and buildings. They often have salvage value. Intangible investments are drilling fees, mud and chemicals, logging, and other non-equipment charges. They typically have no salvage value. Costs to abandon an area or location are sometimes grouped with capital investments. Spent at the end of the life of a project, they may be offset by any recoverable equipment sold as salvage.

Income or Federal Taxes

Once an Operating Income has been established, income taxes should be calculated. It is at this point that tangible assets are depreciated over time, reducing the income stream available to be taxed. The tax rate is applied to Taxable Income, taxes are subtracted, and the After Tax Cash Flow is created.

Decision Measures

Decision measures can generally be grouped into three categories:
1. Value creation measures: These summarize future net cash flows in today's money (e.g., Net Present Value (NPV), Internal Rate of Return (IRR), Profit/Investment ratios (PIR)).
2. Survival Measures: These place an importance on short- and medium-term risk impact (e.g., Payout Period, risk management, Total capital exposure).
3. Competitive measures: These can be supply cost measures like break-even prices, or hurdle rates or financial measures such as earnings or return on capital employed (ROCE).

The Economics Process

An 'Economics process' is used to create, edit or use an 'economic model' that can, in turn, be used to compute 'Economic Indicators'. 'Economic Indicators' can be computed for the simulation cases listed in a 'Cases tree', and the results are added to the 'Results tree'. 'Economic Valuations' can be performed for single wells, groups, or fields by selecting the appropriate identifier from the 'Results tree' and dragging it onto the 'Domains box' on the 'Economic Calculation tab' in the 'Merak Economics dialog box'. In a typical economic run, wells, groups, and fields can be combined together. The data for all valid domain items are added together for each simulation in the run. The 'Merak Economics Process' automatically obtains the 'capital expenditure profile' from the simulations for development or infill drilling and workovers, if these options have been used.

Preparing Your Data for Economic Simulations

Figure 4:
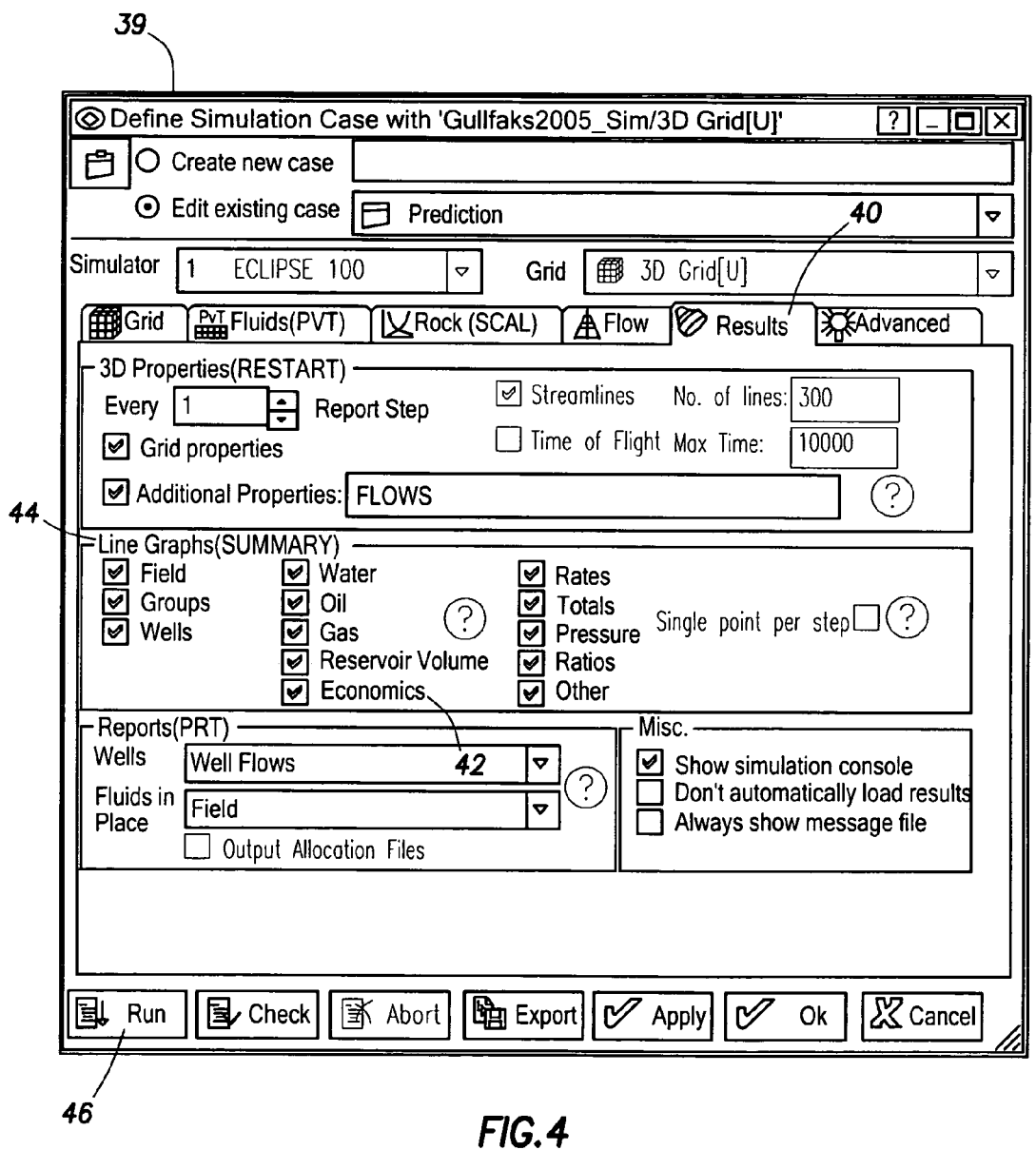

Referring to FIG. 4, when performing 'economic calculations', it is strongly recommended to request the ECLIPSE or FrontSim simulations to output additional data used to enhance the economic calculations. To do this, in FIG. 4, open the 'Simulation node' on the 'Process tree', and then double-click the 'Define Simulation Case' node to open the 'Define Simulation Case' dialog box 39 (in FIG. 4). Click the 'Results tab' 40, and then select the 'Economics check box' 42 in the 'Line Graphs option group' 44 in FIG. 4.

In FIG. 4, when the 'Economics check box' 42 is selected, run an economic calculation by clicking on the 'run' button 46 in FIG. 4. In response thereto, the 'simulator' (i.e., the 'Software for performing economic calculations in petro-technical workflows' 32) will output the following summary vectors:
1) FMWPR: Total number of production wells currently flowing;
2) FMWEN: Total number of injection wells currently flowing;
3) FMWDR: Total number of drilling events during this timestep;
4) FMWDT: Total number of drilling events in total;
5) FMWWO: Total number of workover events during this timestep;
6) FMWWT: Total number of workover events in total.

Creating an Economic Calculation Run

Refer now to FIGS. 5, 6, 7, and 8.

This part of the specification describes how to build and run an 'economic calculation'. An 'economic-calculation run' can be set up from the 'Simulation node' in a 'Process Diagram tree' (described here), or from within the 'Workflow Editor'.

Figure 5:
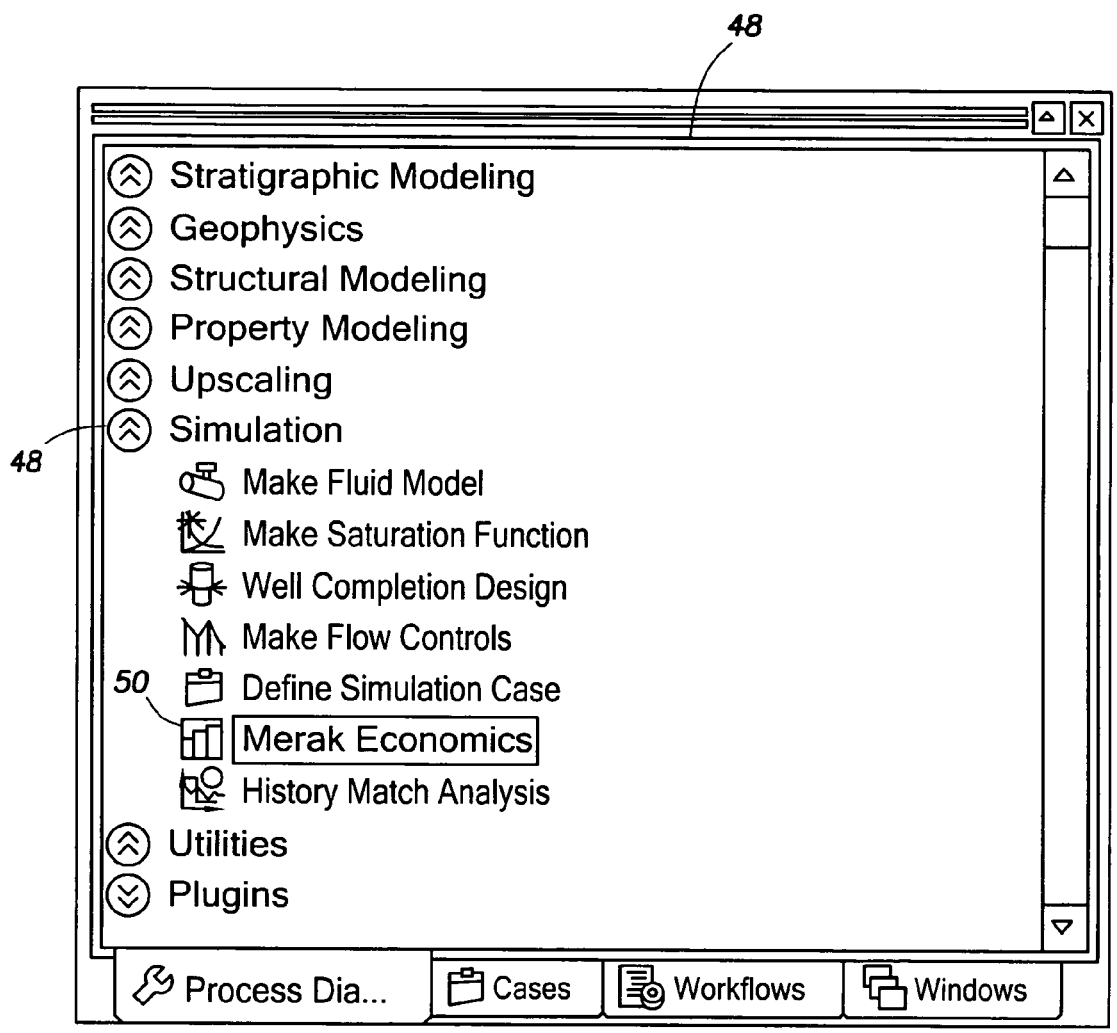
Figure 6:
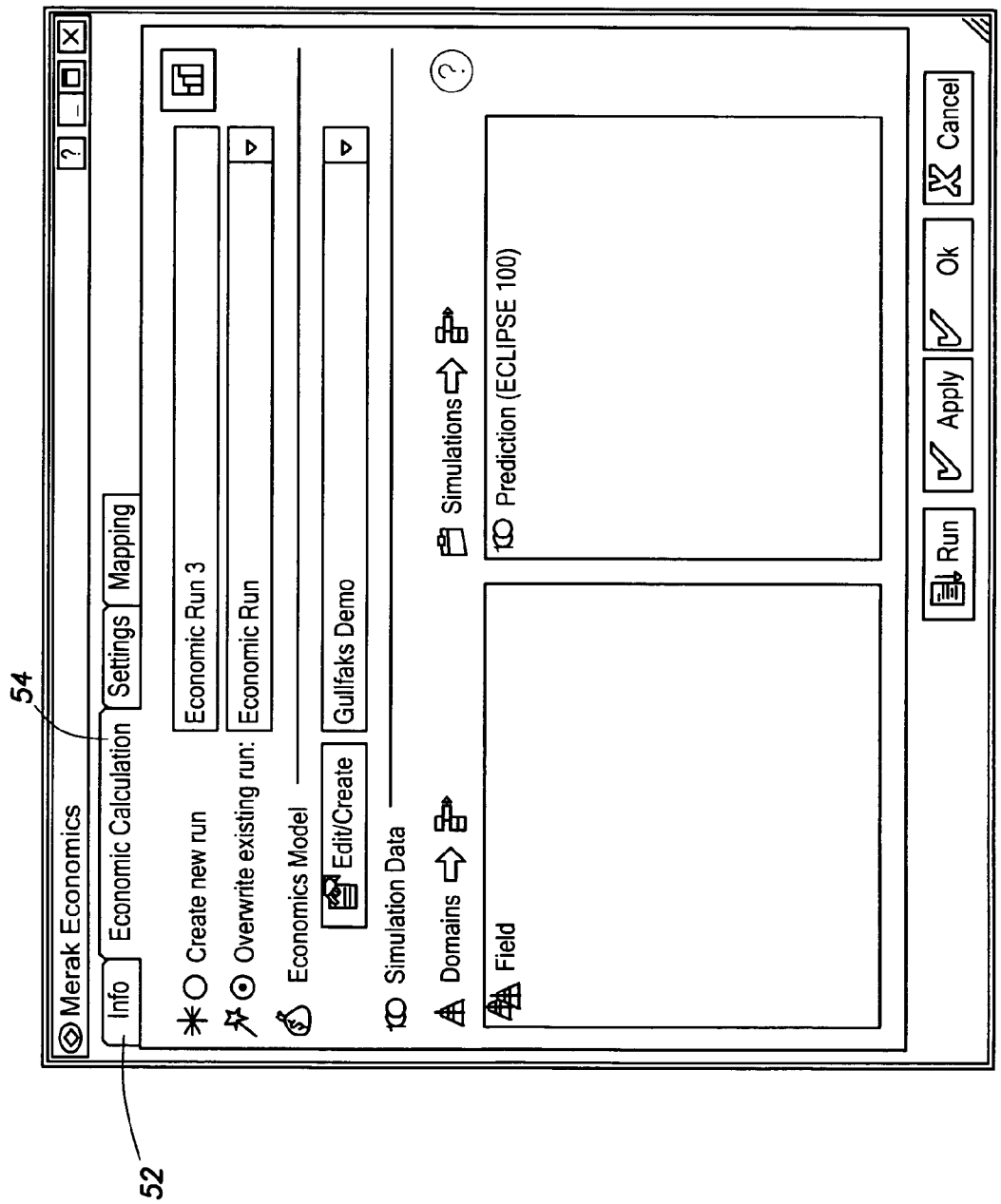
Figure 7:
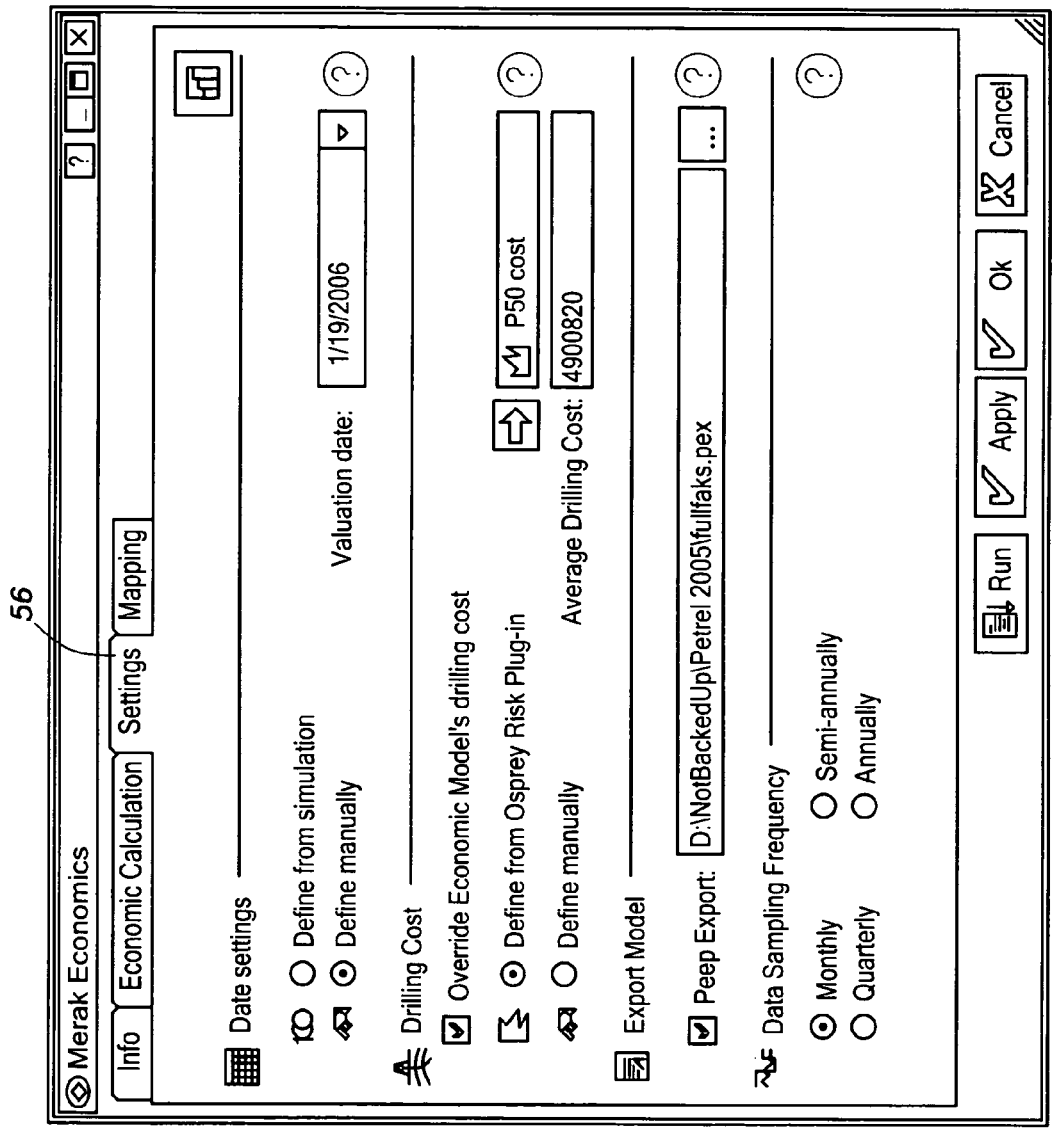

In FIGS. 5, 6, 7, and 8, in order to set up a 'run' from within the 'Process Diagram tree', do the following:

Set-up your 'economic calculation' by performing steps (1) through (6) below, as follows:
1. Click the 'Process Diagram tree', as shown in FIG. 5.
2. Double-click the 'Simulation node' 48 in FIG. 5 to open the simulation node.
3. Double-click the 'Merak Economics node' 50 to open the 'Merak Economics dialog box', as shown in FIG. 6. The 'Info tab' 52 in FIG. 6 provides a brief description of how the 'Merak Economics process' works.
4. Click the 'Economic Calculation tab' 54 in FIG. 6 to define the basic parameters of your economic calculation. This includes choosing whether you will create a new run or overwrite an existing one, choosing an economics model, choosing the identifiers (wells, groups, or field) for which you want to perform calculations, and choosing the simulations that you want to use for the calculation.
5. Configure the 'settings' 56 in FIG. 7 for your economic calculation. This includes defining the start date of your calculations, choosing how drilling costs will be defined, setting up Export file parameters if desired, and choosing the data-sampling frequency for your simulation.

6. Define 'mappings' 58 of FIG. 8 for Ethane, Propane, and Butane if desired. Your 'economic calculation' has been set-up.

Figure 8:
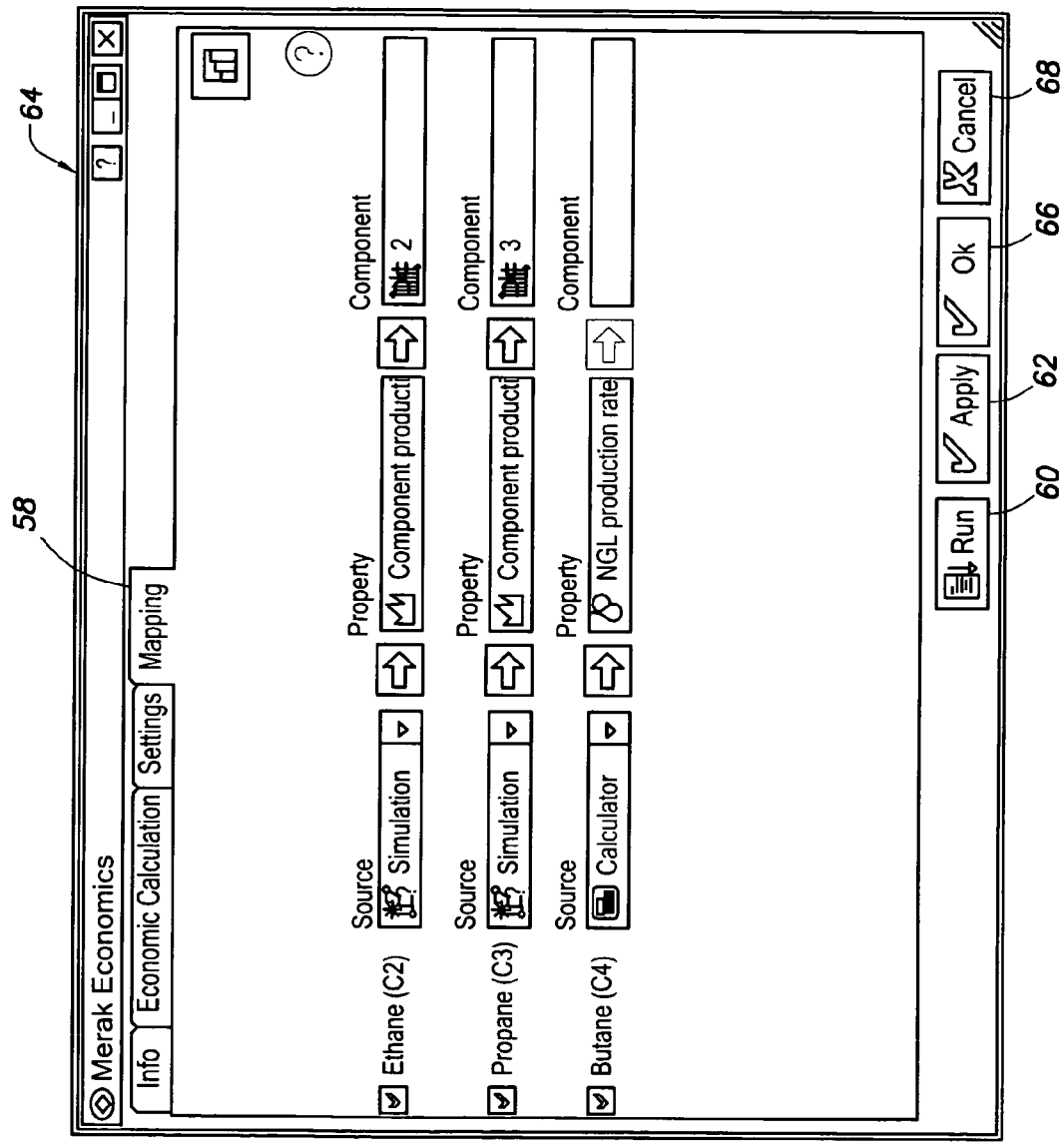

In FIG. 8, when the 'economic calculation' has been set-up as desired by performing steps (1) through (6) above, perform one of the following steps, as shown in FIG. 8, as follows:

1. Click the 'Run' button 60 in FIG. 8 to perform the calculation for the currently selected run. When you perform a run, all input data is sampled into the specified frequency and passed from the host application (i.e. Petrel) on to the 'Merak Economic Engine', which performs the 'economic calculations', and then passes the results back to the hosting application (i.e. Petrel) for inclusion in the 'Results tree'. Any changes you have made to the run's properties are saved, and will be reflected the next time you select that run on the Economic Calculation tab.
2. Click the 'Apply button' 62 in FIG. 8 to apply any changes that you have made to the currently selected run, but leave the 'Merak Economics dialog box' 64 in FIG. 8 open. These changes are saved, and will be reflected the next time you select that run.
3. Click the 'OK button' 66 in FIG. 8 to save any changes that you have made to the currently selected run, and close the 'Merak Economics dialog box' 64 in FIG. 8. These changes are saved, and will be reflected the next time you select that run.
4. Click 'Cancel' 68 in FIG. 8 to close the 'Merak Economics dialog box' 64 without saving any changes that you have made to the currently selected run.

Defining Basic Economic-Calculation Parameters

Figure 9:
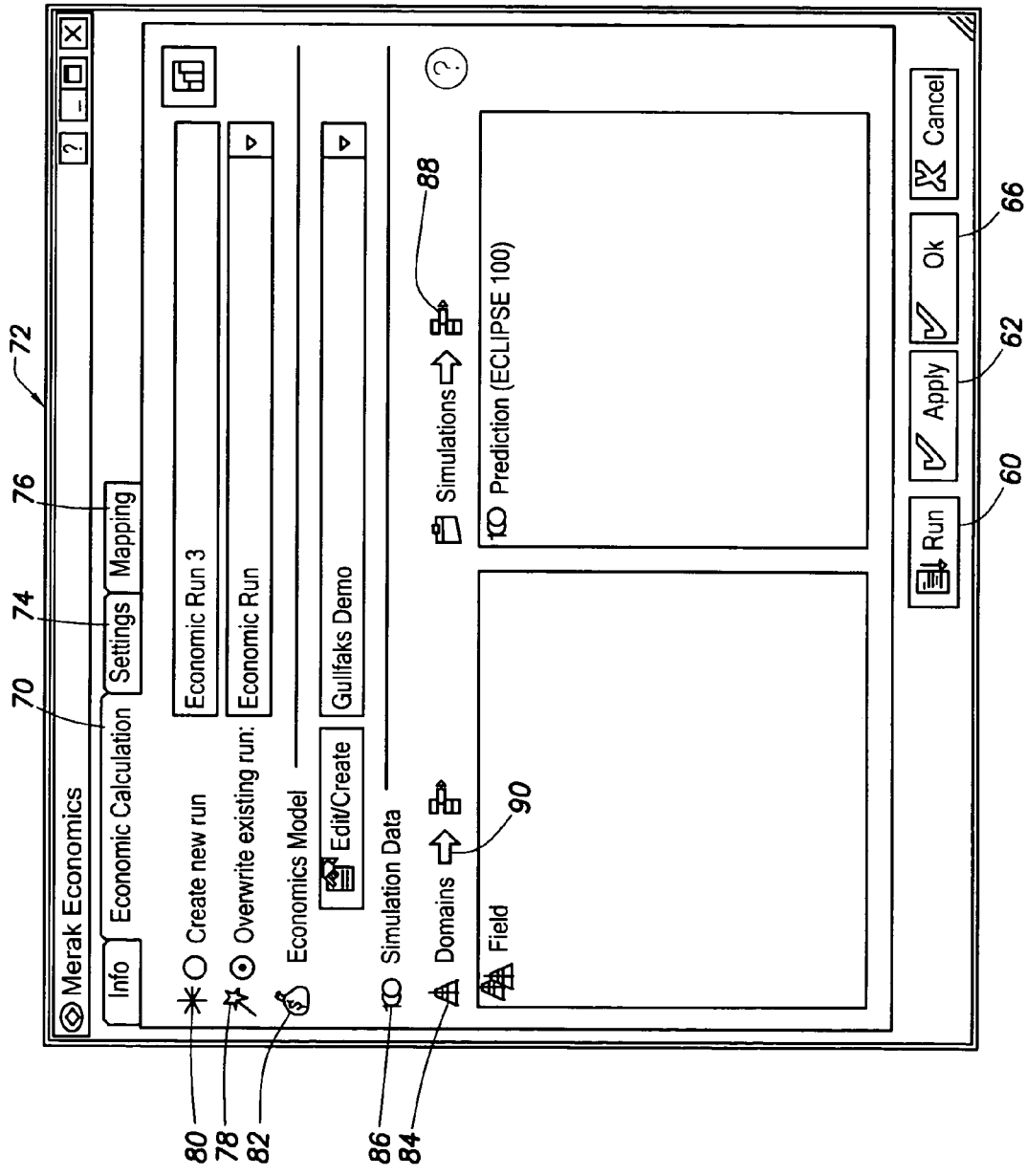

Referring to FIG. 9, use the 'Economic Calculation tab' 70 of the 'Merak Economics dialog box' 72 to define the basic parameters of your calculation, including the economic model that will be used for the calculation, the wells, groups, or field for which the calculation will be performed, and the simulations whose data will be used as inputs for the run.

In FIG. 9, when the 'Merak Economics dialog box' 72 is opened, the last-used run is automatically loaded, and the settings from that run will populate the 'Economic Calculation tab' 70, the 'Settings tab' 74, and the 'Mapping tab' 76. This enables an operator to create a new run, that is similar to a previously created run, by selecting the 'run upon which you want to base your new run', changing it as desired, and then creating a new run based on your changes.

How to Define Basic Economic-Calculation Parameters

Referring to FIG. 9, perform steps (1) through (5) indicated below, as follows:

1. Choose whether you want to create a new run, or overwrite an existing run:
    (a) See the 'Overwrite existing run' option button 78 in FIG. 9: Select this option if you want to base your run on a previous economic-calculation run. When you select this option and choose an economic run from the drop-down list, the 'Economic Calculation' tab 70, the 'Settings tab' 74, and the 'Mapping tabs' 76 are updated with that run's properties.
    At this point you can:
        (1) 'Perform a run using the current settings': this overwrites the results for that run. You may want to do this if the data in the simulations selected for the run has changed since you last performed the economic run, and you want your run to reflect those changes.
        (2) 'Change the selected run's properties as required, and then run it again': the overwrites the previous run results and changing the run's properties. Changes might include adding wells to (or deleting them from) the 'Domains' list, basing your run on a different simulation, basing your run on a different set of drilling costs, etc. When you change a run, its properties are not updated until you click the 'Run' 60, 'Apply' 62, or 'OK' 66 buttons (see above).
        (3) 'Create a new run based on the currently selected run' (see below). Select an existing run whose properties are similar to the new run you want to create. This saves work, minimizing the number of changes you will have to make in order to create the new run.
    (b) See the 'Create new run' option button 80 in FIG. 9: After selecting an existing run (above) and changing its properties on the 'Economic Calculation' tab 70, the 'Settings' tab 74, and the 'Mapping' tab 76 in FIG. 9, select this 'Create new run' option 80 to create a new run based on your changes. Type a name for your new run in the editing field, and then click the 'Run' 60, 'Apply' 62, or 'OK' 66 buttons (see above) to save your new run. When you save a new run, it is added to the 'Overwrite existing run' 78 drop-down list in FIG. 9, and the run upon which it was based remains unchanged.
2. In the 'Economics Model' option group 82 in FIG. 9, choose the economic model upon which you want to base your calculation. If necessary, you can edit a model before selecting it, or create a new model.
3. Specify the identifiers (wells, groups, or field) for which you want to obtain data, by adding them to the 'Domains' box 84 (in the 'Simulation Data' option group 86). A run can be performed for selected wells and/or groups from one or more simulations, or for an entire field.
    The sum of all the production, injection, and drilling/workover outputs for all items in the 'Domains' list 84 is used for an 'economic run'.
    (a) To add identifiers to the 'Domains box' 84, select them from within the 'Identifiers node' in the 'Results tree' in Petrel, and then click the 'Add new input domains ▓button' at the top of the 'Domains box'.
    (b) Tip: To multi-select identifiers from different points in the tree, press and hold the <Ctrl> key, and then select all the desired identifiers. To select all the identifiers between two points, select one, then press and hold the <Shift> key, and select another; the two selected identifiers and all those between them will be selected.
    (c) To remove identifiers from the 'Domains box', select (or multi-select) them, and then click the 'Delete selected rows in the table ▓button' 88.
    (d) While you can perform a run for different combinations of wells or groups, generally you will not combine these identifiers with the 'Field identifier' in the same run. As a result, if you are adding wells or groups to the 'Domains box' 84, you will need to remove the 'Field identifier' before performing the run.
4. Specify the simulations from which you want to obtain data for your economic calculations:
    (a) To add simulations to the 'Simulations box' 86, select them from within any of the case nodes on the 'Cases tree', and then click the 'Add new simulation button' 90 at the top of the 'Simulations box'. You can add all the simulations within a case node by selecting that node and then clicking the 'Add new simulation' button.

(b) If you have performed a calculation on a case, you can also add that calculation to the 'Simulations box' for inclusion in your run.

(c) To remove simulations from the 'Simulations box', select (or multi-select) them, and then click the 'Delete selected rows in the table button' 88.

5. Once you have finished defining your economic-calculation parameters, configure the settings, and define the mappings if desired before running your simulation.

Figure 10:
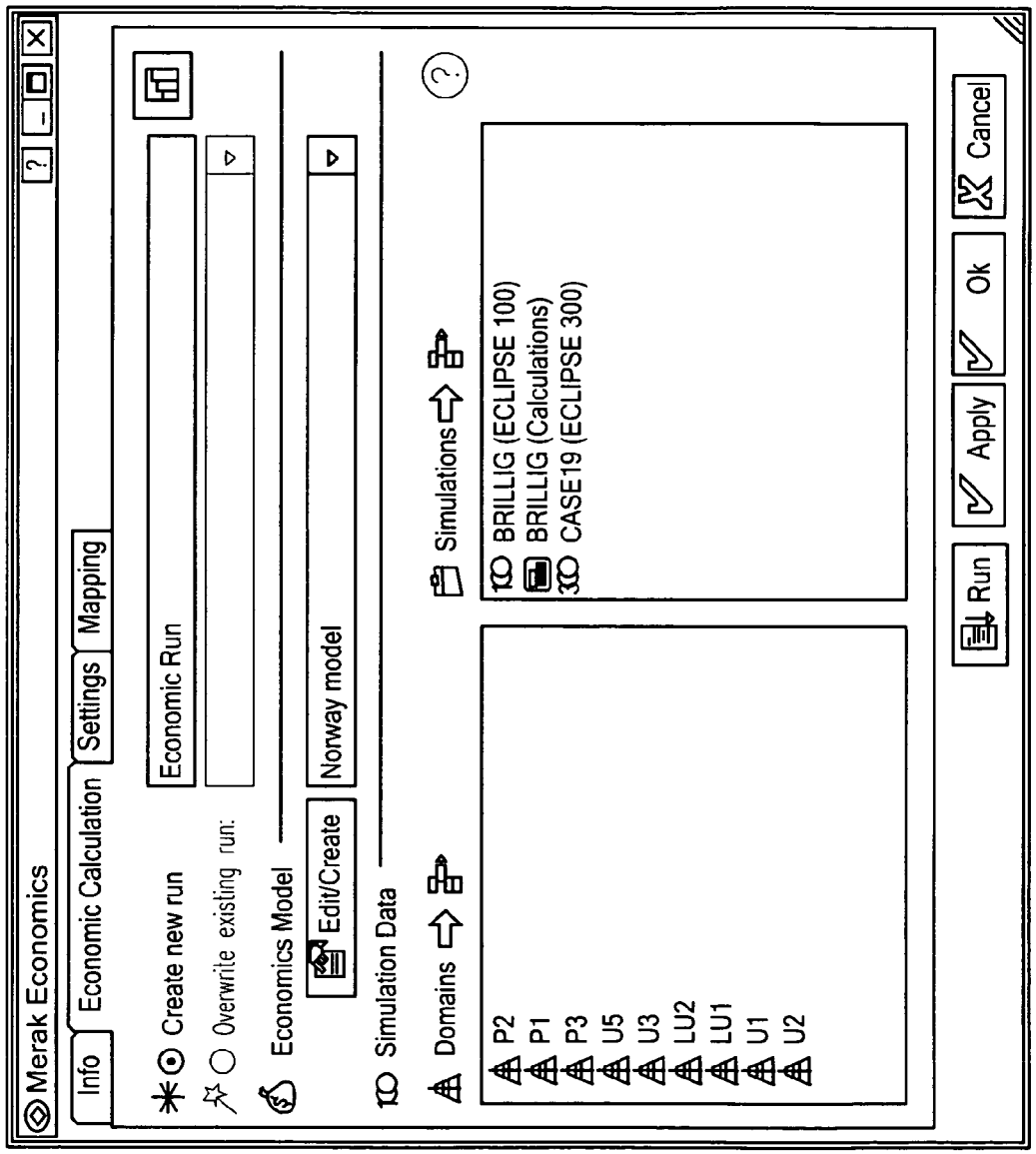

Referring to FIG. 10, in this case, the user has set up an economic run to perform calculations for nine wells, using data from an ECLIPSE 100 simulation, an ECLIPSE 300 simulation, and a calculation. The term ECLIPSE refers to a simulator that is owned and operated by Schlumberger Technology Corporation.

Editing or Creating an Economic Model

Referring to FIGS. 11, 12, 13, 14, and 15, when performing economic calculations, after selecting an economic model, you can view or edit the contents of that model, create a new economic model, or delete a previously created model.

Figure 11:
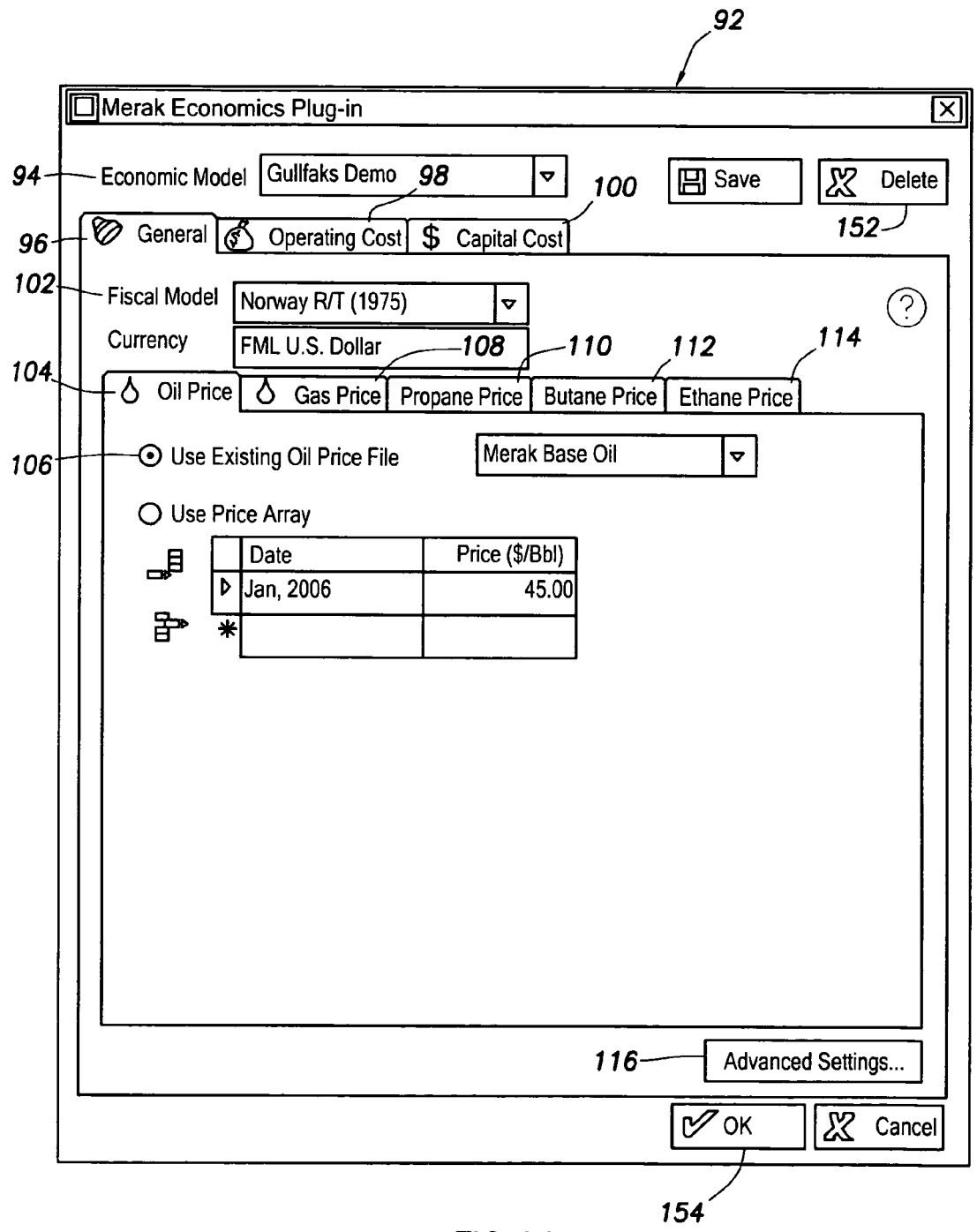

To perform any of these operations, click the 'Edit/Create' button on the 'Economic Calculation tab' of the 'Merak Economics dialog box' to open the 'Merak Economics Plug-in dialog box' 92 as shown in FIG. 11.

How to View the Properties of an Economic Model:

1. In FIG. 11, select the model from the 'Economic Model' drop-down list 94 whose properties you want to view.
2. Click the 'General' 96, 'Operating Cost' 98 or 'Capital Cost' tabs 100 in FIG. 11 to view the data on those tabs.
3. You can edit the values on any of those tabs 96, 98, 100 if desired (see the following pages for details).

Figure 12:
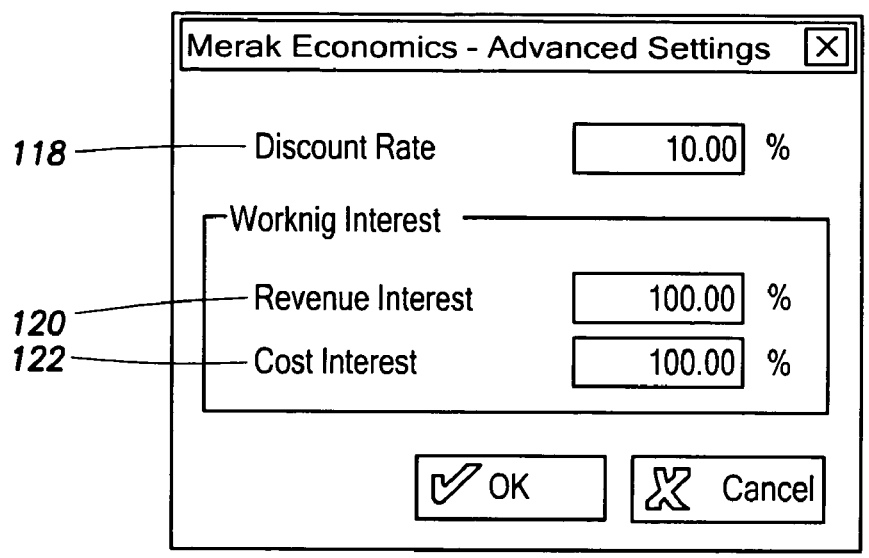

How to Edit the Properties of an Economic Model:

1. Select the model from the 'Economic Model' drop-down list 94 in FIG. 11 whose properties you want to edit.
2. Click the 'General tab' 96 in FIG. 11.
   (a) Select the desired fiscal model from the Fiscal Model 102 drop-down list, which contains a list of models representing over 100 fiscal regions, defining how the royalty, tax rates, etc., vary for each one.
   (b) On the 'Oil Price' tab 104, select the 'Use Existing Oil Price File' 106 option button if you want to base the oil prices in your model on a saved oil-price file. Then select the desired price file from the drop-down list.
      1) If price files are not available (or if you want to create a custom price array), select the 'Use Price Array' option button, and then create an array by clicking the first row in the 'Date' column, then choosing the desired month and year. Then type a price value for that month. Continue until you have added all the desired prices to your array.
   (c) In FIG. 11, on the 'Gas Price', 'Propane Price', 'Butane Price', and 'Ethane Price' tabs 108, 110, 112, and 114 of FIG. 11, set up prices in the same way as you did for oil prices via 'Oil Price' tab 104.
   (d) In FIG. 12, click the 'Advanced Settings' button 116 to open the 'Advanced Settings' dialog box as shown in FIG. 12.
   (e) In FIG. 12, in the 'Discount Rate' field 118, type the discount rate percentage that you want to use for economic calculations or analysis;
   (f) In the 'Revenue Interest' field 120, set the Net-Profit working-interest percentages for your asset (for U.S. and Canadian regions only);
   (g) In the 'Cost Interest' field 122, set the operating-cost and all other capital-cost interest percentages for your asset (this assumes that you will be using the same percentage for all of these interests).

3. In FIG. 11, click the 'Operating Cost' tab 98, and refer now to FIG. 13.
   (a) In FIG. 13, in the 'Fixed Operating Cost' option group 124, specify fixed operating costs for each active producer or injector well per month. Also add any other fixed operating costs on a per-month basis (this could be for a well, a group, or a field).
   (b) In FIG. 13, in the 'Variable Operating Cost' option group 126, specify the operating costs for oil, gas, water, or injection, on a per-production-unit basis.
   (c) In FIG. 13, in the 'NGL Operating Cost' option group 128, specify the operating costs for propane, butane, or ethane, on a BOE basis.

Figure 13:
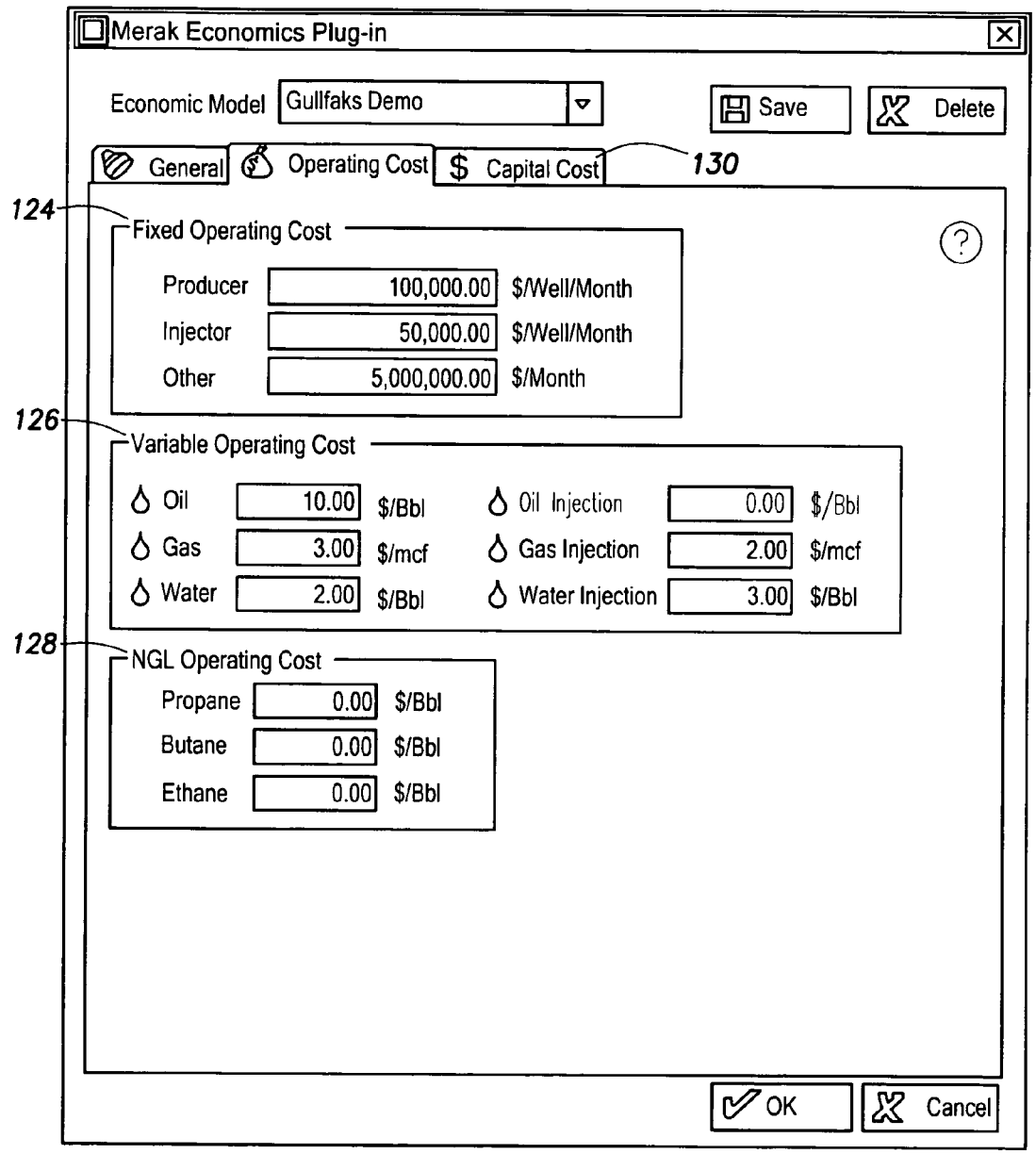

4. In FIG. 13, Click the 'Capital Cost' tab 130 to specify your capital expenditures, and refer now to FIG. 14.
   (a) In FIG. 14, click the first row in the 'Date' column 132, then choose the desired month and year for your first expenditure.
   (b) In the 'Amount' column 134, specify the amount of the expenditure.
   (c) Click the drop-down list in the 'Type' column 136 and choose a cost type. This is important because it determines how this cost will be treated in economic calculations (e.g., equipment depreciation or expensed capital items). Capital types can vary between fiscal regions. The day of the month which the cost is incurred does not matter for economic calculation purposes.
   (d) Use the 'Drilling' and 'Workover' fields 138 and 140 in FIG. 14 to input any drilling or workover costs on a per-well basis. Take the total costs and determine average values, and then input them here. These costs are multiplied by the number of drilling/workover events in a given period (monthly, quarterly, semi-annually, or annually) in order to complete additional capital expenditures over that period. This is in addition to any costs incurred in the 'Capital Expenditure' grid 142 in FIG. 14.

Figure 15:
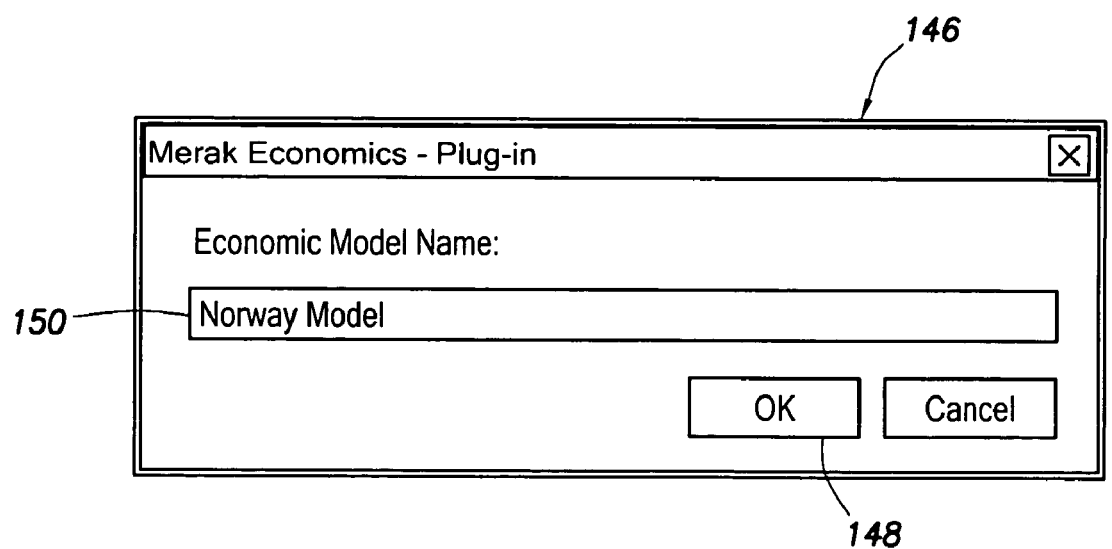
Figure 14:
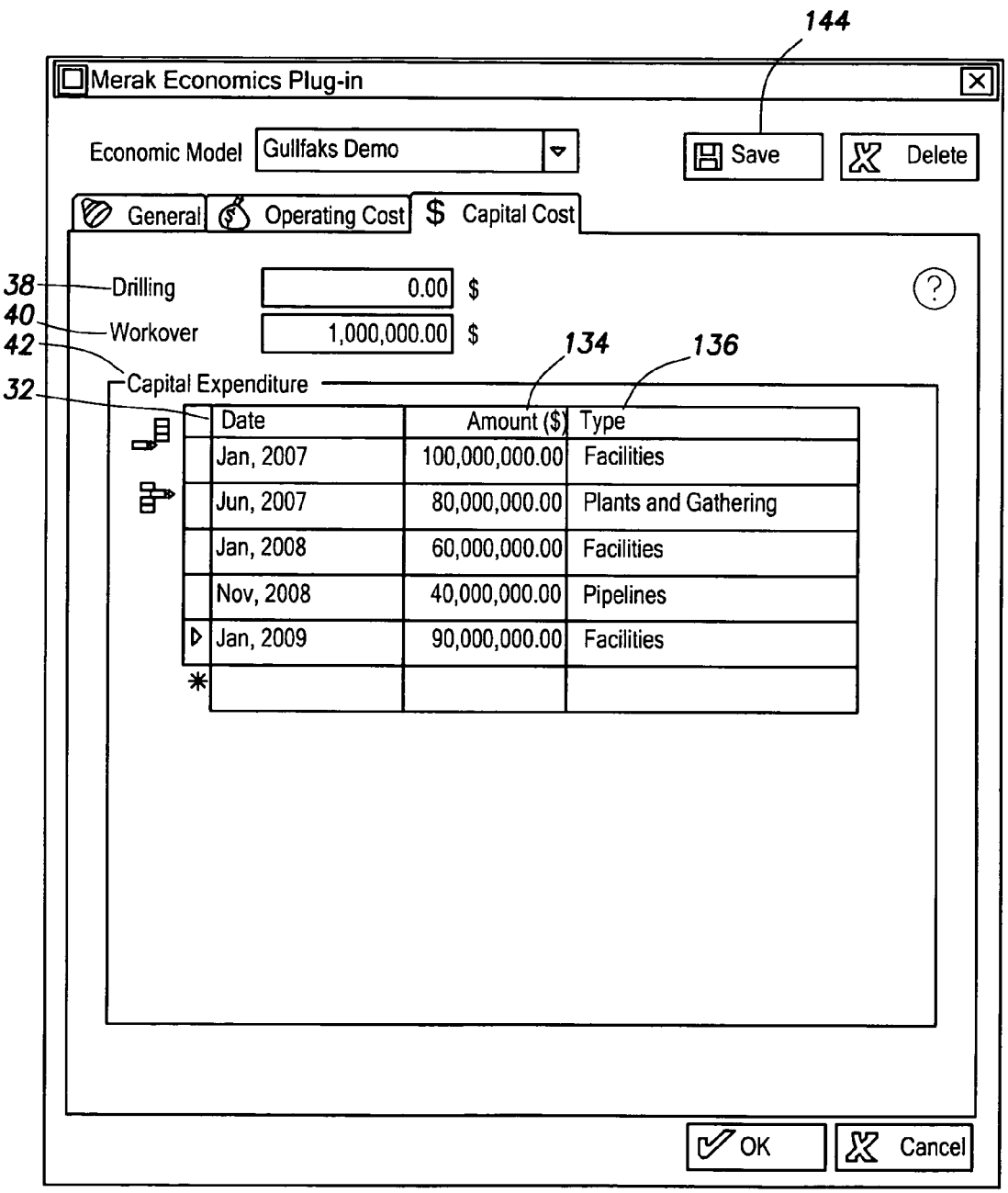

5. In FIG. 14, when you have finished editing the model, click 'Save' 144 to save the changes.
6. In FIG. 15, in the 'Merak Economics Plug-in' pop-up dialog box 146, click 'OK' 148 to save the changes to the current model, or type-in a different name, in field 150, to create a new model based on your changes.

How to Create a New Economic Model:

1. Working in the 'Merak Economics Plug-in' dialog box 92 of FIG. 11, select the model from the 'Economic Model' drop-down list 94 in FIG. 11 upon which you want to base your new model.
2. Edit the selected economic model, if desired (see above), as discussed above with reference to FIGS. 11 through 14 of the drawings.
3. Click the 'Save' button 144 of FIG. 14.
4. In the 'Merak Economics Plug-in' pop-up dialog box 146 of FIG. 15, type the desired name for your new model, and then click 'OK' 148. The new model is added to the 'Economic Model' drop-down list 94 of FIG. 11 on the 'Economic Calculation' tab 70 in FIG. 9 in the 'Merak Economics' dialog box 72 of FIG. 9.

How to Delete an Economic Model:
1. In FIG. 11, working in the 'Merak Economics Plug-in' dialog box 92 of FIG. 11, select the desired 'economic model', from the 'Economic Model' drop-down list 94 in FIG. 11, that you want to delete.
2. Click the 'Delete' button 152 in FIG. 11. A 'Merak Economics pop-up message' asks you to confirm the deletion.
3. Click 'OK' 154 in FIG. 11 to delete the model.

Figure 16:
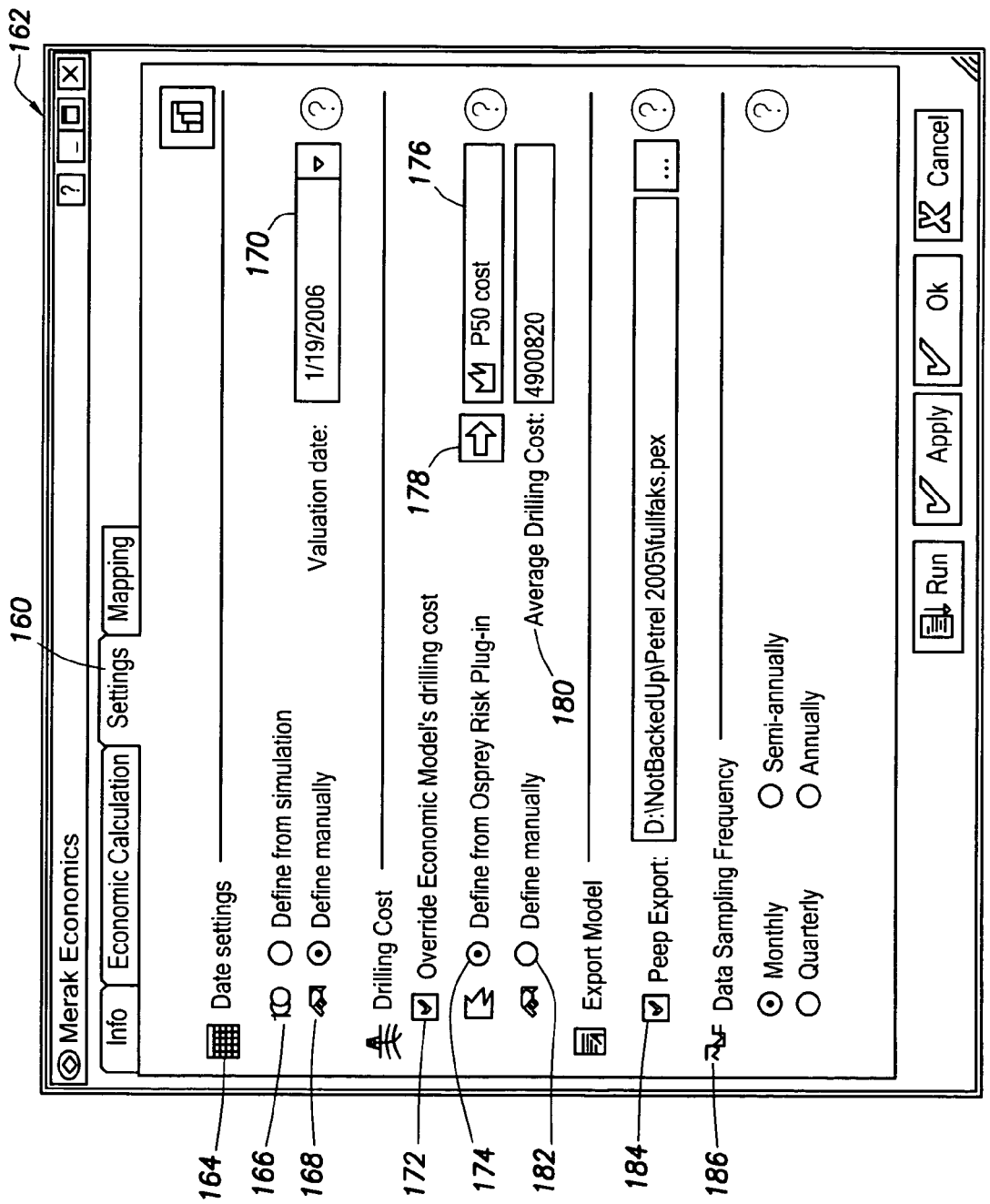

Configuring Settings for an Economic Calculation
Refer now to FIG. 16.
In FIG. 16, use the 'Settings' tab 160 of the 'Merak Economics dialog box' 162 to configure the settings for your economic calculation. This includes defining the start date of your calculations, choosing how drilling costs will be defined, setting up 'Peep' Export file parameters if desired, and choosing the data-sampling frequency for your simulation.

How to Set when You want Calculations to Start for an Economic Run:
In FIG. 16, each simulation has its own start date, and each data-set also has its own start date. The 'Date Setting' option group 164 can be used to define the 'date' from which you want data passed for an economic run—there are two options:
1. In FIG. 16, the 'Define from simulation' option 166: When this option is selected, the run looks at the first result output date from the simulation.
2. In FIG. 16, the 'Define manually' option 168: When this option is selected, the 'Valuation Date' drop-down calendar 170 can be used to set a start date. In this case, the calculation engine takes data starting from the 'selected date' which appears in the 'valuation date' field 170 of FIG. 16, and then the calculation engine uses the data from that 'selected date' forward to calculate the value for the first month.

How to Override the Economic Model's Drilling Costs:
Normally, drilling costs come from the 'economic model', and these are defined on the 'Capital Cost' tab 100 of FIG. 11 of the 'Merak Economics Plug-in' dialog box 92. One can 'override' these drilling costs, if desired, and replace them with other costs from the 'Osprey Risk Plug-in', or replace them with an 'average cost' that can be defined.

In FIG. 16, in order to 'override' these drilling costs, select the 'Override Economic Model's drilling cost' check box 172 in FIG. 16, and then:
1. In FIG. 16, select the 'Define from Osprey Risk Plug-in' option button 174 in FIG. 16 in order to use 'Osprey Risk Plug-in' costs. After selecting this option, go to the 'Input tree' 176 in FIG. 16 and open the node for a well that has an 'Osprey Risk well log', and select either a 'P90' Cost, 'P50' Cost, or a 'P10' Cost log, and then click the 'Add well log ▓button 178 in FIG. 16 in order to use the drilling cost from that log (this is obtained by looking at both ends of the well log and using the larger of the two values it finds). When an 'Osprey Risk well log' is selected, the drilling cost for that well is displayed in the 'Average Drilling Cost' field 180, and this value is used for every well in the run.
2. In FIG. 16, select the 'Define manually' option button 182 to input your own drilling cost. When this is selected, the 'Average Drilling Cost' field 180 becomes available; and, at that case, type an 'average drilling cost' value in field 180 that will be used for every well in the run.

When the 'Merak Economics' Process is run from the 'Workflow Editor', a variable name can be entered (that was previously defined in the workflow) as your Average Drilling Cost value. The 'Merak Economics' Process will then look for the value associated with that variable, and use it in the calculation. See the 'Using the Merak Economics process within the Workflow Editor' section below for more information.

How to Send Results of an Economic Run to a Petroleum Economics Evaluation Product (Peep) Export (PEX) File:
In FIG. 16, select the 'Peep Export' check box 184, and then specify the path and name of the Peep Export (*.pex) file into which you want to add the economic run. The 'Merak Economics Process' will create the 'Peep Export file', which you can then import into 'Merak Peep' for analysis. In addition, 'Peep Export' files generated from 'Merak Peep' can be imported back into the Merak Economics Process.

How to Set the Data-Sampling Frequency:
In FIG. 16, working in the 'Data Sampling Frequency' option group 186, select one of the option buttons to define the frequency at which input data is sampled from simulations. If the sample frequency is larger than the frequency of input data, then the result will be less accurate.

Figure 17:
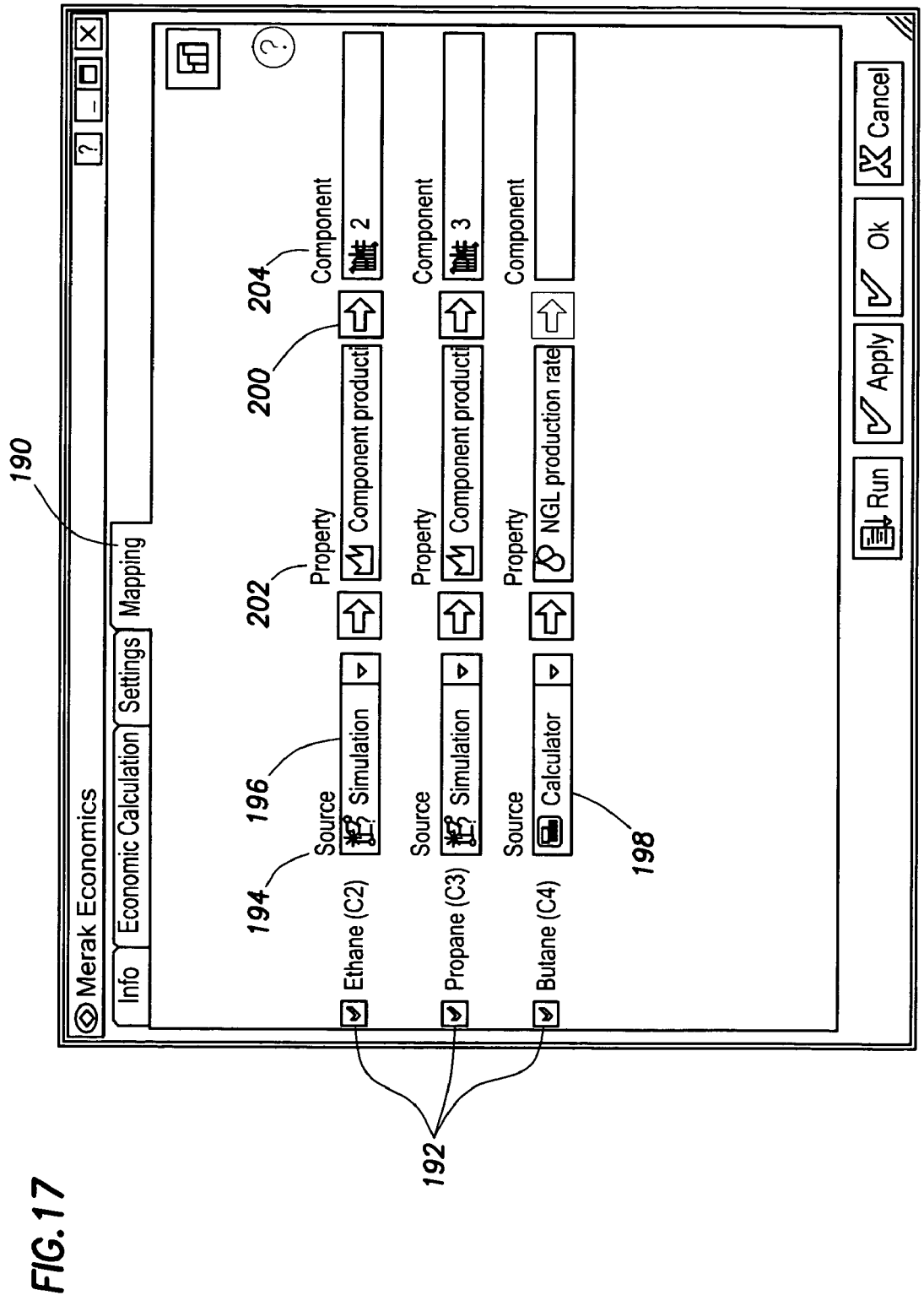
Figure 18A:
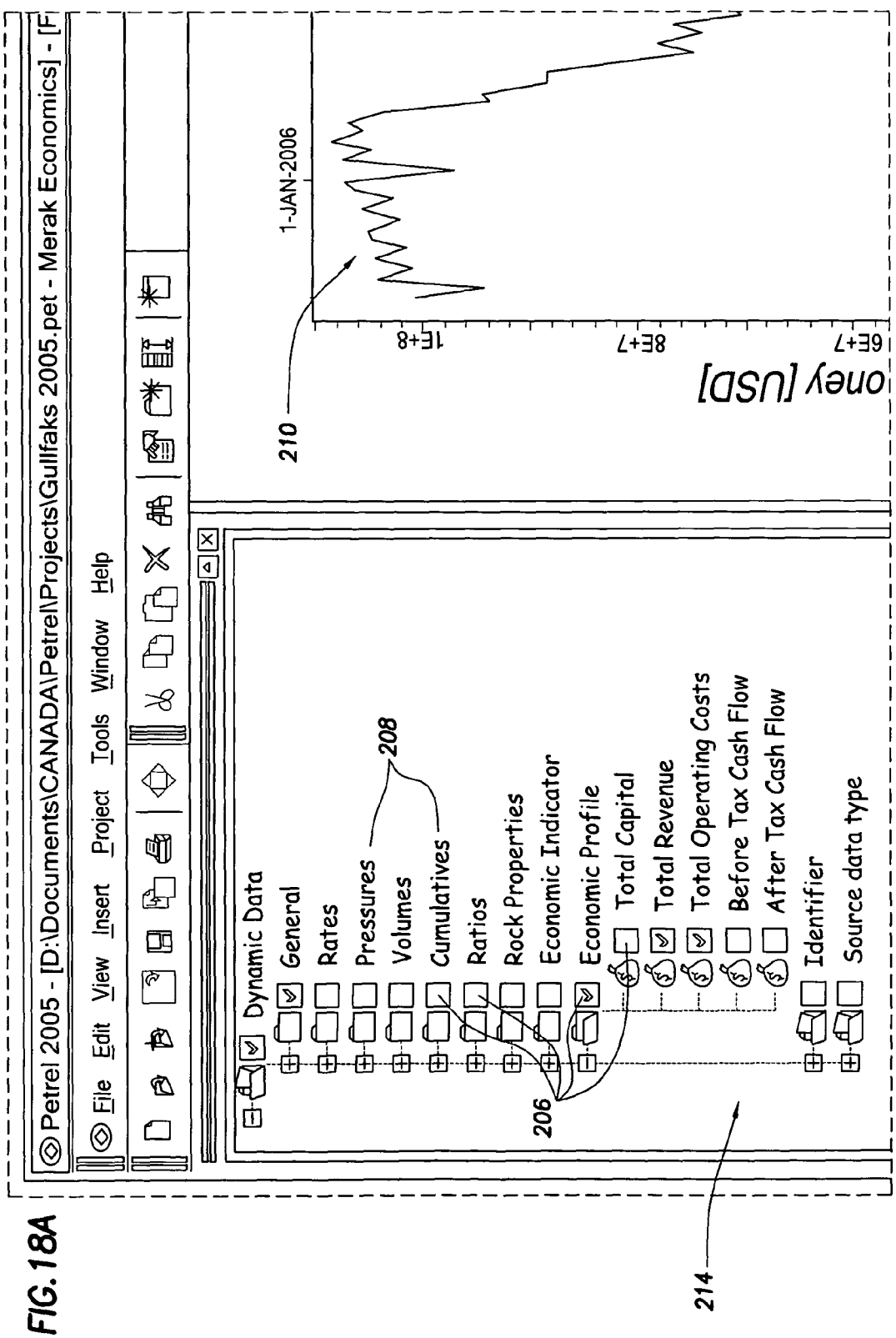
Figure 18B:
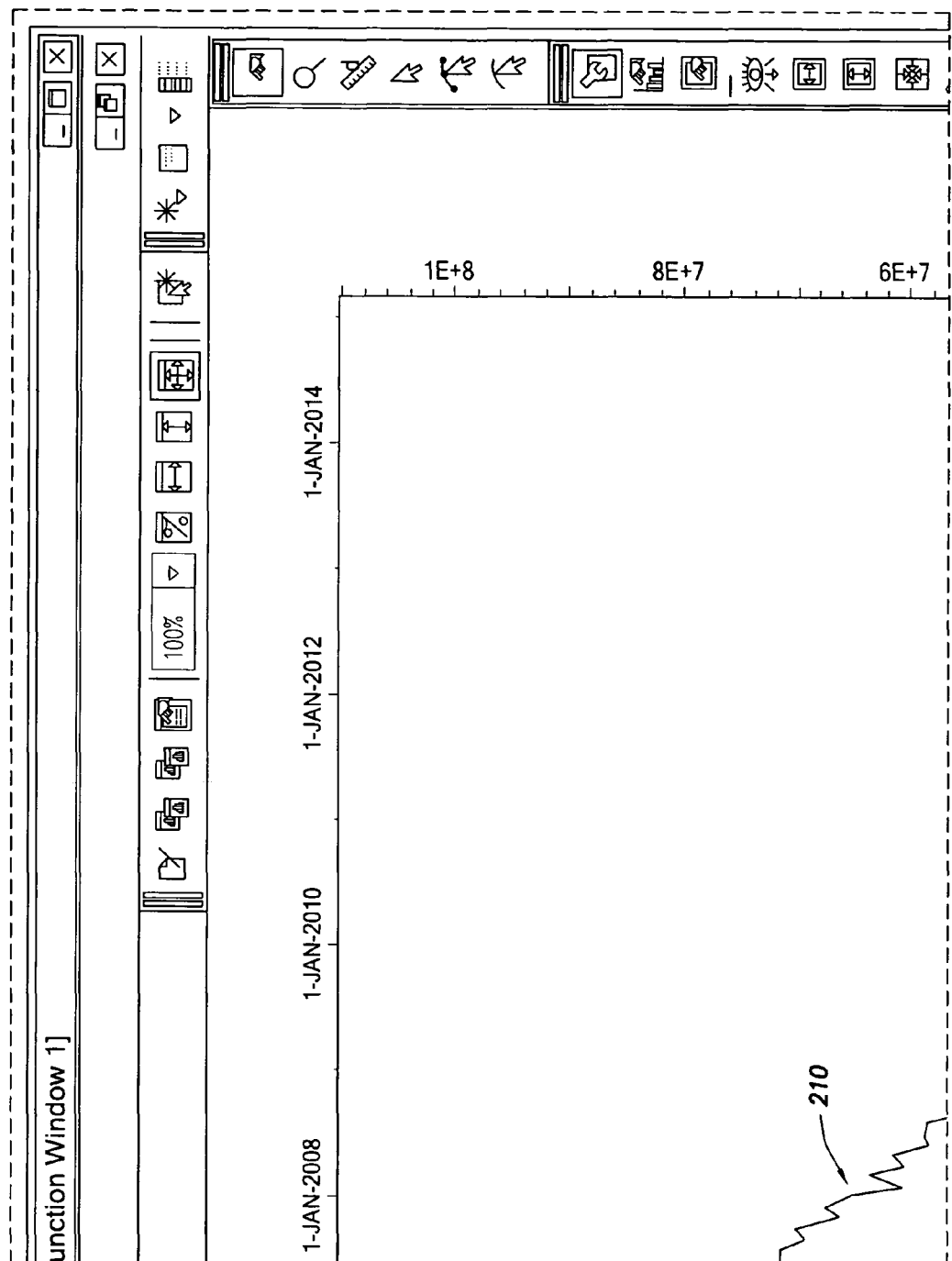
Figure 18C:
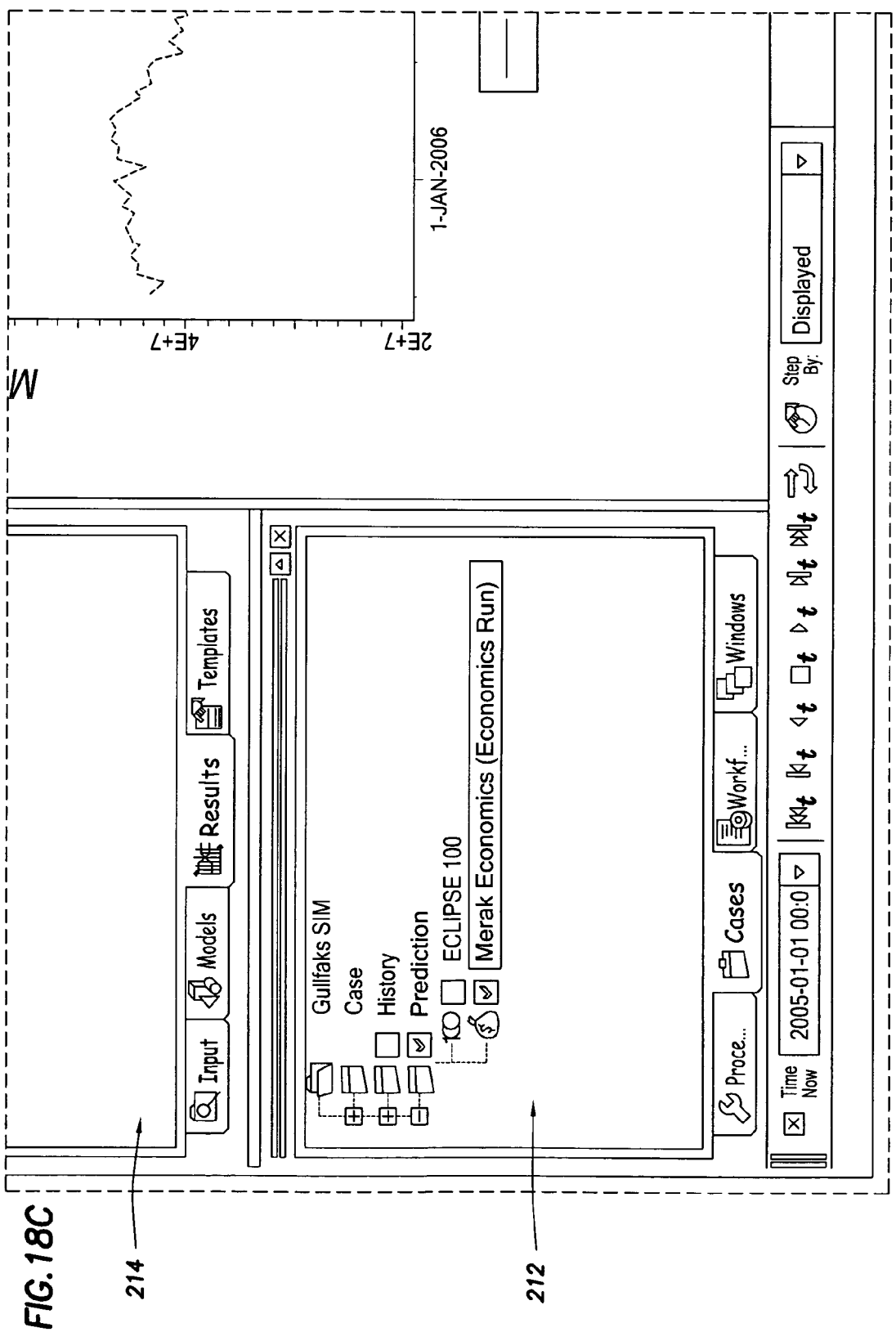
Figure 18D:
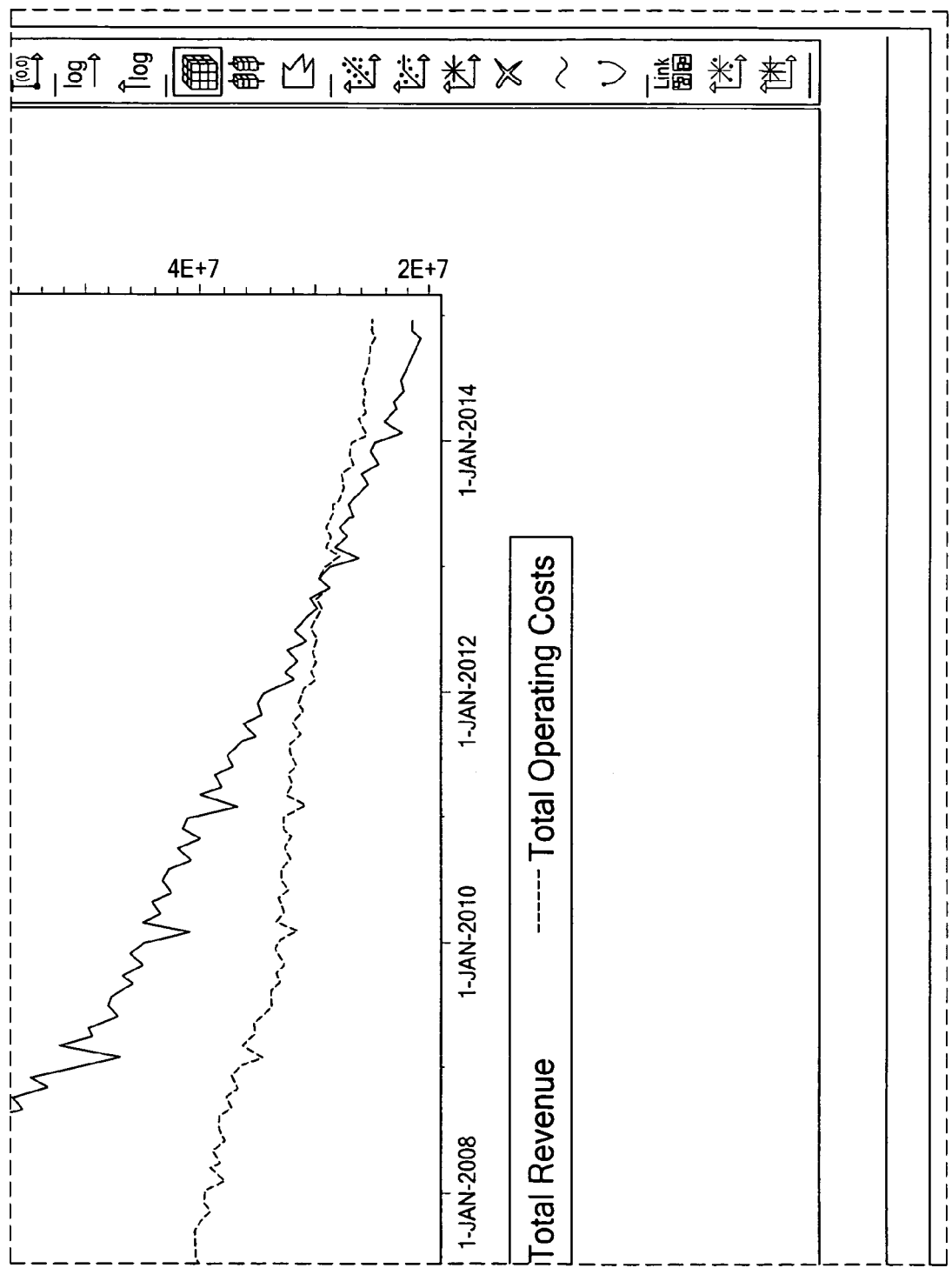

Defining Mappings for Ethane, Propane, and Butane
Referring to FIG. 17, some by-products are frequently recovered as part of field operations. Examples of these include Natural Gas Liquids (NGLs) and condensate. It is common practice to establish the volume of NGLs recovered by applying various empirical formulae, using the Dynamic Data Calculator. The results of these calculations may then be used on the 'Mapping' tab 190 of FIG. 17 to account for the economics associated with NGLs.

If desired, the outputs from 'production streams', that you will use to represent Ethane, Propane, and Butane, can be specified. This process is optional, and is only required if NGLs are present in your recovery stream.

How to Map NGLs to Production Outputs:
1. In FIG. 17, select the check box 192 adjacent to the natural gas liquid for which you want to create a mapping (e.g., Ethane (C2)).
2. Select a simulation or calculation result from Petrel's 'Cases' tree. When you select the check box next to the simulation or calculation name, any properties associated with that simulation or calculation become available in the 'Results' tree.
3. In the 'Source' drop-down list 194, select 'Simulation' 196 or 'Calculator' 198 to define the type of property you will be using.
4. In the 'Results' tree, select the name of the property that you want to use to represent the current NGL.
5. Click the 'Add property' ▓button 200 on the current row to populate the 'Property' field 202 with the property that you selected in step 4.
   (a) If the property that you added is non-component-based (e.g., NGL production rate), then that rate will be used to represent the NGL.
   (b) If the property that you added is component-based, then the 'Component' field 204 becomes available, and you will need to select a component to represent the NGL (next step).
6. If the property that you added was component-based, select a fluid from within the 'Fluid Identifiers' node in the 'Results' tree, and then click the 'Add component' button 200 to add the selected component to the 'Component' field 204.

7. Repeat the previous steps to map NGLs to any other production outputs.

Visualizing the Results of Economic Calculations

Figure 19:
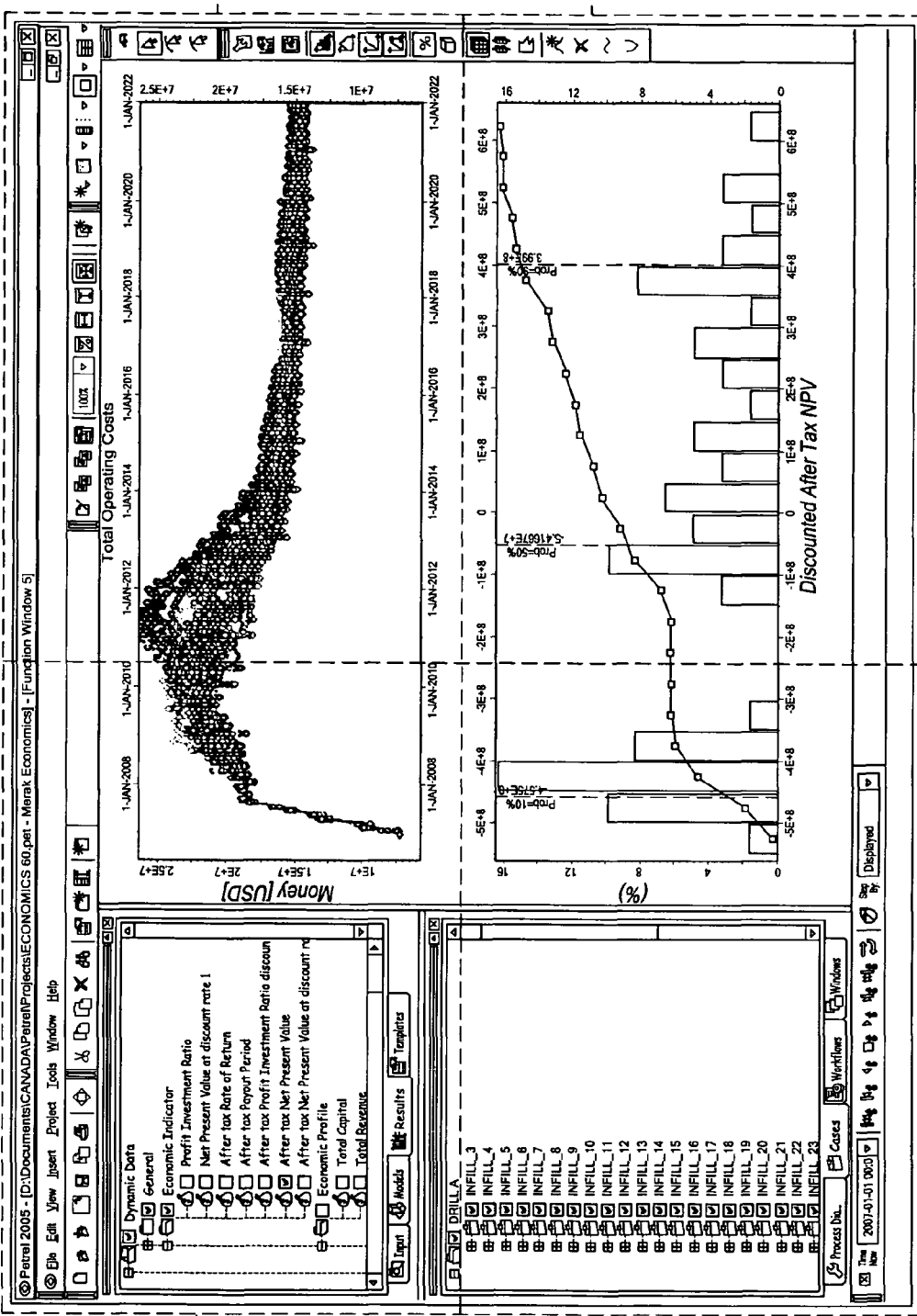
Figure 19A:
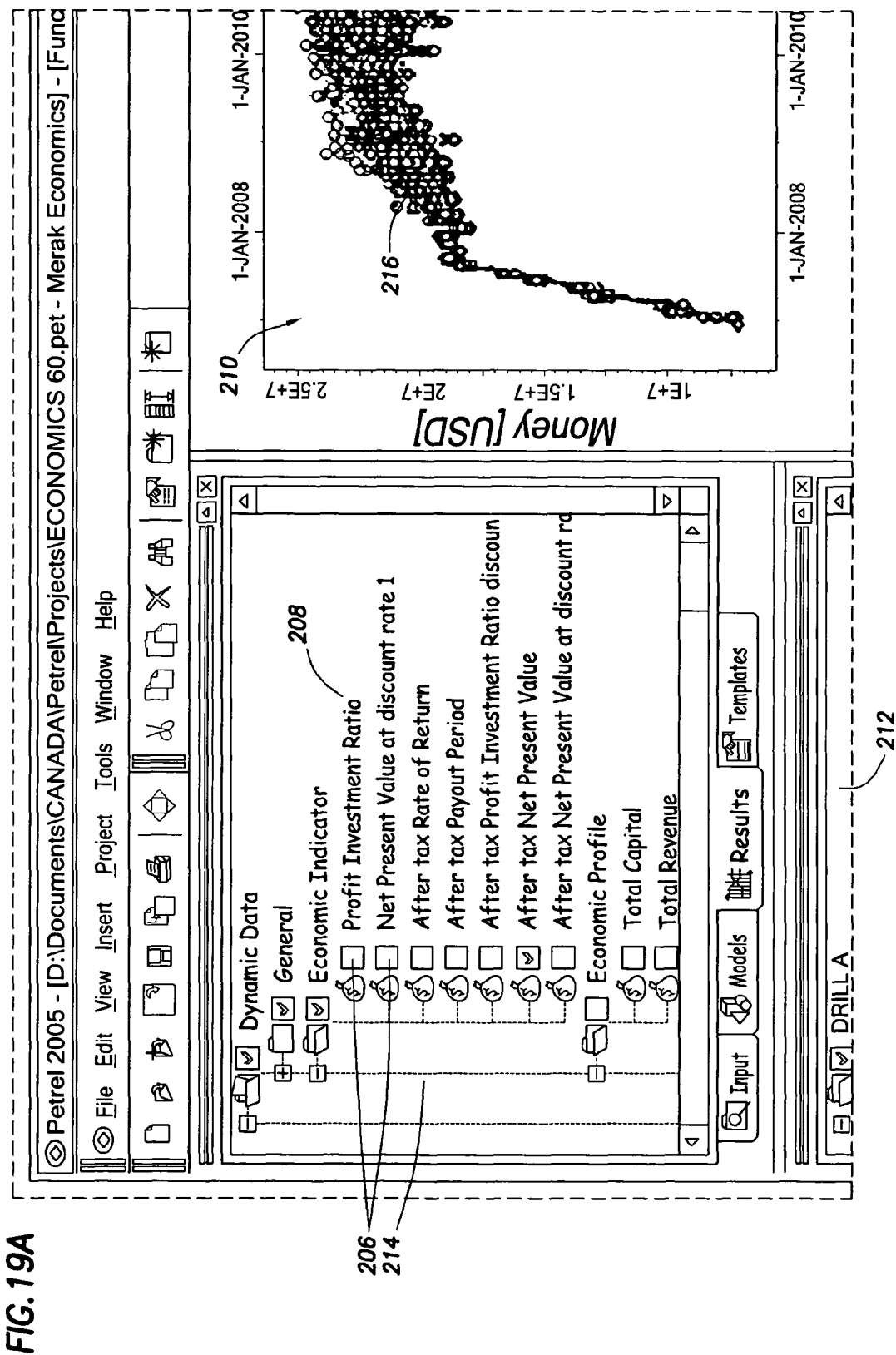
Figure 19B:
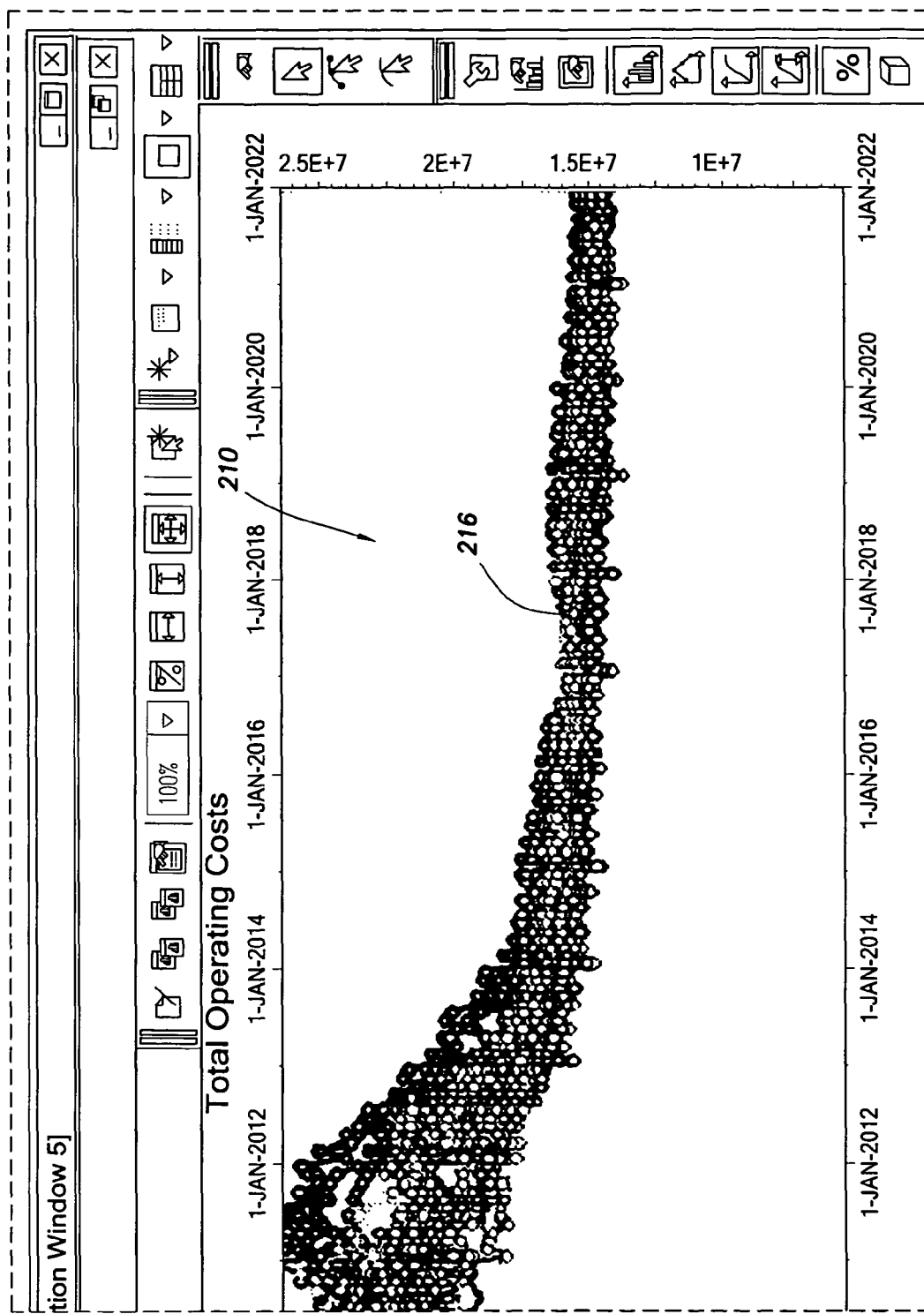
Figure 19C:
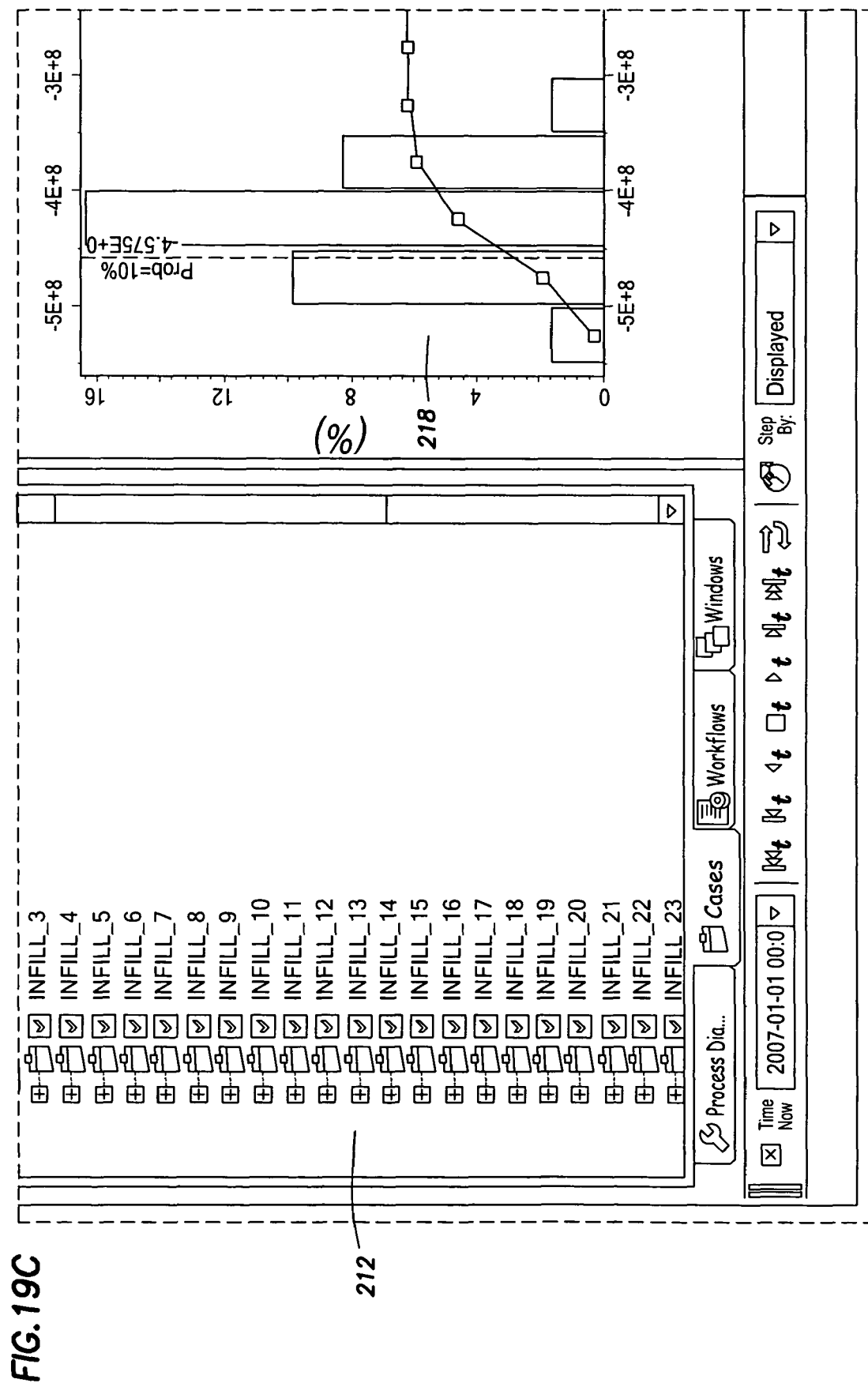
Figure 19D:
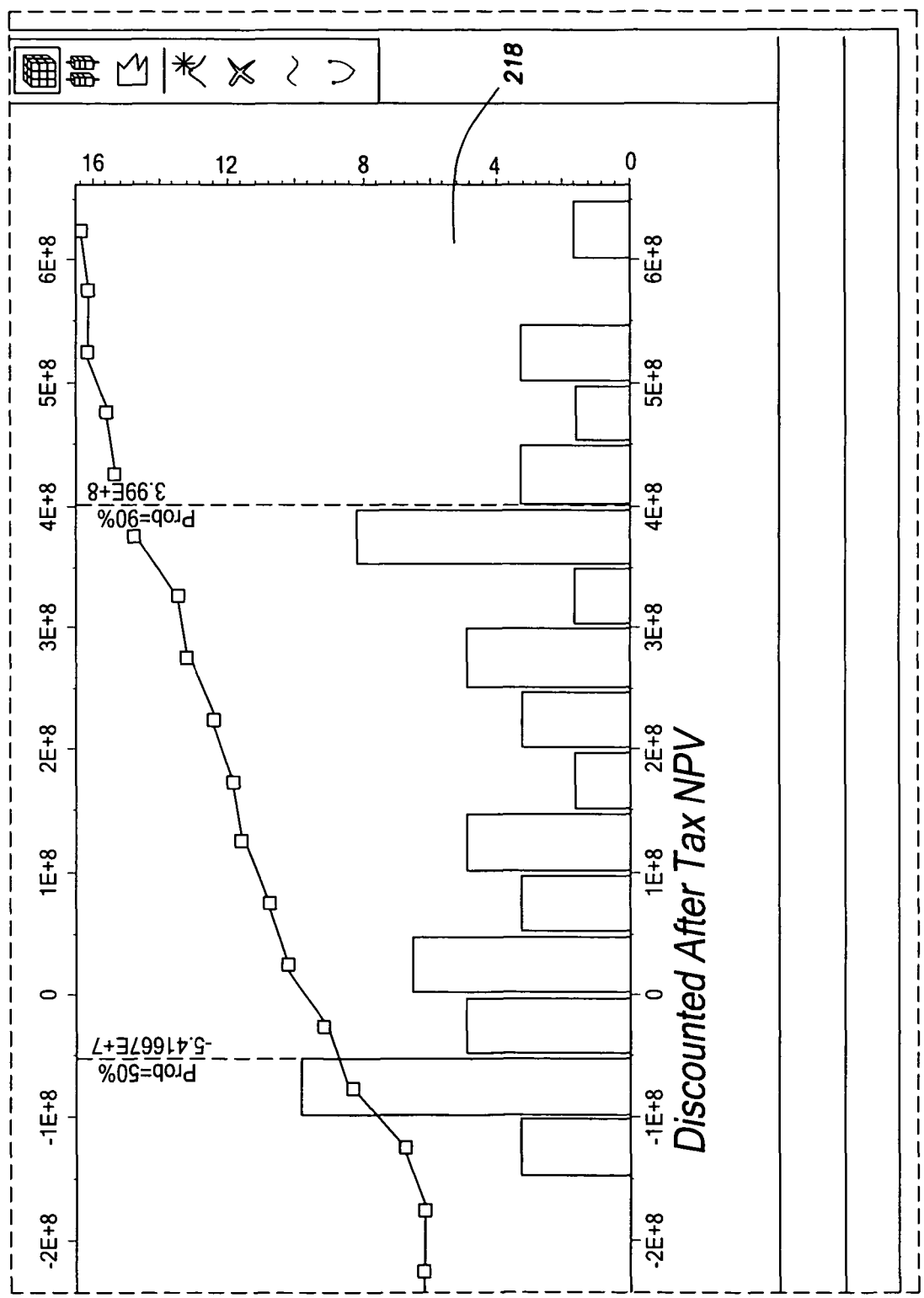

Referring to FIGS. 18 and 19, after running an 'economic calculation', the results are stored in the 'Economic Indicator' and 'Economic Profile' folders in the 'Results tree'.

How to View Results of Economic Calculations:

1. In FIGS. 18 and 19, select the check box(es) next to the desired economic run(s) on the 'Cases tree' 212. Any associated indicators, profiles, or rates will become available on the 'Results tree' 214 (the names of those that are unavailable are grayed-out).

2. In FIGS. 18 and 19, select the check boxes 206 next to the desired indicators or profiles 208 to view them in the current view 210 as shown in FIGS. 18 and 19.

In FIG. 18, the user is viewing total revenue and operating costs for a field.

In FIG. 19, the user is viewing the total operating costs 216 for a series of simulations in the graph on the top 216, and a histogram 218 representing discounted after-tax NPV on the bottom 218.

Using the Merak Economics Process within the Workflow Editor

The 'Economics Process' can be used inside the 'Workflow Editor' to automate the generation of economic results. In addition, it provides facilities for maintaining an audit trail to understand who did what, when and how. It also forms the basis as to how uncertainty in economic parameters (e.g., drilling capital costs or oil price) can be modeled efficiently. The following examples illustrate the use of the 'Economics Process' in the 'Workflow Editor'.

EXAMPLE 1

Running the Economics Process Once Over a Set of Cases

Figure 20:
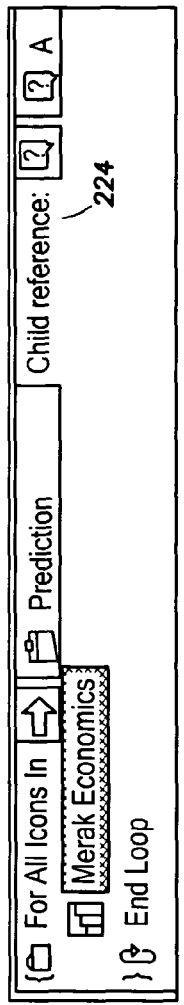
Figure 21:
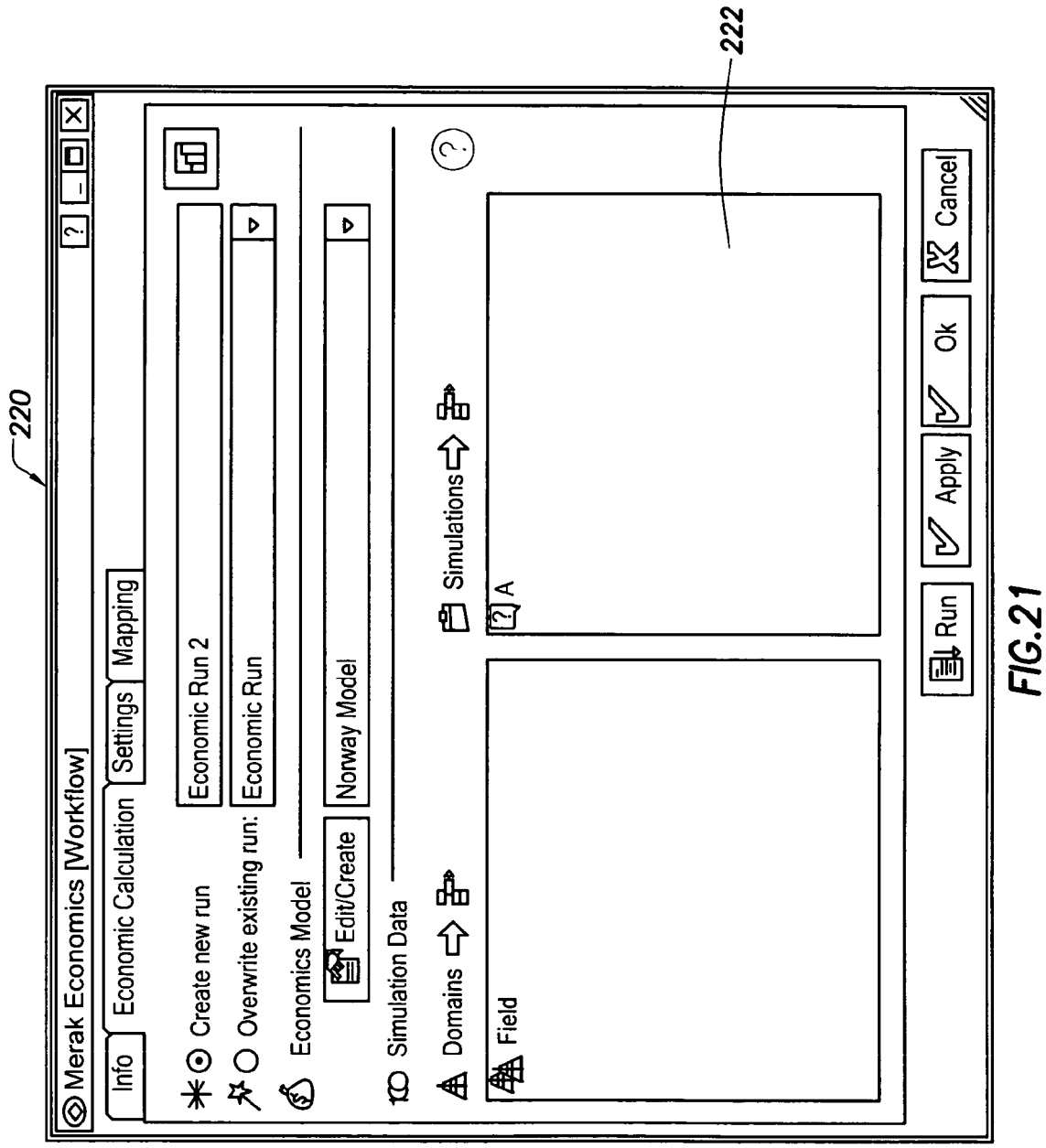

Referring to FIGS. 20 and 21, this example shows how to generate an 'economic run' for every case within a folder (e.g., after running an Uncertainty Workflow).

In FIGS. 20 and 21, the 'Economics dialog box' 220 in FIG. 21 from within the 'Workflow' of FIG. 20 will look like the example shown in FIG. 21. Note that the 'simulation' in the 'Simulations box' 222 of FIG. 21 corresponds to the 'variable name' in the 'Child reference field' 224 of the 'Workflow Editor' as shown in FIG. 20.

EXAMPLE 2

Running Several Merak Economics Processes Per Case

Figure 22:
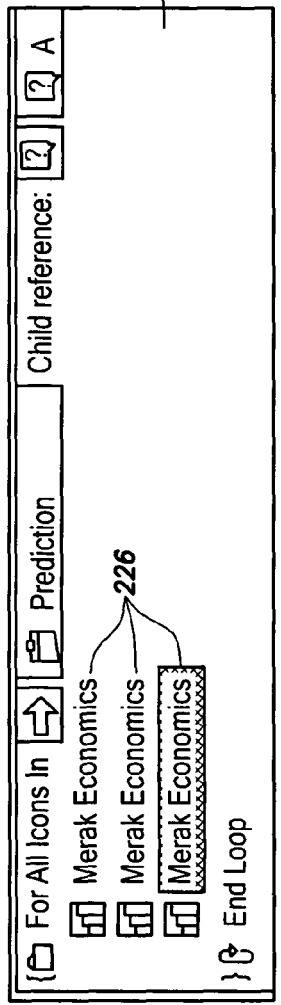
Figure 23:
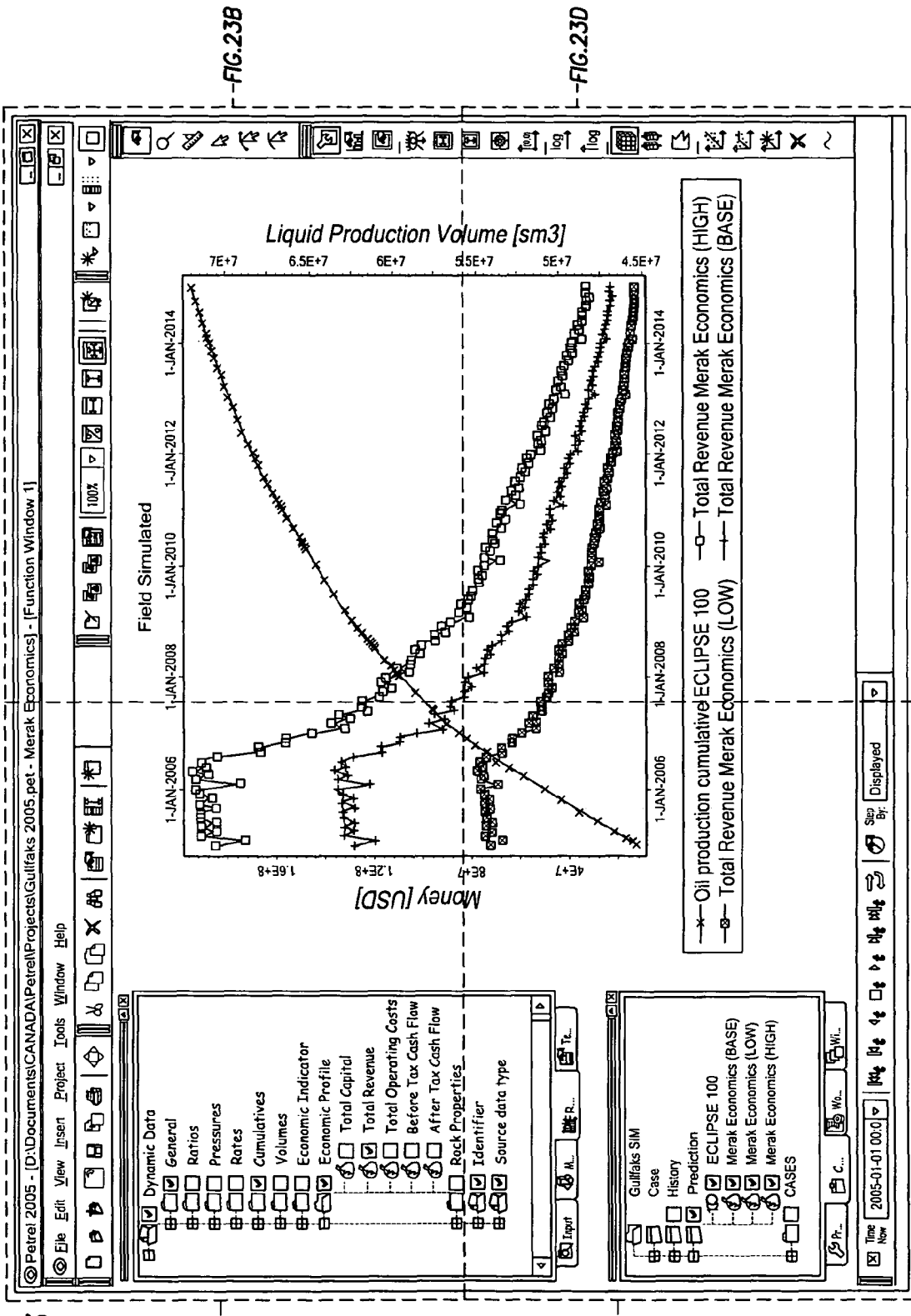
Figure 23A:
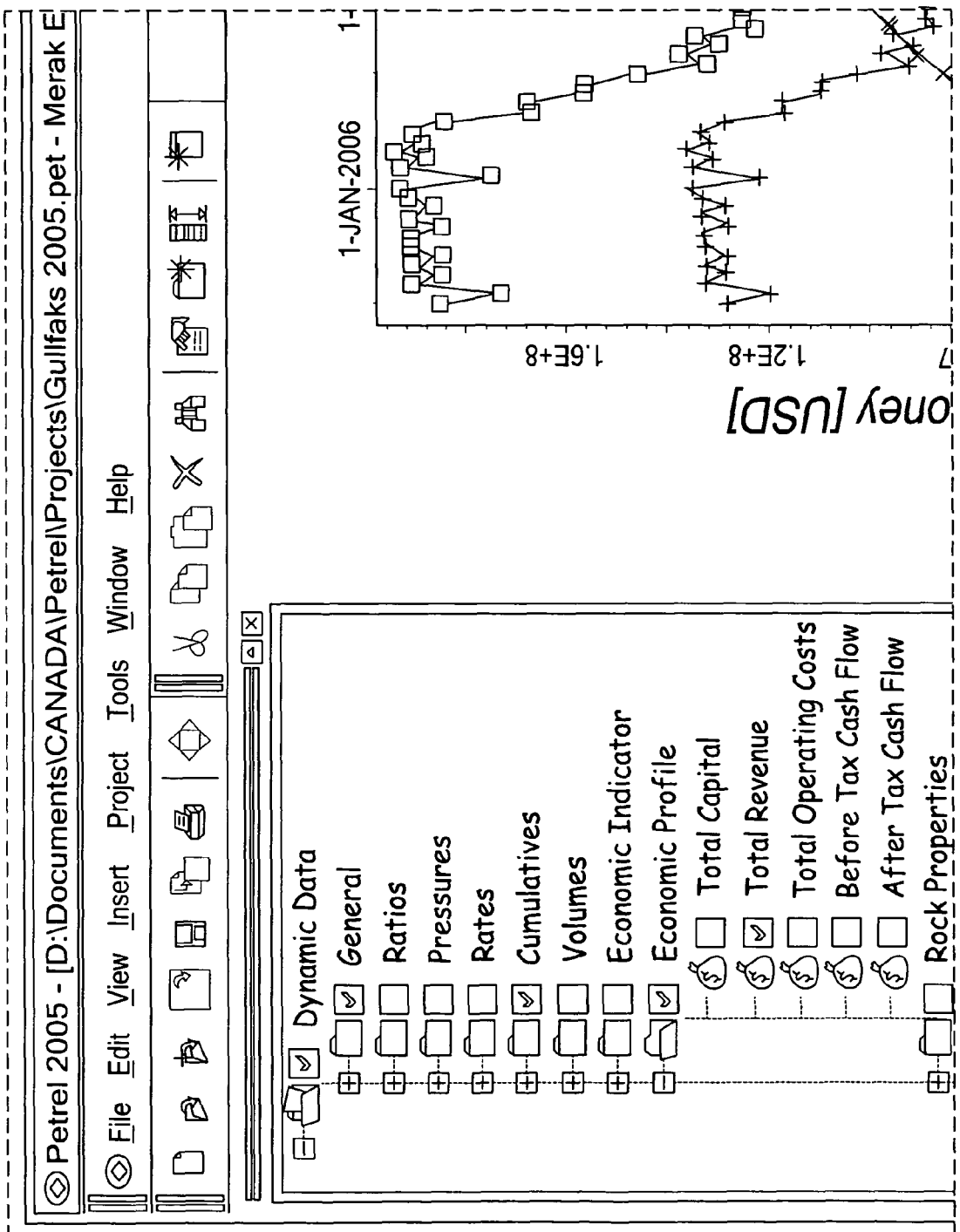
Figure 23B:
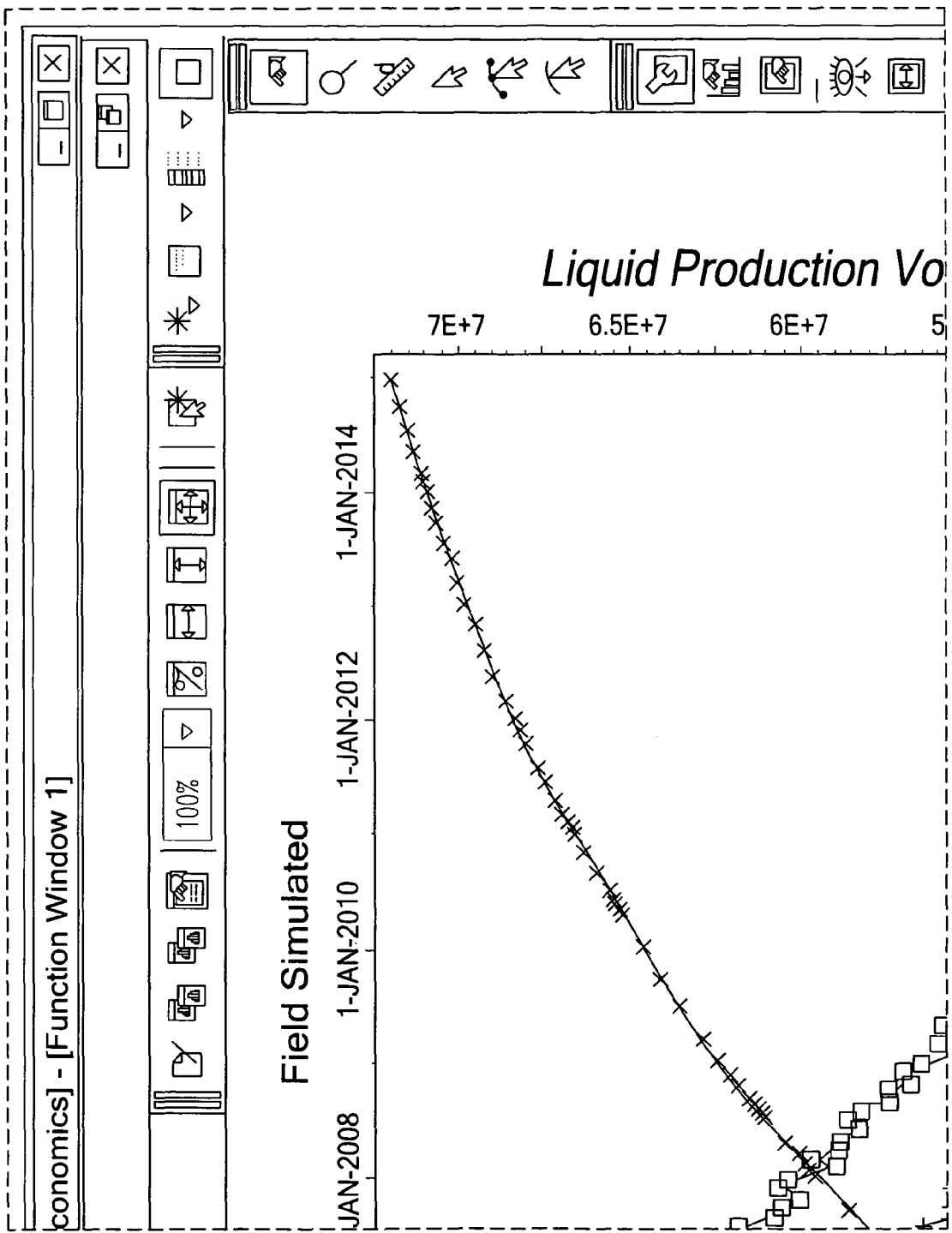
Figure 23C:
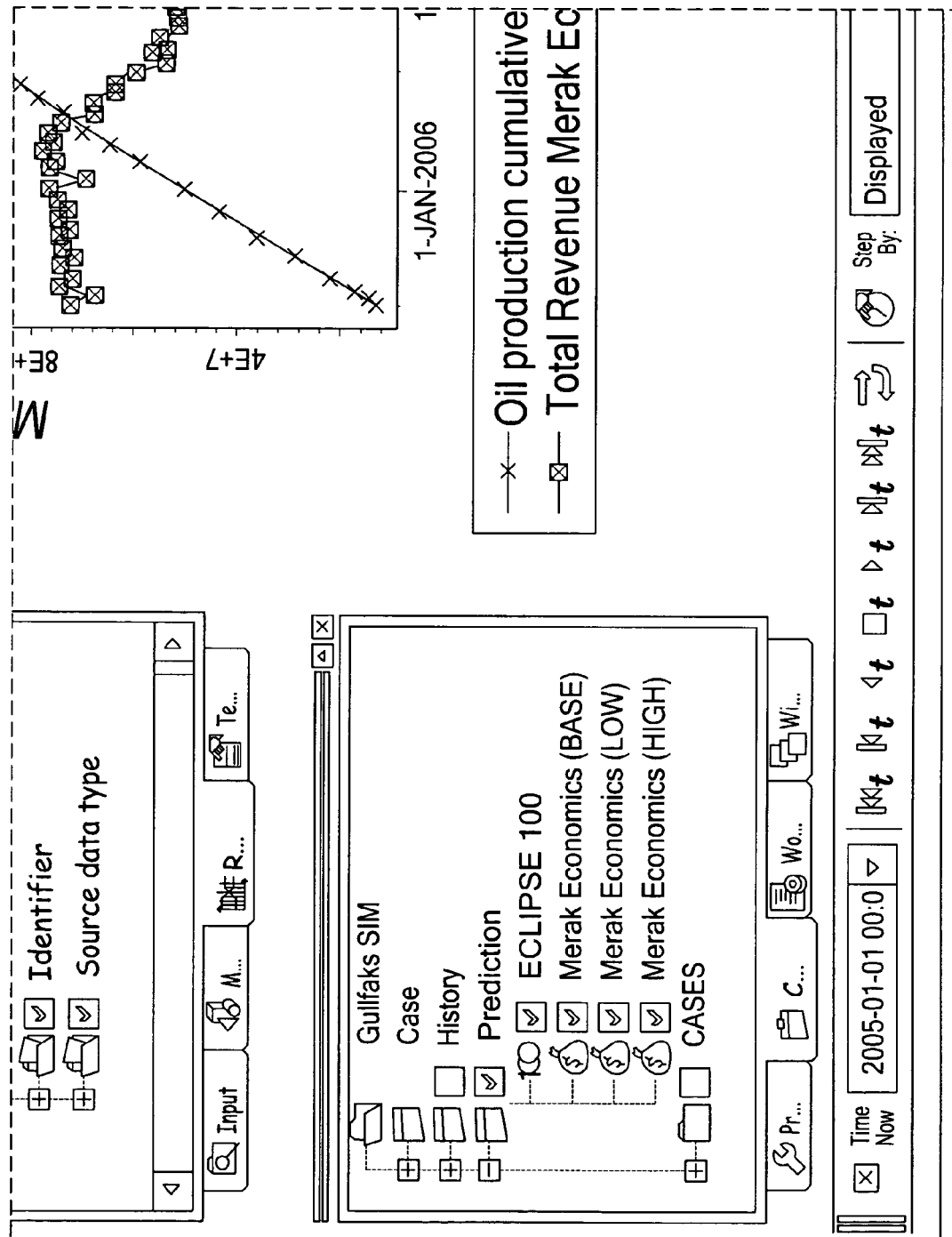
Figure 23D:
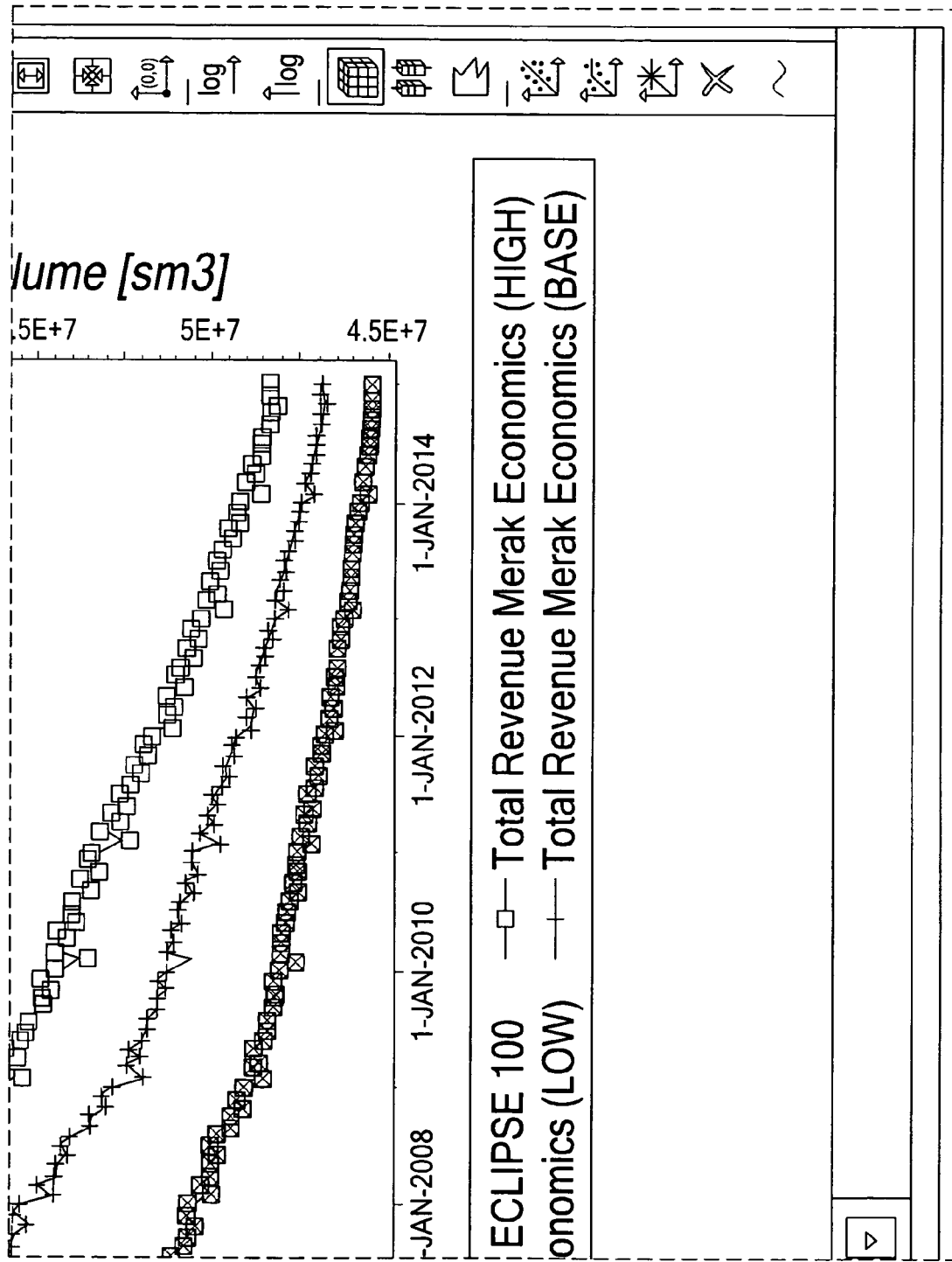

Referring to FIGS. 22 and 23, this example shows how to analyze 'uncertainty in a parameter' in the 'economic model'. In this example, in FIG. 22, each of the three 'Merak Economics process statements' 226 in the 'workflow' 228 of FIG. 22 will have a different run name (HIGH, BASE, and LOW) assigned to it, and each of these runs will use a different 'economic model' that corresponds to high, base and low oil-price scenarios.

FIG. 23 represents a sample output of the result from this run.

EXAMPLE 3

Using Variables

Referring to FIGS. 24, 25, 26, and 27, 'Well Drilling cost' and 'Run Name' can both be substituted with 'variable names'. The 'run name' in the process can be a string variable, allowing the name of the run to be controlled from the workflow. In this scenario, if a String variable is created with the name $RUNNAME and if this name is used as the run name in the 'Merak Economics dialog box', then a run will be created called $RUNNAME, which can be edited in the normal way. However, when the workflow is run, the name of the run will be substituted with the value of the $RUNNAME string variable. You will see the subsequent nodes appearing on the 'Cases tree'. These runs will have real names (whatever was substituted by the workflow manager). This allows you to either re-run the workflow after editing the run that has the $RUNNAME run name, or re-run individual runs by selecting the run that has the appropriate run name. It was necessary to do this, since each run that you generate from the workflow manager could be unique depending on the values of the various fields in the process. These cannot be represented on the 'Cases tree' by a single generic run. It is the run's name that makes it unique. This is the list you see in the drop-down list in the 'Merak Economics dialog box'. Each run can perform the 'economics calculations' on several simulations. Therefore, on the 'Cases tree', you will get multiple nodes of the same name, but for each simulation the run names will be unique.

In FIGS. 24-27, this example creates a new run name "$RUNNAME" where the simulation to use is set as "Variable A". The illustrations of FIGS. 24-27 show how new runs can be created by the Workflow Editor. This can help you organize your various economic runs so that you can easily identify them.

Figure 24:
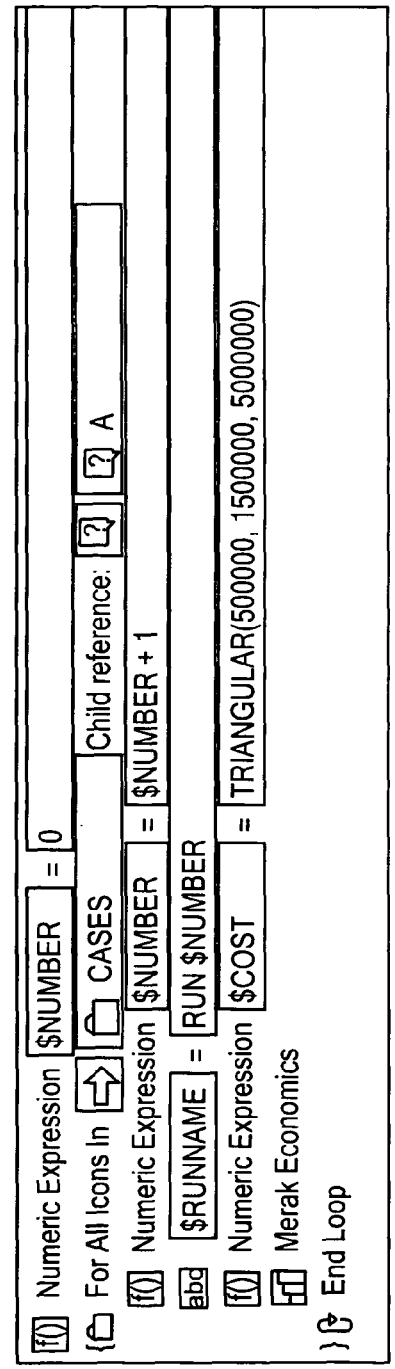

In FIG. 24, in this example, variables are used in the Workflow Editor to define the run name and the well drilling costs.

Figure 25:
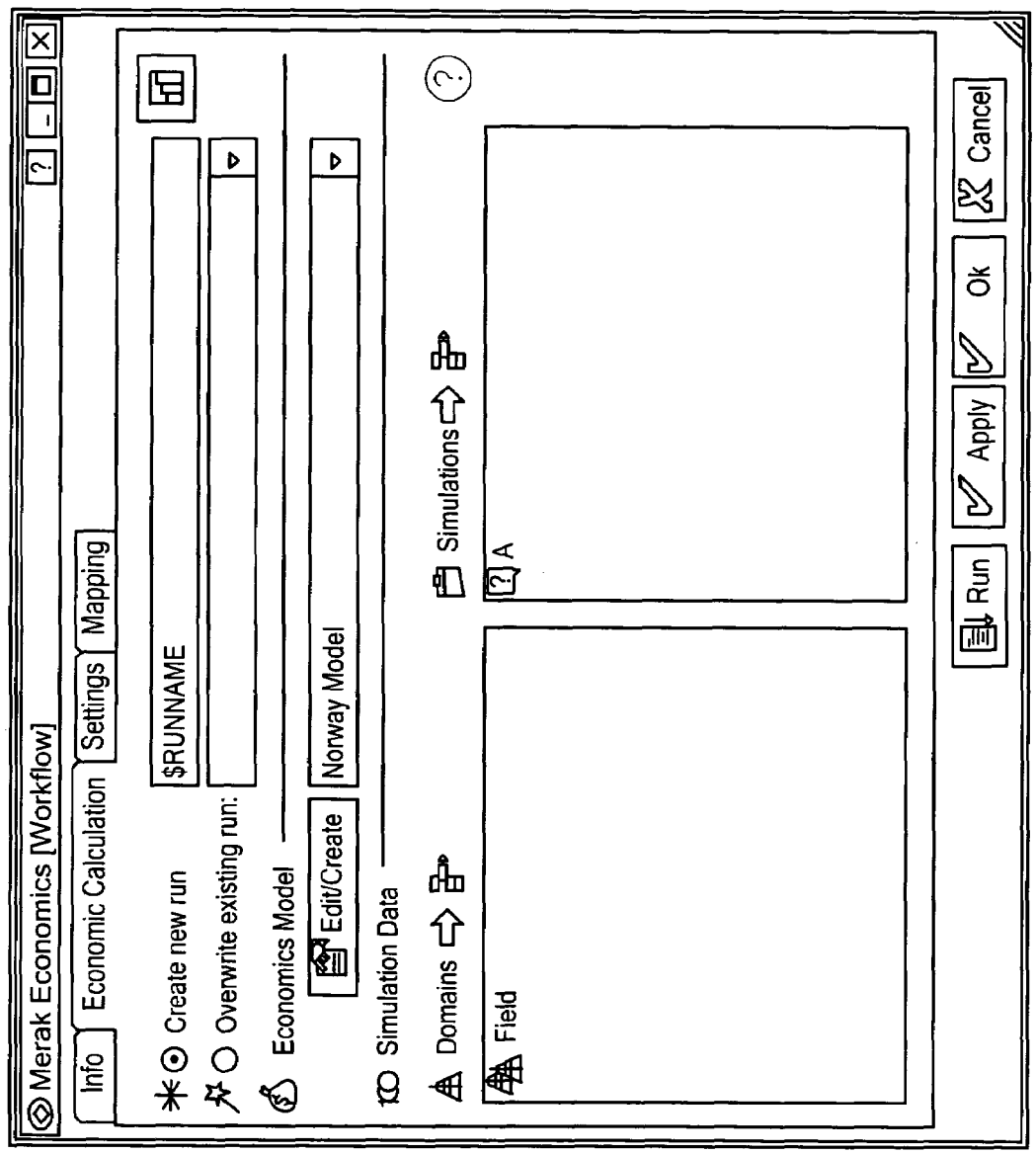
Figure 26:
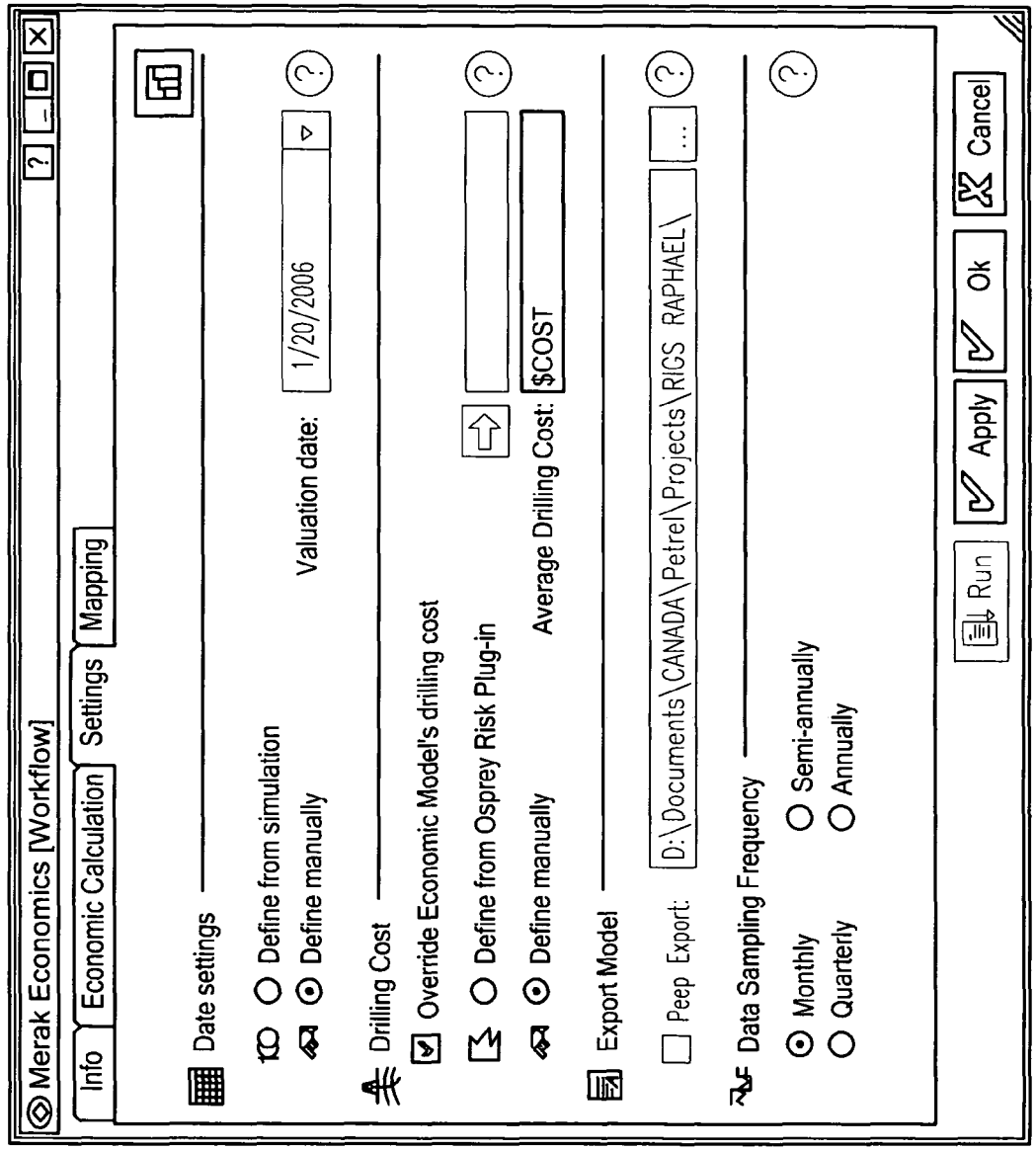

In FIGS. 25 and 26, these examples show how the run name and variable costs are set up in the 'Merak Economics dialog box' to use the variables defined in the Workflow Editor.

Figure 27:
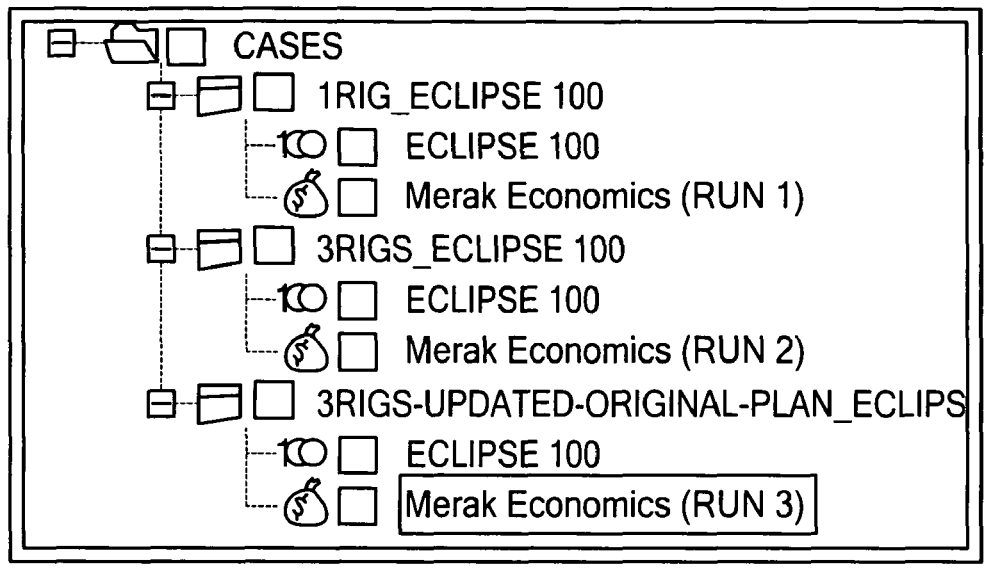

In FIG. 27, the results of the run described above are illustrated.

EXAMPLE 4

Using Well Logs to Populate the Variables in a Workflow

Figure 28:
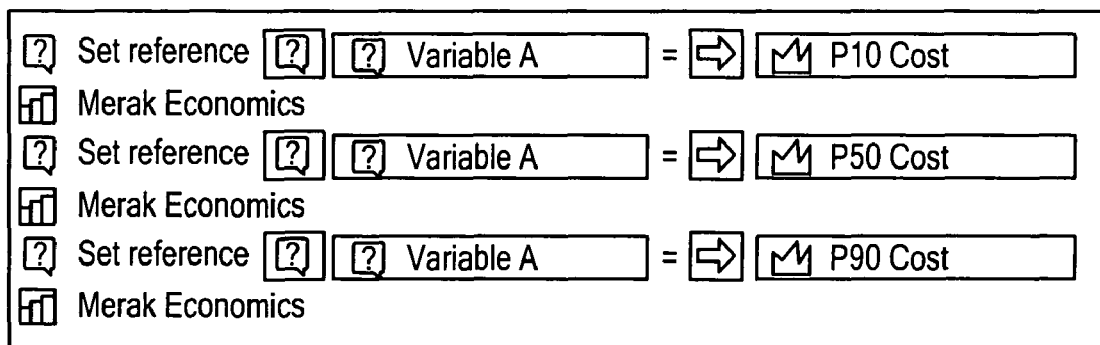
Figure 29:
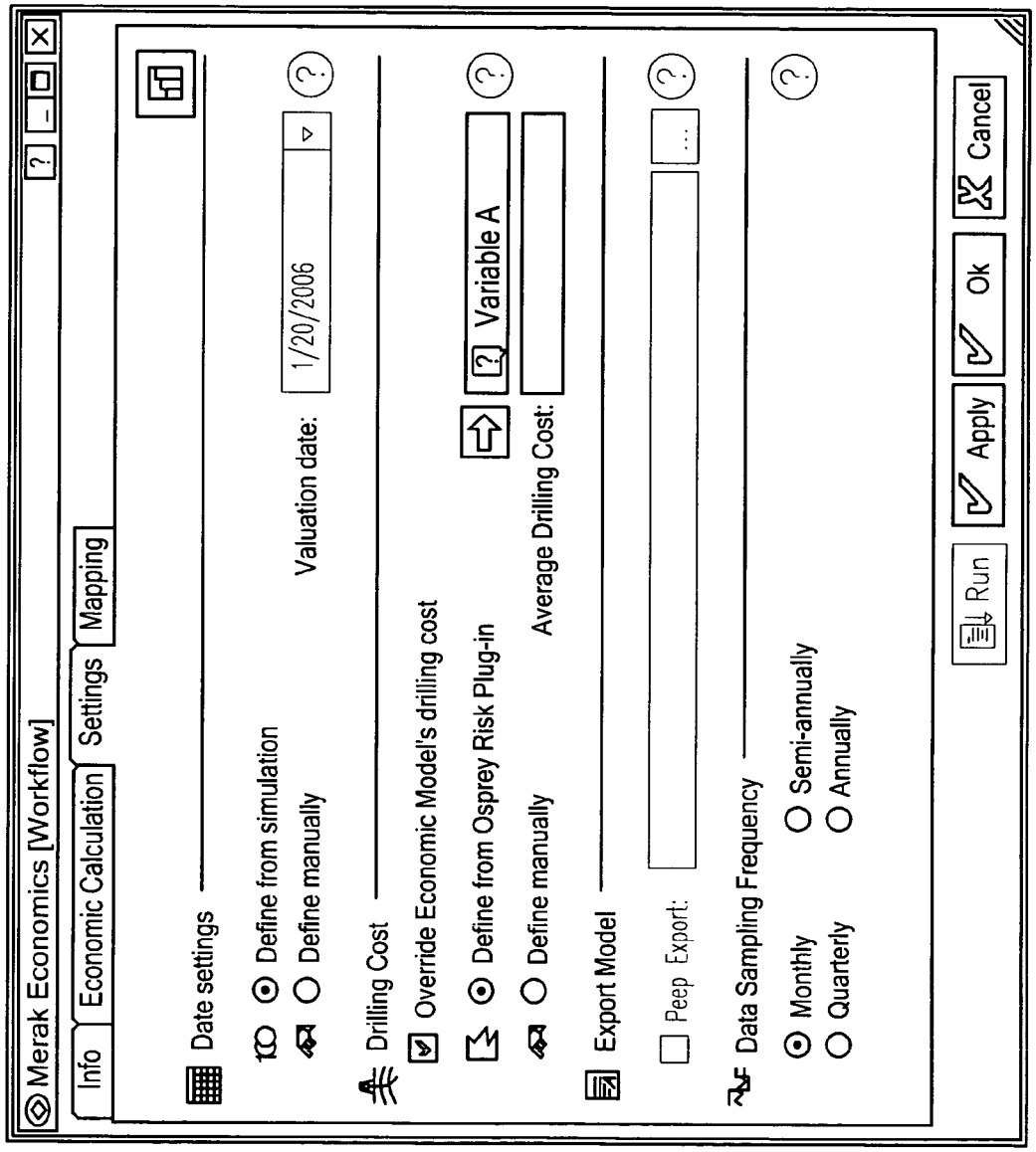

Referring to FIGS. 28 and 29, this example shows how 'specified well logs' can be used to populate the 'variable' in a workflow. In the Workflow Editor, add a reference, adding the variable and well log that you want to associate with that variable (in this case, we are associating three different values with the same variable.

In FIG. 29, a single economic run can be used, provided that the 'variable name' is provided as the 'Osprey Risk Plug-in' well log, as shown in FIG. 29.

The Structure of the 'Software for Performing Economic Calculations in Petro-Technical Workflows' 32 of FIG. 2—Software Requirements Specification The structure of the 'Software for Performing Economic Calculations in Petro-Technical Workflows' 32 illustrated in FIG. 2 is set forth in and represented by the following 'Software Requirements Specification'.

Software Requirements Specification

The following section of this specification defines the comprehensive requirements for the first release of the 'Software for Performing Economic Calculations in Petro-Technical Workflows' 32 illustrated in FIG. 2, otherwise known as the 'Petrel Economics Plug-in module (Petrel Tycoon)'. This is a module that extends current functionality to include fiscal economics using a combination of 'Peep' and the Fiscal Model Libraries.

Definitions, Acronyms, and Abbreviations

Tycoon Internal Merak prototype that is a wrapper around Peep

Peep SIS Merak's Petroleum Economics Evaluation Product

Petrel SIS current PC windows platform for Seismic to Simulation

ECLIPSE SIS industry standard reservoir simulator integrated in the Petrel environment FrontSim SIS streamline simulator PMEP Petrel Merak Economics Plugin S2$ Seismic to Dollars Case A Petrel Case: corresponding to a simulation case or scenario FML Fiscal Model Library: a Merak SIS product The document is structured into: an overall description of the PMEP, and the two main workflows that are required for the first release. The requirements section covers main deliverables.

Overall Description

The PMEP delivers a complete S2$ solution on the Petrel platform, providing robust economics with a simplified user input to encourage use by geoscientists and engineers in any asset team. In an environment where our clients are looking more closely at risk and uncertainty to understand the impact on their business of decisions from the petro-technical world, a push for more consistent and transparent valuations from Sarbenes Oxley, and an increased pressure from shareholders to improve their reserves/production ratio, the PMEP will enable our clients to meet these targets.

Petrel (via ECLIPSE or FrontSim) will provide Tycoon with the relevant vectors that it needs to perform the economic calculation such as phase production or injection rates, workover and drilling rates etc. Well costs can be read in from the Petrel Osprey-risk plugin module as well. The Petrel interface will provide inputs to operating costs etc. All results visualization and plotting will be done natively in Petrel using the results tree.

Workflows

The following summary use cases are intended to provide a concise definition of the product requirements.

Running an Economic Evaluation for a Case

Using production curves produced by ECLIPSE or FrontSim inside the Petrel environment, the PMEP is executed against a case. The user selects an existing economic model or creates a new economic model. The economic model includes the fiscal model, product price, and operating costs. The user also selects the case he wants to run the economic model against and clicks run. Tycoon then passes all the input parameters to Peep and then returns the results to Petrel where plots of After Tax Cashflow or Capital Costs vs time can be made.

Running Multiple Cases Using the Workflow Manager

In screening economics or uncertainty evaluation workflows, the PMEP needs to be run in a loop against multiple cases via the Petrel Workflow Manager. This will provide a distribution of an economic indicator, for example, NPV or ROR whereby the user can obtain the P10, P50 or P90 values he needs or select the case that corresponds to a particular probability.

Specific Requirements

PMEP can Run Against any Region in the World

The PMEP will be able to run any economic valuation for any Petrel model located anywhere in the world. This requires use of either Canadian, US or World Peep with the Fiscal Model Library dependent on the user selection in the economic model.

PMEP User Interface

The PMEP user interface has to be 100% consistent with Petrel. See section 5 that includes a mock-up of the UI. The paradigm is that same as that for the current Petrel Well Design Process.

Data Exchange Between Petrel and Tycoon

Tycoon writes summary file format file

To mitigate risk, in this release the data exchange mechanism for Petrel to load the economic output from Tycoon will be via ECLIPSE summary file formats. Initially, the production profiles from the case will be passed to Tycoon via the API. Tycoon will then pass all the necessary information to Peep to do the calculations and pass the results back to Tycoon which then has to generate a text file in the ECLIPSE summary file format containing the various output vectors (e.g. ATCF, Taxes, Capital Costs etc). Using a defined XML configuration file, Petrel will be able to populate the Results Tree from the Tycoon summary file.

Tycoon Processes Cumulative Vectors

Tycoon will use cumulatives or totals whenever possible to avoid ambiguities with rate averaging. It will interpolate to get the appropriate production/injection during the need to subtract the quantity at time period (n+1) from that at time period (n) to determine the appropriate rate to inform with Peep.

Tycoon Processes Irregular Time Periods

Output from ECLIPSE in the Petrel environment could be at any regular interval e.g. every 5 days, every 5 months or 5 every years. Tycoon needs to be able to preprocess these quantities and average them at the desired frequency:

1. data interval less than one month should be averaged to monthly
2. data at intervals more than one month, but less than 3 months should be averaged monthly
3. data at intervals more than 3 months but less than 6 months should be averaged quarterly
4. data at intervals more than 6 months but less than 12 months should be averaged semi-annually
5. data at more than one year but less than 2 years should be averaged annually Custom Fiscal Models If a client (e.g. Shell) has their own library of fiscal models, PMEP will allow for them to use this instead of the provided FML models. We will provide a separate PMEP Administrative utility—(for internal SIS support staff use only) that a site administrator could use to configure the custom models for use in PMEP. The fee will be left to the geomarkets discretion to negotiate with the client.

Export to Peep

PMEP should provide an export mechanism (PEX file) for the user to export the Petrel Case and economic model to Peep for further detailed analysis.

Petrel Workflow Manager

The PMEP should have the ability to be called and controlled with the Workflow Manager. This will enable its use for screening economics workflows where multiple realizations of a geological model are run to assess ranges of NPVs etc. Additionally, the Workflow Manager will have the ability to substitute any of the economic model variables e.g. oil price, variable operating cost, workover cost etc with a distribution.

Installation

Install package needs to deploy the Peep database, attach the database to MSDE or SQLServer. Tycoon configuration will specify what ODBC connection Peep will use Well Costs from Osprey Risk The PMEP will read well costs from a text file written by the Petrel Osprey-Risk plugin (if available), The location of this file will always be in the current Petrel project directory and the filename format will be "wellname.txt" where "wellname" is the name of the well that has costs associated with it.

Supplementary Requirements

No Degradation in Performance Versus Stand-Alone Peep

The time required to run a model-must not show discernible increase (5%) over standalone Peep+FML.

Clearly Differentiated from Peep Product

Due to the fact that some the our current Peep clients are also Petrel users, the PMEP must clearly differentiate its features and functionalities from the standalone Peep application. The PMEP needs to be positioned in the marketplace for the petrotechnical market, NOT the traditional Peep market segment (economists, financial planners etc). A key point to note is that Merak is attempting to create a new market segment for its products in order to grow the business. A continued focus on the vertical (core Merak competency) is being supplemented by this new entrance into the petrotechnical desktop. It is important that we maintain limited functionality in the PMEP to avoid conflicting messages to our clients. Advanced Peep features like ring fencing etc will not be ported over to PMEP.

Behaviorial Changes within Petrel Reservoir Engineering Environment—Results Folder Tab A new "Economics" checkbox in the Results Tab (Define Simulation Case Process) is added which should also export the summary file keywords:

1. FMWDR (# of drilling events this timestep) or FMWDT (total # of drilling events)
2. FMWWO (# of workover events this timestep), or FMWWT (total # of workover events)
3; FMWPR (# of flowing production wells)
4. FMWIN (# of flowing injection wells)
(It also forces output of Totals or Cumulatives as input to the economics calculation)

Loading Economics Summary Vectors

Figure 30:
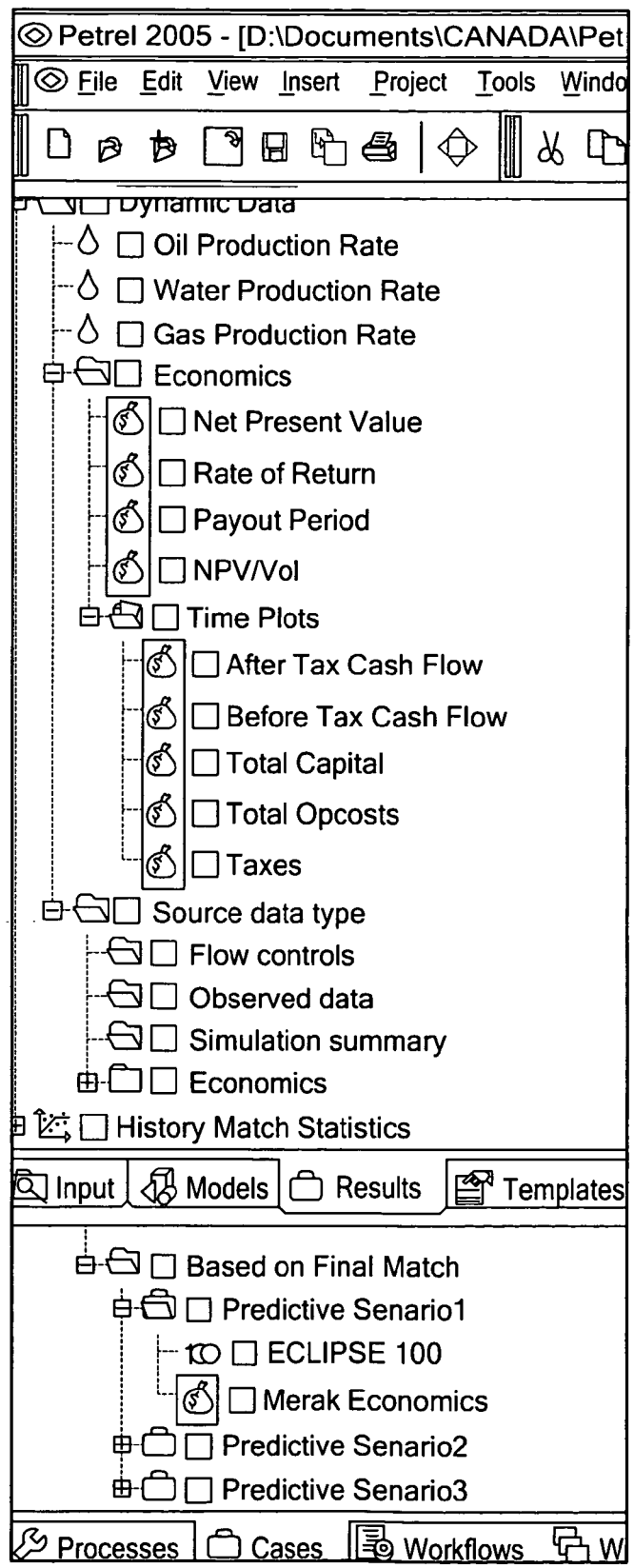

Referring to FIG. 30, PMEP will produce a summary file with the Case Name which will contain all the economic indicators (e.g. After Tax Cash Flow etc). Petrel will import these and display them under the Results folder and Case folders. See FIG. 30 representing the 'Petrel Results and Case Trees'.

Figures 31, 35:
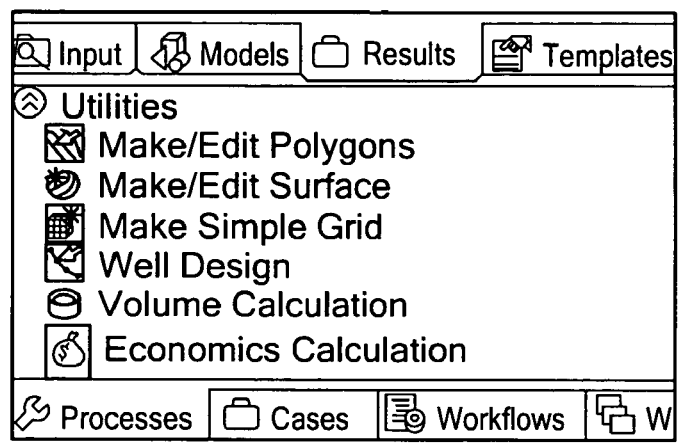

Refer now to FIG. 31 representing 'Launching the PMEP'.

Process Manager

Figure 32:
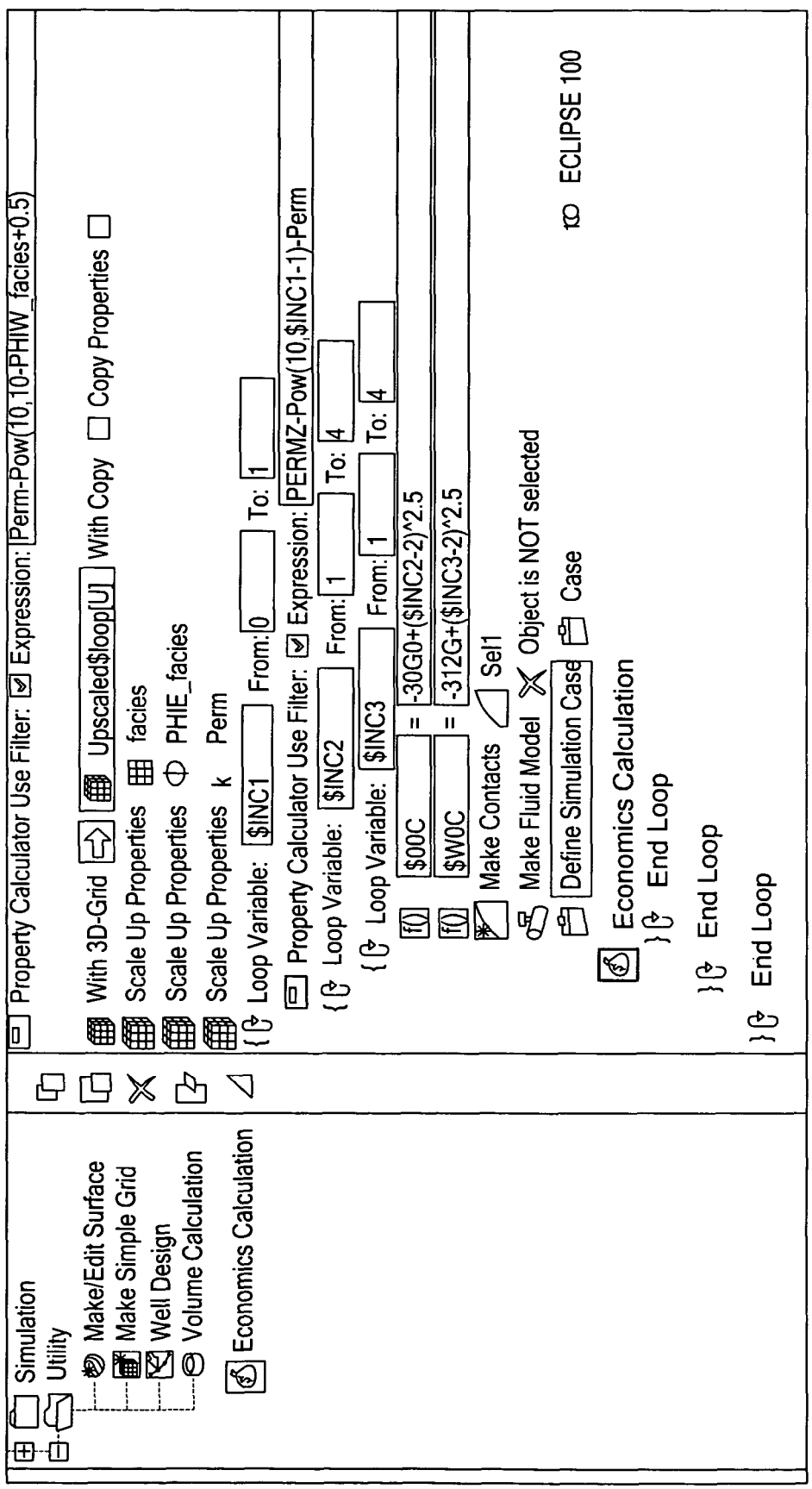
Figure 33:
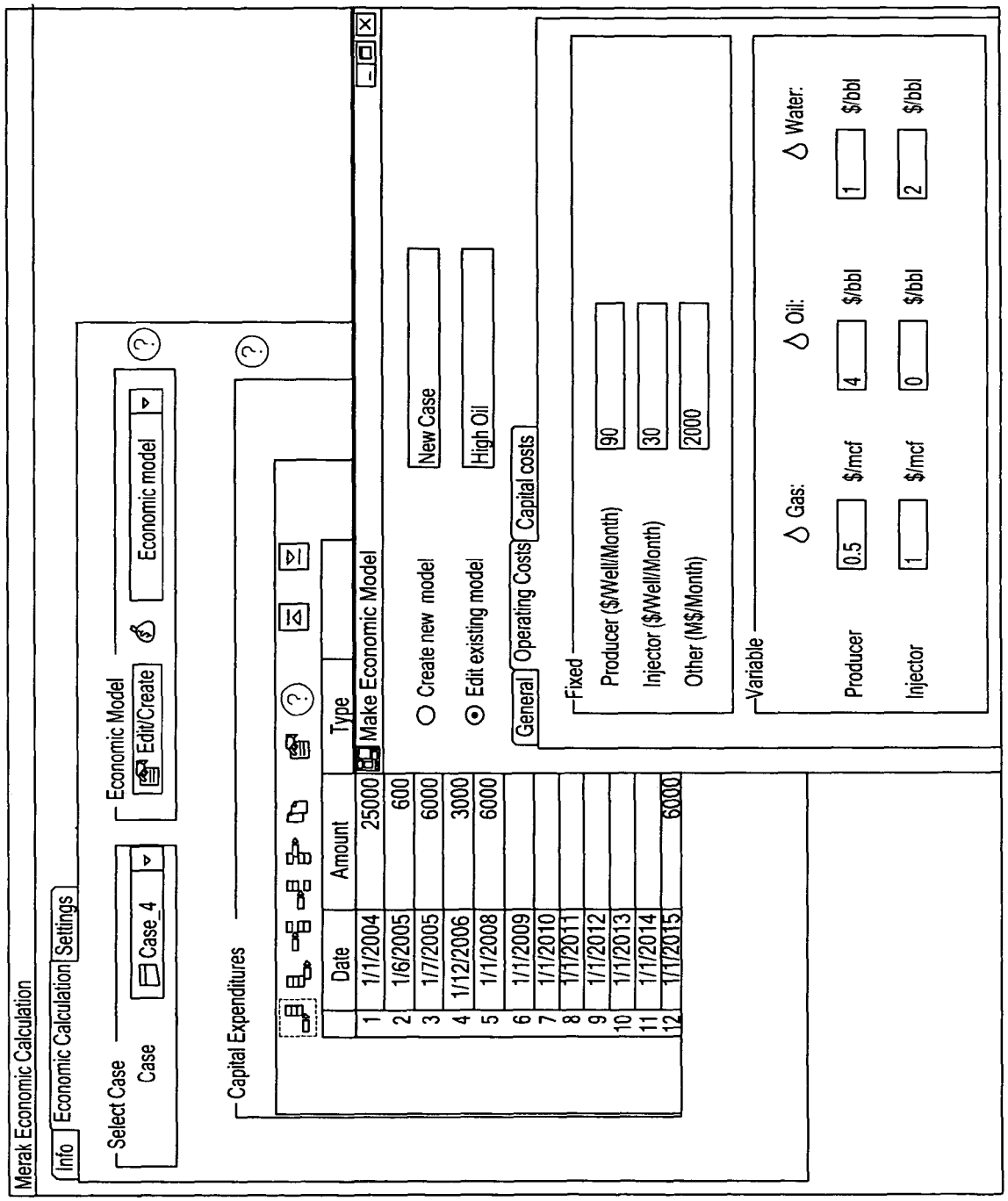
Figure 34:
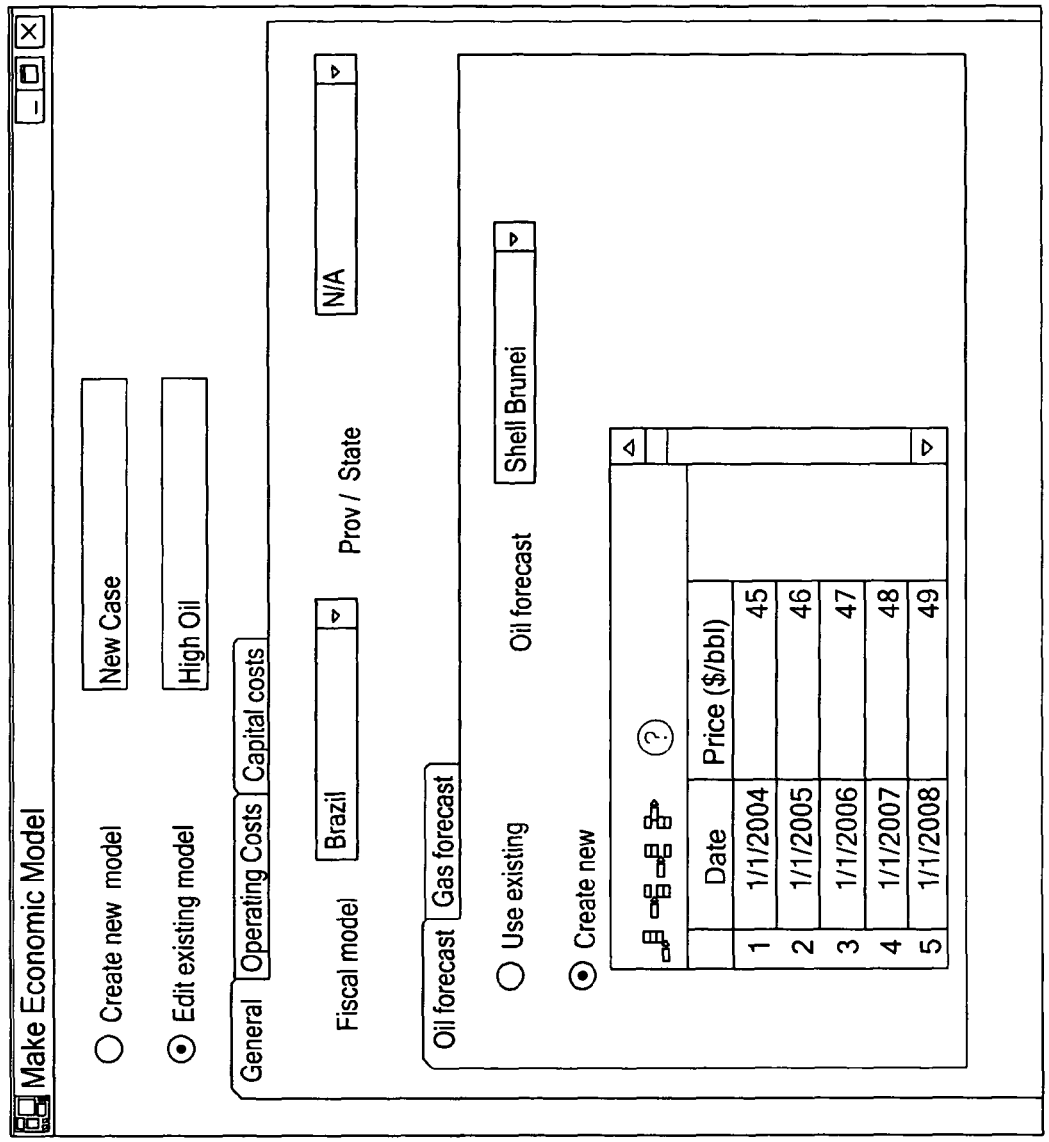
Figure 36:
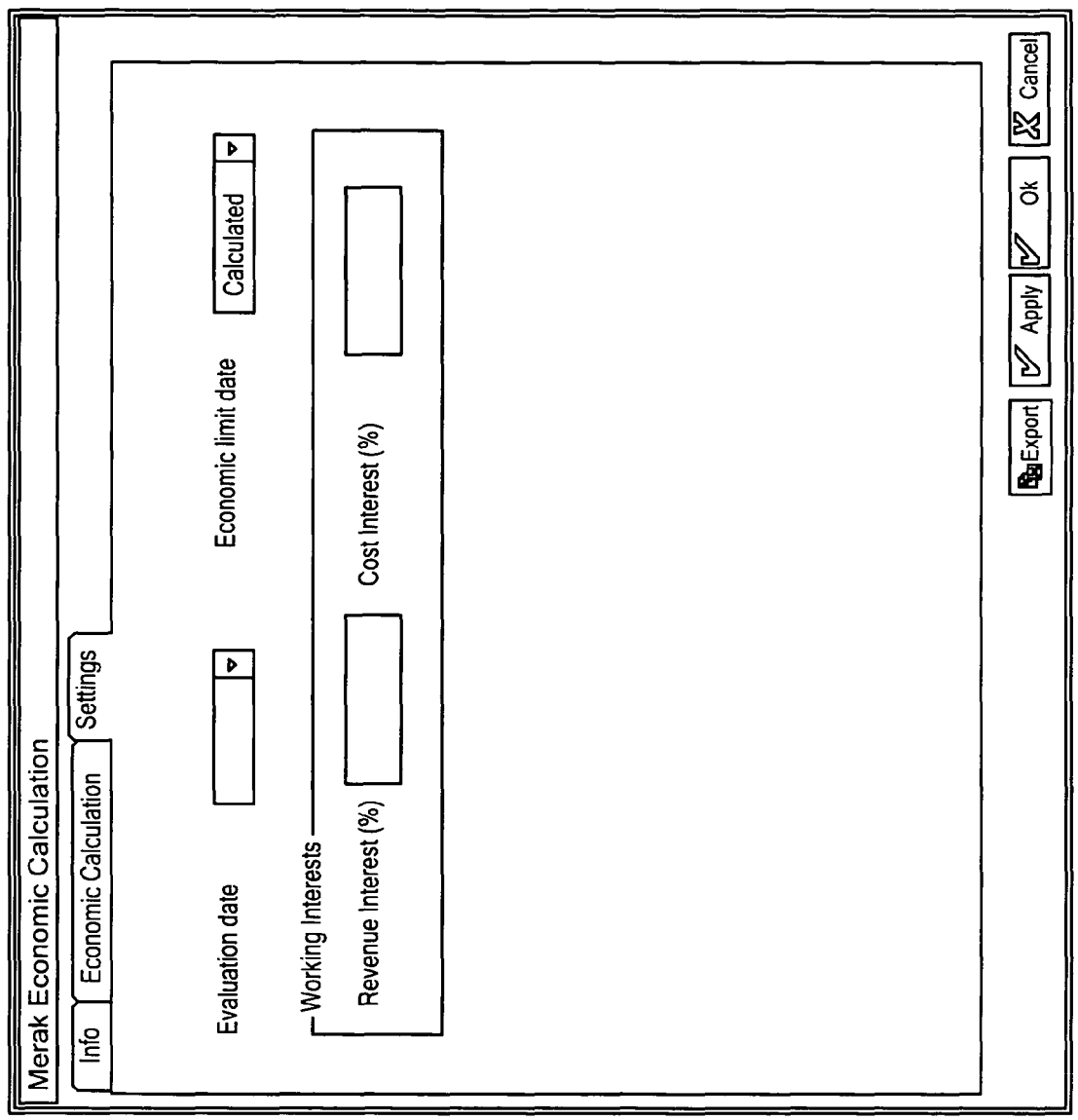

Referring to FIG. 32, Petrel will include the PMEP as an available process in the Process Manager. Refer to FIG. 32 representing 'PMEP in Process Manager'. An example logic would be:

```
loop on models
    Def Sim Case
        Run Economics   Economic_Model_1
        Run Economics   Economic_Model_2
        Run Economics   Economic_Model_3
end loop
```

Mapping of ECLIPSE Summary Vectors in PMEP

The mechanism will be the same as is currently done for ECLIPSE summary files (via an XML configuration file—an example of this is located in the XML subdirectory in the Petrel installation location and also in the Appendix of this document).

Launching the Module

Referring to FIG. 31, Petrel will add Economics Calculation to the list of Utilities. See FIG. 31 ('Launching the PMEP').

Mapping of ECLIPSE Summary Vectors in PMEP

The PMEP will automatically transform the input vectors from Petrel into CAPEXs and OPEXs:

1. Drilling costs for time period=FMWDR×Cost of drilling well
2. Workover costs for time period=FMWWO×Cost of workover
3. FMWPR and FMWIN are used to compute Operating costs per well Use Cases The scope of this use case is to define how a geoscientist or engineer using Petrel will interact with PMEP. The tasks include building an ECLIPSE model with the appropriate keywords, running the ECLIPSE model, creating an economic model to run against the Petrel case and plotting the economic vectors in the Petrel plot windows.

Actors

The following actors are involved in this use case:

| | |
|---|---|
| Petrel Engineer | Provides the ECLIPSE models, runs Petrel |
| Peep Administrator | Merak consultant or client site DBA that configures maintains and Merak Peep products on-site |

Preconditions

Hardware

The economic calculations are performed on a local machine where Petrel is running. The Tycoon database is running locally on the Petrel PC.

Licensing

The user will require several licensed components to run the simulation. These include, but are not limited to the following:

1. Petrel Reservoir Engineering Core
2. ECLIPSE 100
3. Data Analysis
4. FrontSim Locked
5. PMEP license Licenses are checked out by the individual components and require no extra effort on the part of the user.

Component Models

The ECLIPSE reservoir and Petrel Economic model and are well posed and have been validated.

Flow of Events

Define Simulation Case

1. Define simulation case for a particular Grid with the ECLIPSE 100 simulator
2. Select the Economics checkbox in the Results Folder.
3. Run the model to completion.

Define Economic Model

1. Start the "Economic Calculation" process from the Utilities tab
2. Create a New Economic Model
3. Select a Fiscal Model
4. Create new oil and gas price forecasts
5. Enter Opcosts and Capital costs Assign Economic Model to a Case 1. Select the ECLIPSE 100 case that was previously run
2. The Capital Expenditures should automatically be populated
3. Click Run Displaying Results 1. Expand the Dynamic Data tree under the Results folder
2. Expand the Economics folder and display some time dependent data
3. Display some scalar properties e.g. NPV Refer to FIGS. 33, 34, 35, and 36 for the Petrel Merak Economics Plug-in (PMEP) User Interface (UI) Mockup ECLIPSE Summary File Format Example Summary Specification (FSMPEC) file

```
'RESTART'  9 'CHAR'
'   '' '' '' '' '' '' '' '' '
'   '' '
'DIMENS '  6 'INTE'
    48    20     5    10     0    -1
'KEYWORDS'  48 'CHAR'
'TIME "YEARS "FPR "FWCT "FOPR "FWPR "FWIR '
'WOPR "WOPR "WOPR "WOPR "WOPR "WWCT "WWCT '
'WWCT "WWCT "WWCT "WBHP "WBHP "WBHP "WBHP '
'WBHP "WMCTL "WMCTL "WMCTL "WMCTL "WWIR '
'FMWPR "GMWPR "GMWPR "GMWPR "GMWPR "FMWIN "GMWIN '
'GMWIN "GMWIN "GMWIN "FMWDR "GMWDR "GMWDR '
'GMWDR ' 'GMWDR "FMWWO "GMWWO "GMWWO "GMWWO '
'GMWWO ' 'WGNAMES'  48 'CHAR'
':+:+:+:+":+:+:+:+"FIELD "FIELD "FIELD "FIELD '
'P1 "P21 "P3 "I20 ":+:+:+:+"P1 "P21 '
'P3 "I20 ":+:+:+:+"P1 "P21 "P3 "I20 '
':+:+:+:+"P1 "P21 "P3 "I20 ":+:+:+:+"I20 '
'FIELD "G "GG "I ":+:+:+:+"FIELD "G '
'GG "I ":+:+:+:+"FIELD "G "GG "I '
':+:+:+:+"FIELD "G "GG "I ":+:+:+:+:'
'NUMS '  48 'INTE'
 -32767  -32767     0     0     0     0
        0         1     2     3     4     5
        1         2     3     4     5     1
        2         3     4     5     1     2
        3         4     5     0     0     1
```

-continued

```
        2         3     4     0     1     2
        3         4     0     1     2     3
        4         0     1     2     3     4
'UNITS '  48 'CHAR'
'DAYS "YEARS " PSIA "   "STB/DAY"STB/DAY"STB/DAY'
'STB/DAY"STB/DAY"STB/DAY"STB/DAY"STB/DAY" " '
' " " " PSIA " PSIA " PSIA " PSIA '
' PSIA " " " " " "STB/DAY'
' " " " " " " '
' " " " " " " '
' " " " " " " '
'STARTDAT'   3'INTE'
    1    1    2005
```

Example Summary File (FUNSMRY)

```
'SEQHDR '    1 'INTE'
 -1405291252
'MINISTEP'   1 'INTE'
 0
'PARAMS '   48 'REAL'
 0.00000000E+00 0.00000000E+00 0.40170312E+04 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
'MINISTEP'   1 'INTE'
 1
'PARAMS '   48 'REAL'
 0.10000000E+01 0.27378509E-02 0.40170317E+04 0.19030464E-02
 0.29999999E-05 0.57200245E-08 0.00000000E+00 0.30000000E+04
 0.00000000E+00 0.00000000E+00 0.00000000E+00 0.00000000E+00
 0.19030464E-02 0.00000000E+00 0.00000000E+00 0.00000000E+00
 0.00000000E+00 0.39372139E+04 0.00000000E+00 0.00000000E+00
 0.00000000E+00 0.00000000E+00 0.10000000E+01 0.00000000E+00
 0.00000000E+00 0.00000000E+00 0.00000000E+00 0.00000000E+00
 0.10000000E+01 0.10000000E+01 0.00000000E+00 0.00000000E+00
 0.00000000E+00 0.00000000E+00 0.00000000E+00 0.00000000E+00
 0.00000000E+00 0.00000000E+00 0.10000000E+01 0.10000000E+01
 0.00000000E+00 0.00000000E+00 0.00000000E+00 0.00000000E+00
 0.00000000E+00 0.00000000E+00 0.00000000E+00 0.00000000E+00
'MINISTEP'   1 'INTE'
 2
'PARAMS'    48 'REAL'
 0.40000000E+01 0.10951404E-01 0.40170332E+04 0.18979178E-02
 0.29999999E-05 0.57045804E-08 0.00000000E+00 0.30000000E+04
 0.00000000E+00 0.00000000E+00 0.00000000E+00 0.00000000E+00
 0.18979178E-02 0.00000000E+00 0.00000000E+00 0.00000000E+00
 0.00000000E+00 0.39371521E+04 0.00000000E+00 0.00000000E+00
 0.00000000E+00 0.00000000E+00 0.10000000E+01 0.00000000E+00
 0.00000000E+00 0.00000000E+00 0.00000000E+00 0.00000000E+00
 0.10000000E+01 0.10000000E+01 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
 0.00000000E+00 0.00000000E+00 0.00000000E+00 0.00000000E+00
```

Summary File Reference Documentation (From ECLIPSE User Documentation)

Specification File

The summary specification file must be available, for a post-processor to read ECLIPSE summary files. Table 3.1 lists the keywords used in the Specification file:

TABLE 3.1

Specification file keywords

| Keyword | No. of Items | Data Type | Contents |
|---|---|---|---|
| RESTART | 9 | CHAR | Root name of restart file from which this run originated (if any), up to 72 characters divided into 8-character words |
| DIMENS | 6 | INTE | Items 1 - NLIST = number of data vector parameters stored, at each timestep<br>Item 2 - NDIVIX = number of cells in X-direction<br>Item 3 - NDIVIY = number of cells in Y-direction<br>Item 4 - NDIVIZ = number of cells in Z-direction<br>Item 5 - Dummy<br>Item 6 - ISTAR = report step number of restart file used to start this run (if any) |
| KEYWORDS | NLIST | CHAR | The mnemonic keyword associated with each data vector |
| WGNAMES | NLIST | CHAR | The well or group name associated with each data vector |
| NAMES | NLIST | COnn | Alternative to WGNAMES for models where the standard short naming convention is not used (e.g. multiple reservoirs connected together by a network). Older post-processors such as GRAF are not designed for use with files written using this specialized naming convention. |
| NUMS | NLIST | INTE | The integer cell or region number associated with each data vector |
| LGRS | NLIST | CHAR | * The LGR name associated with each data vector (for runs with local grid refinement) |
| NUMLX | NLIST | INTE | * For local block or completion data vectors, the I-position in the local grid. |
| NUMLY | NLIST | INTE | * For local block or completion data vectors, the J-position in the local grid. |
| NUMLZ | NLIST | INTE | * For local block or completion data vectors, the K-position in the local grid. |
| LENGTHS | NLIST | REAL | * For horizontal well data, the length along the well associated with each summary item (i.e. distance from bottom-hole reference point to completion) |
| LENUNITS | 1 | CHAR | * The units used for horizontal well lengths |
| UNITS | NLIST | CHAR | Units associated with each vector, used when assigning axes to a line graph |
| STARTDAT | 3 | INTE | The date of the run start<br>(a) Day<br>(b) Month<br>(c) Year |
| LGRNAMES | NLGR | CHAR | * The names of the local grids defined for this run, if any. (NLGR = number of local grids) |
| LGRVEC | NLGR | INTE | * The number of summary vectors associated with each LGR |
| LGRTIMES | NLGR | INTE | * Total number of local ministeps associated with each LGR |
| RUNTIMEI | 50 | INTE | ** Integer data used for run-time monitoring |
| RUNTIMED | 5 | DOUB | ** Double precision data used for run-time monitoring |
| STEPRESN | 30 | CHAR | * Character mnemonics describing the reasons for selecting timestep lengths in the simulation run (corresponding to integer values of the summary vector STEPTYPE, see page 22). |

Summary Files

For multiple file output, ECLIPSE creates one summary file at each simulation report step, with suffices in the form S0001, S0002 etc. If the summary files originate from a restart run, the suffix numbers will correspond to the restart report step sequence. (E.g. for a run started from a restart file created at report step 9, the new summary files will have suffices S0010, S0011 etc.) For unified file output, data for all report steps are written to the same file, with a new header for each step.

For each report step, there may be one or more timesteps, also called ministeps, corresponding to the simulation steps taken between reports. Parameter values for the data vectors are output at each ministep. In a complete sequence of summary data, the first ministep will be ministep 0 (written at time 0.0), but the first report step will be report step 1 (written at the end of the first report period). In a restarted run, the ministep numbers are incremented from the previous run.

The summary file contents for each report step are as follows (Table 3.2):

TABLE 3.2

Summary file keywords

| Keywords | No. of Items | Data type | Contents |
|---|---|---|---|
| SEQHDR | 1 | INTE | Sequence header, with data value ISNUM = an encoded integer corresponding to the time the file was created. For files not originating from ECLIPSE, this value may be set to zero. |
| MINISTEP | 1 | INTE | Ministep number (starting at zero and incremented by 1 at each subsequent step) |
| PARAMS | NLIST | REAL | Vector parameter values at this ministep (corresponding to the vectors defined in the specification file) |

One SEQHDR keyword appears at the start of each report step, followed by pairs of MINISTEP and PARAMS keywords for each ministep.
Note
Note that FrontSim uses: −0.99999999E+33 as a null value for some summary vector output. This applies to properties that are only calculated once per report step and written out at the end of the step. The values for intermediate ministeps are undefined. The missing data can be filled in by FrontSim, but will give a stair-step effect. To request removal of null values, use the FrontSim keyword OPTIONFS and set control switch 2.

PEEP Summary Vectors to be Displayed in the PMEP
1. ATCF 10
2. Total Taxes
3. Operating Income
4. Total Operating Costs
5. NPV
6. ROR
7. Payback period Example XML Configuration File for Mapping ECLIPSE Vectors to Petrel

```
<?xml version="1.0" encoding"utf-8" ?>
<!--WARNING: the order of repeated entries is important here:
    the last entry is the one that is used by default on
    export (alphabetically the first)-->
<EclipseNamesToPropertyTypeCatalog>
    <Map Name="PRESSURE" PropertyType="PRESSURE"></Map> <!--default for export-->
    <Map Name ="SWMAX" PropertyType="SAT_WATER"></Map>
    <Map Name="SWINIT" PropertyType="SAT_WATER"></Map>
    <Map Name="SWAT" PropertyType="SAT_WATER"></Map><!--default for export-->
    <Map Name="SGAS" PropertyType="SAT_GAS"></Map>
    <Map Name="SOIL" PropertyType="SAT_OIL"></Map>
    <Map Name="PORO" PropertyType="POROSITY"></Map>
    <Map Name="PERMX" PropertyType="PERM_I"></Map>
    <Map Name="PERMY" PropertyType="PERM_J"></Map>
    <Map Name="PERMZ" PropertyType="PERM_K"></Map>
    <Map Name="PERMXY" PropertyType="PERM_XY"></Map>
    <Map Name="PERMYZ" PropertyType="PERM_YZ"></Map>
    <Map Name="PERMXZ" PropertyType="PERM_XZ"></Map>
    <Map Name="PERMYX" PropertyType="PERM_XY"></Map>
    <Map Name="PERMZY" PropertyType="PERM_YZ"></Map>
    <Map Name="PERMZX" PropertyType="PERM_XZ"></Map>
    <Map Name="PERMXX" PropertyType="PERM_X"></Map>
    <Map Name="PERMYY" PropertyType="PERM_Y"></Map>
    <Map Name="PERMZZ" PropertyType="PERM_Z"></Map>
    <!-- KFLETCHER commented out next three lines (that repeated the PERMX/Y/Z keys with
a replacement PropertyTyep mapping) -->
    <!-- since PERM_X in Petrel means a perm component oriented wrt Cartesian Axes whereas
PERMX in ECLIPSE mean perm -->
    <!-- component oriented wrt local cell (unless using tensor permeabilities in E300 but that case
we can use the -->
    <!-- alternative PERMXX keywords as mapped above) -->
    <!-- <Map Name="PERMX" PropertyType="PERM_X"></Map> --><!--default for export-->
    <!-- <Map Name="PERMY" PropertyType="PERM_Y"></Map> --><!--default for export-->
    <!-- <Map Name="PERMZ" PropertyType="PERM_Z"></Map> --><!--default for export-->
    <!-- <Map Name="NTG_CON" PropertyType"NET_GROSS"></Map> -->
    <Map Name="NTG" PropertyType="NET_GROSS"></Map> <!--default for export-->
    <Map Name="DEPTH" PropertyType="ELEVATION_DEPTH"></Map>
    <Map Name="PORV" PropertyType="VOLUME_PORE"></Map>
    <Map Name="DZ" PropertyType="CELL_HEIGHT"></Map>
    <Map Name="DX" PropertyType="CELL_DELTA_X"></Map>
    <Map Name="DY" PropertyType="CELL_DELTA_Y"></Map>
    <Map Name="TOPS" PropertyType="CELL_TOP_DEPTH"></Map>
    <Map Name="TRANX" PropertyType="TRANS_X"></Map>
    <Map Name="TRANY" PropertyType="TRANS_Y"></Map>
```

-continued

```
<Map Name="TRANZ" PropertyType="TRANS_Z"></Map>
<Map Name="RS" PropertyType="GAS_OIL_RATIO"></Map>
<Map Name="RV" PropertyType="OIL_GAS_RATIO"></Map>
<Map Name="FIPOIL" PropertyType="FLUID_IN_PLACE_OIL"></Map>
<Map Name="FIPGAS" PropertyType="FLUID_IN_PLACE_GAS"></Map>
<Map Name="FIPWAT" PropertyType="FLUID_IN_PLACE_WATER"></Map>
<!-- Need mapping (prob to new pre-defined property types)
    // Init props
    utAtom eclAtom( "ACTCELL" );
    status_ = mapping_.Add( pamPT_ACTCELL, eclAtom );
    utAtom eclAtom( "PERM" );
    status_ = mapping_.Add( pamPT_PERM, eclAtom );
    utAtom eclAtom( "PERMXP" );
    status_ = mapping_.Add( pamPT_PERMXP, eclAtom );
    utAtom eclAtom( "PERMYP" );
    status_ = mapping_.Add( pamPLT_PERMYP, eclAtom );
    utAtom eclAtom( "PERMZP" );
    status_ = mapping_.Add( pamPT_PERMZP, eclAtom );
    utAtom eclAtom( "PERMXN" );
    status_ = mapping_.Add( pamPT_PERMXN, eclAtom );
    utAtom eclAtom( "PERMYN" );
    status_ = mapping_.Add( pamPT_PERMYN, eclAtom );
    utAtom eclAtom( "PERMZN" );
    status_ = mapping_.Add( pamPT_PERMZN, eclAtom );
    utAtom eclAtom( "ROCKTYPE" );
    status_ = mapping_.Add( pamPT_ROCKTYPE, eclAtom );
    utAtom eclAtom( "FLUX" );
    status_ = mapping_.Add( pamPT_FLUX, eclAtom );
    utAtom eclAtom( "FLUXX" );
    status_ = mapping_.Add( pamPT_FLUXX, eclAtom );
    utAtom eclAtom( "FLUXY" );
    status_ = mapping_.Add( pamPT—FLUXY, eclAtom );
    utAtom eclAtom( "FLUXZ" );
    status_ = mapping_.Add( pamPT_FLUXZ, eclAtom );
    utAtom eclAtom( "HEIGHT" );
    status_ = mapping_.Add( pamPT_HEIGHT, eclAtom );
    utAtom eclAtom( "MINPVV" );
    status_ = mapping_.Add( pamPT_MINPORV, eclAtom );
    utAtom eclAtom( "MINDZ" );
    status_ = mapping_.Add( pamPT_MINDZ, eclAtom );
?   utAtom eclAtom( "MINPVV" );
?   status_ = mapping_.Add( pamPT_MINPVACTIVE, eclAtom );
    utAtom eclAtom( "MULTPV" );
    status_ = mapping_.Add( pamPT_MULTPV, eclAtom );
    utAtom eclAtom( "PVTNUM" );
    status_ = mapping_.Add( pamPT_PVTNUM, eclAtom );
    utAtom eclAtom( "SATNUM" );
    status_ = mapping_.Add( pamPT_SATNUM, eclAtom );
    utAtom eclAtom( "IMBNUM" );
    status_ = mapping_.Add( pamPT_IMBNUM, eclAtom );
    utAtom eclAtom( "ACTNUM" );
    status_ = mapping_.Add( pamPT_ACTNUM, eclAtom );
    utAtom eclAtom( "MULTNUM" );
    status_ = mapping_.Add( pamPT_MULTINUM, eclAtom );
    utAtom eclAtom( "FLUXNUM" );
    status_ = mapping_.Add( pamPT_FLUXNUM, eclAtom );
    utAtom eclAtom( "EQLNUM" );
    status_ = mapping_.Add( pamPT_EQLNUM, eclAtom );
    utAtom eclAtom( "FIPNUM" );
    status_ = mapping_.Add( pamPT_FIPNUM, eclAtom );
    utAtom eclAtom( "AQUNUM" );
    status_ = mapping_.Add( pamPT_AQUNUM, eclAtom );
    utAtom eclAtom( "ENDNUM" );
    status_ = mapping_.Add( pamPT_ENDNUM, eclAtom );
    utAtom eclAtom( "SWCR" );
    status_ = mapping_.Add( pamPT_SWCR, eclAtom );
    utAtom eclAtom( "SGCR" );
    status_ = mapping_.Add( pamPT_SGCR, eclAtom );
    utAtom eclAtom( "SOWCR" );
    status_ = mapping_.Add( pamPT_SOWCR, eclAtom );
    utAtom eclAtom( "SOGCR" );
    status_ = mapping_.Add( pamPT_SOGCR, eclAtom );
    utAtom eclAtom( "SWL" );
    status_ = mapping_.Add( pamPT_SWL, eclAtom );
    utAtom eclAtom( "SWU" );
    status_ = mapping_.Add( pamPT_SWU, eclAtom );
    utAtom eclAtom( "SGL" );
    status_ = mapping_.Add( pamPT_SGL, eclAtom );
    utAtom eclAtom( "SGU" );
```

-continued

```
            status_ = mapping_.Add( pamPT_SGU, eclAtom );
            utAtom eclAtom( "KRW" );
            status_ = mapping_.Add( pamPT_KRW, eclAtom );
            utAtom eclAtom( "KRG" );
            status_ = mapping_.Add( pamPT_KRG, eclAtom );
            utAtom eclAtom( "KRO" );
            status_ = mapping_.Add( pamPT_KRO, eclAtom );
            utAtom eclAtom( "SWATINIT" );
            status_ = mapping_.Add( pamPT_SWATINIT, eclAtom );
            utAtom eclAtom( "CELLVOLU" );    // 8 character truncated version (when read in via
keyword)
            status_ = mapping_.Add( pamPT_CELLVOL, eclAtom );
            utAtom eclAtom( "CELLVOLUME" );
            status_ = mapping_.Add( pamPT_CELLVOL, eclAtom );
            utAtom eclAtom( "CELLINSI" );    // 8 character truncated version (when read in via
keyword)
            status_ = mapping_.Add( pamPT_CELLINOUT, eclAtom );
            utAtom eclAtom( "CELLINSIDEOUT" );
            status_ = mapping_.Add( pamPT_CELLINOUT, eclAtom );
            utAtom eclAtom( "CELLORTH" );    // 8 character truncated version (when read in via
keyword)
            status_ = mapping.Add( pamPT_CELLORTH, eclAtom );
            utAtom eclAtom( "CELLORTHOGONALITY" );
            status_ = mapping_.Add( pamPT_CELLORTH, eclAtom );
            utAtom eclAtom( "MULTX" );
            status_ = mapping_.Add( pamPT_TRANSMULTX, eclAtom );
            utAtom eclAtom( "MULTX-" );
            status_ = mapping_.Add( pamPT_TRANSMULTXM, eclAtom );
            utAtom eclAtom( "MULTY" );
            status_ = mapping_.Add( pamPT_TRANSMULTY, ectAtom );
            utAtom eclAtom( "MULTY-" );
            status_ = mapping_.Add( pamPT_TRANSMULTYM, eclAtom );
            utAtom eclAtom( "MULTZ" );
            status_ = mapping_.Add( pamPT_TRANSMULTZ, eclAtom );
            utAtom eclAtom( "MULTZ-" );
            status_ = mapping_.Add( pamPT_TRANSMULTZM, eclAtom );
            utAtom eclAtom( "DIFFMX" );
            status_ = mapping_.Add( pamPT_DIFFMULTX, eclAtom );
            utAtom eclAtom( "DIFFMY" );
            status_ = mapping_.Add( pamPT_DIFFMULTY, eclAtom );
            utAtom eclAtom( "DIFFMZ" );
            status_ = mapping_.Add( pamPT_DIFFMULTZ, eclAtom );
            utAtom eclAtom( "DIFFX" );
            status_ = mapping_.Add( pamPT_DIFFX, eclAtom );
            utAtom eclAtom( "DIFFY" );
            status_ = mapping_.Add( pamPT_DIFFY, eclAtom );
            utAtom eclAtom( "DIFFZ" );
            status_ = mapping_.Add( pamPT_DIFFZ, eclAtom );
            utAtom eclAtom( "HEATTX" );
            status_ = mapping_.Add( pamPT_HEATTX, eclAtom );
            utAtom eclAtom( "HEATTY" );
            status_ = mapping_.Add( pamPT_HEATTY, eclAtom );
            utAtom eclAtom( "HEATTZ" );
            status_ = mapping_.Add( pamPT_HEATTZ, eclAtom );
        Grid info propertied (not usually output)
            utAtom eclAtom( "CELLID" );
            status_ = mapping_.Add( pamPT_CELLS, eclAtom );
            utAtom eclAtom( "BLOCKNUM" );
            status_ = mapping_.Add( pamPT_BLOCK_NUM, eclAtom );
            utAtom eclAtom( "BUNUM" );
            status_ = mapping_.Add( pamPT_BU_NUM, eclAtom );
            utAtom eclAtom( "UNITNUM" );
            status_ = mapping_.Add( pamPT_UNIT_NUM, eclAtom );
        recurrent properties
            utAtom eclAtom( "BUBPRESS" );
            status_ = mapping_.Add( pamPT_BUBPRESS, eclAtom );
            utAtom eclAtom( "PBUB" );
            status_ = mapping_.Add( pamPT_BUBPRESS, eclAtom );
            utAtom eclAtom( "GASCONC" );
            status_ = mapping_.Add( pamPT_GASCONC, eclAtom );
            utAtom eclAtom( "RSSAT" );
            status_ = mapping_.Add( pamPT_GASOILRATIO, eclAtom );
            utAtom eclAtom( "FLOOILI+" );
            status_ = mapping_.Add( pamPT_OILFLOWIP, eclAtom );
            utAtom eclAtom( "FLOOILJ+" );
            status_ = mapping_.Add( pamPT_OILFLOWJP, eclAtom );
            utAtom eclAtom( "FLOOILK+" );
            status_ = mapping_.Add( pamPT_OILFLOWKP, eclAtom );
            utAtom eclAtom( "FLOGASI+" );
```

```
            status__ = mapping__.Add( pamPT_GASFLOWIP, eclAtom );
         utAtom eclAtom( "FLOGASJ+" );
            status__ = mapping__.Add( pamPT_GASFLOWJP, eclAtom );
         utAtom eclAtom( "FLOGASK+" );
            status__ = mapping__.Add( pamPT_GASFLOWKP, eclAtom );
         utAtom eclAtom( "FLOWATI+" );
            status__ = mapping__.Add( pamPT_WATERFLOWIP, eclAtom );
         utAtom eclAtom( "FLOWATJ+" );
            status__ = mapping__.Add( pamPT_WATERFLOWJP, eclAtom );
         utAtom eclAtom( "FLOWATK+" );
            status__ = mapping__.Add( pamPT_WATERFLOWKP, eclAtom );
         utAtom eclAtom( "FLXBACK" );
            status__ = mapping__.Add( pamPT_FLXBACK, eclAtom );
         utAtom eclAtom( "FLXFRONT" );
            status__ = mapping__.Add( pamPT_FLXFRONT, eclAtom );
         utAtom eclAtom( "FLXUP" );
            status__ = mapping__.Add( pamPT_FLXUP, eclAtom );
         utAtom eclAtom( "FLXDOWN" );
            status__ = mapping__.Add( pamPT_FLXDOWN, eclAtom );
         utAtom eclAtom( "FLXLEFT" );
            status__ = mapping__.Add( pamPT_FLXLEFT, eclAtom );
         utAtom eclAtom( "FLXRIGHT" );
            status__ = mapping__.Add( pamPT_FLXRIGHT, eclAtom );
         utAtom eclAtom( "FLXDIV" );
            status__ = mapping__.Add( pamPT_FLXDIV, eclAtom );
         utAtom eclAtom( "OIL_DEN" );
            status__ = mapping__.Add( pamPT_OILDEN, eclAtom );
         utAtom eclAtom( "WAT_DEN" );
            status__ = mapping—.Add( pamPT_WATDEN, eclAtom );
         utAtom eclAtom( "GAS_DEN" );
            status__ = mapping__.Add( pamPT_GASDEN, eclAtom );
         utAtom eclAtom( "OIL_VISC" );
            status__ = mapping__.Add( pamPT_OILVISC, eclAtom );
         utAtom eclAtom( "WAT_VISC" );
            status__ = mapping__.Add( pamPT_WATVISC, eclAtom );
         utAtom eclAtom( "GAS_VISC" );
            status__ = mapping__.Add( pamPT_GASVISC, eclAtom );
         utAtom eclAtom( "WAT_PRES" );
            status__ = mapping__.Add( pamPT_WATPRES, eclAtom );
         utAtom eclAtom( "GAS_PRES" );
            status__ = mapping__.Add( pamPT_GASPRES, eclAtom );
         utAtom eclAtom( "SIGMAV" );
            status__ = mapping__.Add( pamPT_SIGMA, eclAtom );
         utAtom eclAtom( "DZMTRXV" );
            status__ = mapping__.Add( pamPT_DZMATRIX, eclAtom );
         utAtom eclAtom( "TEMP" );
            status__ = mapping__.Add( pamPT_TEMPERATURE, eclAtom );
         utAtom eclAtom( "DRAINAGE" );
            status__ = mapping__.Add( pamPT_DRAINAGE, eclAtom );
         utAtom eclAtom( "VSHALE" );
            status__ = mapping__.Add( pamPT_VSHALE, eclAtom );
         utAtom eclAtom( "VCLAY" );
            status__ = mapping__.Add( pamPT_VCLAY, eclAtom );
         utAtom eclAtom( "DPNUM" );
            status__ = mapping__.Add( pamPT_DPNUM, eclAtom );
      // geometric props
         utAtom eclAtom( "DIPANGLE" );
            status__ = mapping__.Add( pamPT_DIPANG, eclAtom );
         utAtom eclAtom( "AZIMUTHA" );    // 8 char truincated version from keyword reader
            status__ = mapping__.Add( pamPT_AZIMUTHANG, eclAtom );
         utAtom eclAtom( "AZIMUTHANGLE" );
            status__ = mapping__.Add( pamPT_AZIMUTHANG, eclAtom );
         utAtom eclAtom( "PERMXANG" );    // 8 char truncated version from keyword reader
            status__ = mapping__.Add( pamPT_PERMXANG, eclAtom );
         utAtom eclAtom( "PERMXANGLE" );
            status__ = mapping__.Add( pamPT_PERMXANG, eclAtom );
         utAtom eclAtom( "ASPECTRATIOXZ" );
            status__ = mapping__.Add( pamPT_ASPECTRATIOXZ, eclAtom );
         utAtom eclAtom( "ASPECTRATIOYZ" );
            status__ = mapping__.Add( pamPT_ASPECTRATIOYZ, eclAtom );
         utAtom eclAtom( "SKEWANGLEXY" );
            status__ = mapping__.Add( pamPT_SKEWANGLEXY, eclAtom );
         utAtom eclAtom( "SKEWANGLEYZ" );
            status__ = mapping__.Add( pamPT_SKEWANGLEYZ, eclAtom );
         utAtom eclAtom( "SKEWANGLEXZ" );
            status__ = mapping__.Add( pamPT_SKEWANGLEXZ, eclAtom );
         utAtom eclAtom( "JACOBIAN" );
            status__ = mapping__.Add( pamPT_JACOBIAN, eclAtom );
      // Streamline specific properties
```

```
            utAtom eclAtom( "PRODUCERS" );
            status_ = mapping_.Add( pamPT_WELLS, eclAtom );
            utAtom eclAtom( "INJECTORS" );
            status_ = mapping_.Add( pamPT_WELLS, eclAtom );
            utAtom eclAtom( "TIME_BEG" );
            status_ = mapping_.Add( pamPT_TIME_BEG, eclAtom );
            utAtom eclAtom( "TIME_END" );
            status_ = mapping_.Add( pamPT_TIME_END, eclAtom );
            utAtom eclAtom( "ID_BEG" );
            status_ = mapping_.Add( pamPT_ID_BEG, eclAtom );
            utAtom eclAtom( "ID_END" );
            status_ = mapping_.Add( pamPT_ID_END, eclAtom );
            utAtom eclAtom( "FLOOIL" );
            status_ = mapping_.Add( pamPT_OILFLOW, eclAtom );
            utAtom eclAtom( "FLOWAT" );
            status_ = mapping_.Add( pamPT_WATFLOW, eclAtom );
            utAtom eclAtom( "FLOGAS" );
            status_ = mapping_.Add( pamPT_GASFLOW, eclAtom );
            utAtom eclAtom( "FLORES" );
            status_ = mapping_.Add( pamPT_RESFLOW, eclAtom );
        // Seismic attribute properties
            utAtom eclAtom( "ACOUIMPP" );
            status_ = mapping.Add( pamPT_SIMPIMPEDANCE, eclAtom );
            utAtom eclAtom( "ACIP" );
            status_ = mapping_.Add( pamPT_OBSPIMPEDANCE, eclAtom );
            utAtom eclAtom( "eACIP" );
            status_ = mapping.Add( pamPT_ERRPIMPEDANCE, eclAtom );
            utAtom eclAtom( "ACOUIMPS" );
            status_ = mapping_.Add( pamPT_SIMSIMPEDANCE, eclAtom );
            utAtom eclAtom( "ACIS" );
            status_ = mapping_.Add( pamPT_OBSSIMPEDANCE, eclAtom );
            utAtom eclAtom( "eACIS" );
            status_ = mapping_.Add( pamPT_ERRSIMPEDANCE, eclAtom );
            utAtom eclAtom( "POISSONR" );
            status_ = mapping_.Add( pamPT_SIMPOISSON, eclAtom );
            utAtom eclAtom( "POIS" );
            status_ = mapping_.Add( pamPT_OBSPOISSON, eclAtom );
            utAtom eclAtom( "ePOIS" );
            status_ = mapping_.Add( pamPT_ERRPOISSON, eclAtom );
        }
    -->
</EcipseNamesToPropertyTypedatalog>
```

The above description of the 'Software for performing economic calculations in Petro-Technical workflows' 32 being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A computer-implemented method for performing economic calculations in petro-technical workflows, comprising:

designing a computer-implemented economic model including, building and running an economic calculation in a petro-technical workflow using one or more processors, the building and running step including, opening an economics dialog box, clicking an economics calculation tab in the economics dialog box, clicking a settings tab in the economics dialog box and configuring a set of settings for the economic calculation, clicking a run button in the economics dialog box to perform the computer-implemented economic calculation, wherein the step of clicking the economics calculation tab in the economics dialog box comprises defining a set of basic economic calculation parameters for the economic calculation using one or more processors, and wherein the step of defining a set of basic economic calculation parameters for the economic calculation using one or more processors comprises:

(a) choosing to create a new run or overwrite an existing run;

(b) choosing an economic model upon which to base the economic calculation;

(c) specifying identifiers for which data is obtained; and (d) specifying one or more simulations from which data is obtained for the economic calculation;

wherein said set of basic economic calculation parameters is selected from the group consisting of an economic model that will be used for the economic calculation, a set of wells or groups or field for which the economic calculation will be performed, and a set of simulations whose data will be used as inputs for the run.

2. The computer-implemented method of claim 1, wherein the building and running step further comprises:

clicking a mapping tab in the economics dialog box and defining mappings for Ethane, Propane, and Butane.

3. The computer-implemented method of claim 1, wherein the choosing step (b) for choosing an economic model comprises:

choosing the economic model; and editing a set of properties of said economic model.

4. The computer-implemented method of claim 3, wherein the step of editing a set of properties of said economic model comprises:
- clicking a general tab, and
  - selecting a desired fiscal model,
  - selecting a file button to use existing oil price, and
  - setting a gas price and a propane price and a butane price and an ethane price, and
- clicking an operating cost tab, and
  - specifying fixed operating costs for each active producer or injector well per month,
  - specifying the operating costs for oil, gas, water, or injection, and
  - specifying the operating costs for propane and butane and ethane; and
- clicking a capital cost tab and specify capital expenditures.

5. The computer-implemented method of claim 1, wherein the choosing step (b) for choosing an economic model comprises:
- choosing the economic model; and
- creating a new economic model.

6. The computer-implemented method of claim 1, wherein the choosing step (b) for choosing an economic model comprises:
- choosing the economic model; and
- deleting the economic model.

7. A program storage device readable by a machine tangibly embodying a set of instructions executable by the machine to perform method steps for performing economic calculations in petro-technical workflows, the method steps comprising:
- designing an economic model including,
- building and running an economic calculation, the building and running step including,
- opening an economics dialog box,
- received a click on an economics calculation tab in the economics dialog box,
- receiving a click on a settings tab in the economics dialog box and configuring a set of settings for the economic calculation,
- receiving a click on a run button in the economics dialog box to perform the economic calculation,
- wherein the step of receiving a click on the economics calculation tab in the economics dialog box comprises defining a set of basic economic calculation parameters for the economic calculation, and
- wherein the step of defining a set of basic economic calculation parameters for the economic calculation comprises:
  - (a) choosing to create a new run or overwrite an existing run;
  - (b) choosing an economic model upon which to base the economic calculation;
  - (c) specifying identifiers for which data is obtained; and
  - (d) specifying one or more simulations from which data is obtained for the economic calculation;
- wherein said set of basic economic calculation parameters is selected from the group consisting of an economic model that will be used for the economic calculation, a set of wells or groups or field for which the economic calculation will be performed, and a set of simulations whose data will be used as inputs for the run.

8. The program storage device of claim 7, wherein the building and running step further comprises:
- receiving a click on a mapping tab in the economics dialog box and defining mappings for Ethane, Propane, and Butane.

9. The program storage device of claim 7, wherein the choosing step (b) for choosing an economic model comprises:
- choosing the economic model; and
- editing a set of properties of said economic model.

10. The program storage device of claim 9, wherein the step of editing a set of properties of said economic model comprises:
- receiving a click on a general tab, and
  - selecting a desired fiscal model,
  - selecting a file button to use existing oil price, and
  - setting a gas price and a propane price and a butane price and an ethane price, and
- receiving a click on an operating cost tab, and
  - specifying fixed operating costs for each active producer or injector well per month,
  - specifying the operating costs for oil, gas, water, or injection, and
  - specifying the operating costs for propane and butane and ethane; and
- receiving a click on a capital cost tab and specify capital expenditures.

11. The program storage device of claim 7, wherein the choosing step (b) for choosing an economic model comprises:
- choosing the economic model; and
- creating a new economic model.

12. The program storage device of claim 7, wherein the choosing step (b) for choosing an economic model comprises:
- choosing the economic model; and
- deleting the economic model.

13. A computer program adapted to be executed by one or more processors, said computer program, when executed by said processor, conducting a process for performing economic calculations in petro-technical workflows, the process comprising:
- designing an economic model including,
- building and running an economic calculation in a petro-technical workflow using said one or more processors, the building and running step including,
- opening an economics dialog box,
- receiving a click on an economics calculation tab in the economics dialog box,
- receiving a click on a settings tab in the economics dialog box and configuring a set of settings for the economic calculation,
- receiving a click on a run button in the economics dialog box to perform the economic calculation,
- wherein the step of receiving a click on the economics calculation tab in the economics dialog box comprises defining a set of basic economic calculation parameters for the economic calculation, and
- wherein the step of defining a set of basic economic calculation parameters for the economic calculation comprises:
  - (a) choosing to create a new run or overwrite an existing run;
  - (b) choosing an economic model upon which to base the economic calculation;
  - (c) specifying identifiers for which data is obtained; and
  - (d) specifying one or more simulations from which data is obtained for the economic calculation;
- wherein said set of basic economic calculation parameters is selected from the group consisting of an economic model that will be used for the economic calculation, a set of wells or groups or field for which the economic calculation will be performed, and a set of simulations whose data will be used as inputs for the run.

14. The computer program of claim 13, wherein the building and running step further comprises:
receiving a click on a mapping tab in the economics dialog box and defining mappings for Ethane, Propane, and Butane.

15. The computer program of claim 13, wherein the choosing step (b) for choosing an economic model comprises:
choosing the economic model; and
editing a set of properties of said economic model.

16. The computer program of claim 15, wherein the step of editing a set of properties of said economic model comprises:
receiving a click on a general tab, and
selecting a desired fiscal model,
selecting a file button to use existing oil price, and
setting a gas price and a propane price and a butane price and an ethane price, and
receiving a click on an operating cost tab, and
specifying fixed operating costs for each active producer or injector well per month,
specifying the operating costs for oil, gas, water, or injection, and
specifying the operating costs for propane and butane and ethane; and
receiving a click on a capital cost tab and specify capital expenditures.

17. The computer program of claim 13, wherein the choosing step (b) for choosing an economic model comprises:
choosing the economic model; and
creating a new economic model.

18. The computer program of claim 13, wherein the choosing step (b) for choosing an economic model comprises:
choosing the economic model; and
deleting the economic model.

19. A computer system for performing economic calculations in petro-technical workflows, comprising:
one or more processors configured to design and implement an economic model including,
building and running an economic calculation in a petro-technical workflow, the building and running step including,
opening an economics dialog box,
clicking an economics calculation tab in the economics dialog box,
clicking a settings tab in the economics dialog box and configuring a set of settings for the economic calculation,
clicking a run button in the economics dialog box to perform the computer-implemented economic calculation,
wherein the step of clicking the economics calculation tab in the economics dialog box comprises defining a set of basic economic calculation parameters for the economic calculation, and
wherein the step of defining a set of basic economic calculation parameters for the economic calculation comprises:
(a) choosing to create a new run or overwrite an existing run;
(b) choosing an economic model upon which to base the economic calculation;
(c) specifying identifiers for which data is obtained; and
(d) specifying one or more simulations from which data is obtained for the economic calculation;
wherein said set of basic economic calculation parameters is selected from the group consisting of an economic model that will be used for the economic calculation, a set of wells or groups or field for which the economic calculation will be performed, and a set of simulations whose data will be used as inputs for the run.

* * * * *